United States Patent
Lee et al.

(10) Patent No.: US 10,609,696 B2
(45) Date of Patent: Mar. 31, 2020

(54) METHOD FOR TRANSMITTING AND RECEIVING DATA IN WIRELESS COMMUNICATION SYSTEM, AND DEVICE THEREFOR

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Eunjong Lee, Seoul (KR); Hyunsuk Lee, Seongnam-si (KR); Duckhyun Bae, Seoul (KR); Jangwon Lee, Seoul (KR); Ilmu Byun, Seoul (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 53 days.

(21) Appl. No.: 15/577,587

(22) PCT Filed: Oct. 2, 2015

(86) PCT No.: PCT/KR2015/010461
§ 371 (c)(1),
(2) Date: Nov. 28, 2017

(87) PCT Pub. No.: WO2016/195177
PCT Pub. Date: Dec. 8, 2016

(65) Prior Publication Data
US 2018/0167915 A1    Jun. 14, 2018

(30) Foreign Application Priority Data

May 29, 2015  (KR) .................. 10-2015-0076660
May 29, 2015  (KR) .................. 10-2015-0076669

(51) Int. Cl.
*H04W 88/08*  (2009.01)
*H04W 72/04*  (2009.01)
(Continued)

(52) U.S. Cl.
CPC ......... *H04W 72/042* (2013.01); *H04W 12/04* (2013.01); *H04W 12/06* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

2003/0086536 A1* 5/2003 Salzberg ................. H04M 3/22
                                                          379/15.02
2009/0152611 A1* 6/2009 Fujimoto ............ H01L 21/6835
                                                          257/296

(Continued)

OTHER PUBLICATIONS

Alcatel-Lucent Shanghai Bell, Alcatel-Lucent "Consideration on DCI for LC-MTC", R1-152601, 3GPP TSG RAN WG1 Meeting #81, Fukuoka, Japan, May 25-29, 2015.
(Continued)

*Primary Examiner* — Hassan A Phillips
*Assistant Examiner* — Prenell P Jones
(74) *Attorney, Agent, or Firm* — Birch, Stewart, Kolasch & Birch, LLP

(57) ABSTRACT

The present specification provides a method for transmitting and receiving uplink (UL) data and/or downlink (DL) data in a wireless communication system supporting a low latency service. The method for transmitting and receiving the downlink data is performed through slim downlink control information (DCI), and the method for transmitting and receiving uplink data is performed through a service management entity (SME).

11 Claims, 32 Drawing Sheets

(51) Int. Cl.
*H04W 12/04* (2009.01)
*H04W 12/06* (2009.01)
*H04W 72/08* (2009.01)
*H04W 12/10* (2009.01)
*H04W 76/10* (2018.01)
*H04W 36/00* (2009.01)
*H04W 74/08* (2009.01)
*H04W 88/02* (2009.01)

(52) U.S. Cl.
CPC .......... *H04W 72/085* (2013.01); *H04W 12/10* (2013.01); *H04W 36/0077* (2013.01); *H04W 74/0833* (2013.01); *H04W 76/10* (2018.02); *H04W 88/02* (2013.01); *H04W 88/08* (2013.01)

(56) References Cited

U.S. PATENT DOCUMENTS

| | | | | |
|---|---|---|---|---|
| 2009/0156211 | A1* | 6/2009 | Hande | H04W 36/22 455/436 |
| 2012/0170525 | A1* | 7/2012 | Sorrentino | H04L 5/0007 370/329 |
| 2012/0269140 | A1* | 10/2012 | Nam | H04B 7/024 370/329 |
| 2013/0058294 | A1* | 3/2013 | Miki | H04L 5/0007 370/329 |
| 2013/0064196 | A1* | 3/2013 | Gao | H04L 5/0016 370/329 |
| 2013/0114532 | A1 | 5/2013 | Choi et al. | |
| 2013/0142059 | A1* | 6/2013 | Di Girolamo | H04L 12/66 370/252 |
| 2013/0188566 | A1 | 7/2013 | Zhu et al. | |
| 2013/0301588 | A1* | 11/2013 | Imamura | H04L 5/0007 370/329 |
| 2013/0315204 | A1* | 11/2013 | Patil | H04W 36/26 370/331 |
| 2014/0211767 | A1* | 7/2014 | Lunttila | H04W 72/1289 370/336 |
| 2014/0286292 | A1* | 9/2014 | Park | H04L 5/0053 370/329 |
| 2014/0314007 | A1 | 10/2014 | Chen et al. | |
| 2016/0073381 | A1* | 3/2016 | Ratasuk | H04W 4/70 370/329 |
| 2016/0100382 | A1* | 4/2016 | He | H04W 72/042 370/329 |
| 2016/0100422 | A1* | 4/2016 | Papasakellariou | H04L 1/1861 370/329 |
| 2017/0118710 | A1* | 4/2017 | Papasakellariou | H04W 72/042 |
| 2017/0141903 | A1* | 5/2017 | Xu | H04L 1/0005 |
| 2017/0366324 | A1* | 12/2017 | Seo | H04L 1/1861 |
| 2017/0373902 | A1* | 12/2017 | Zhang | H04W 48/12 |
| 2018/0070313 | A1* | 3/2018 | Papasakellariou | H04W 72/042 |
| 2018/0077693 | A1* | 3/2018 | Chen | H04L 5/0053 |
| 2018/0375613 | A1* | 12/2018 | Byun | H04L 1/00 |
| 2019/0174499 | A1* | 6/2019 | Tee | H04L 5/001 |

OTHER PUBLICATIONS

Sony, "Issues with dynamically allocating the PDSCH narrowband region for MTC via DCI", R1-153082, 3GPP TSG-RAN WG1 Meeting #81, Fukuoka, Japan, May 25-29, 2015.

* cited by examiner

[Figure 1]
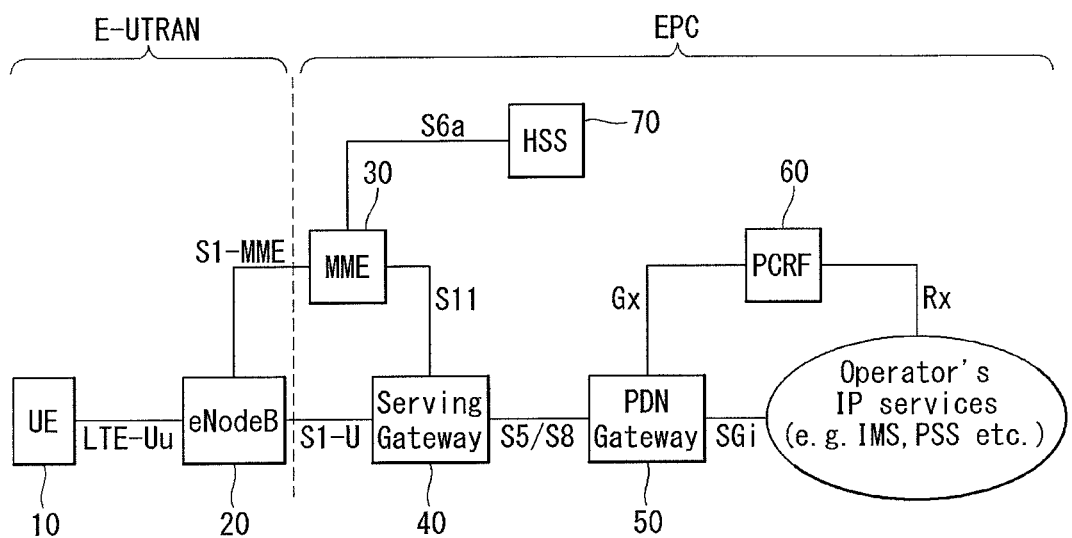

[Figure 2]
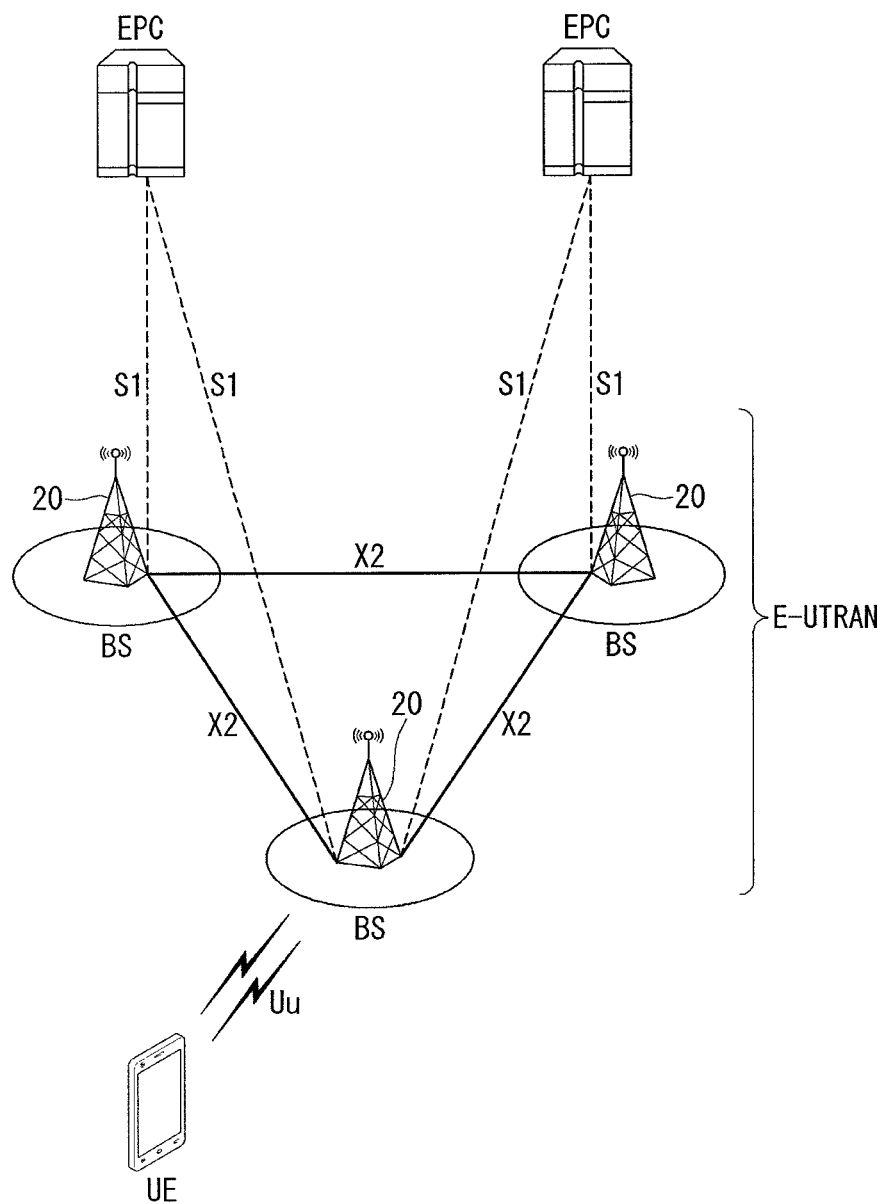

[Figure 3]
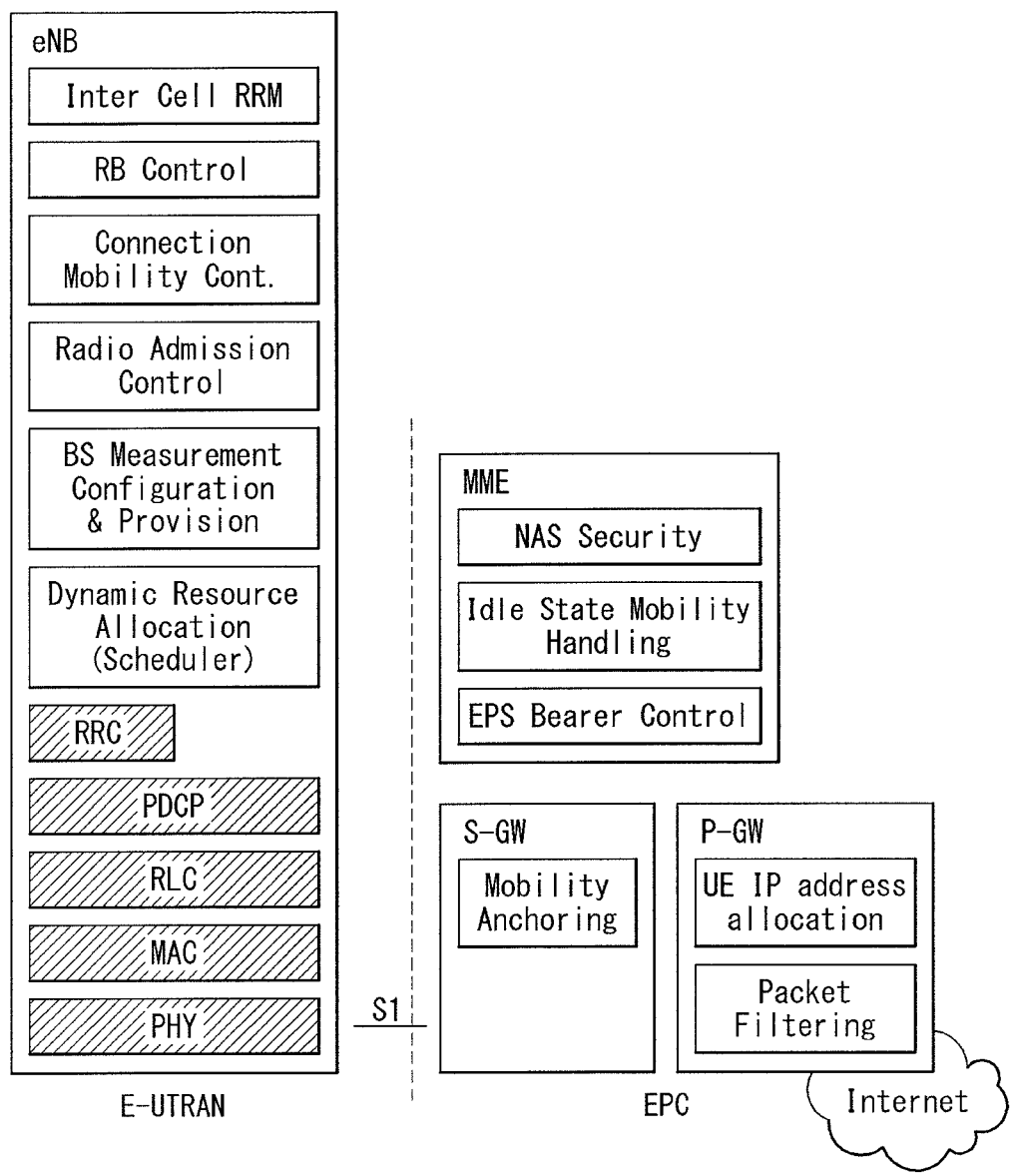

[Figure 4]
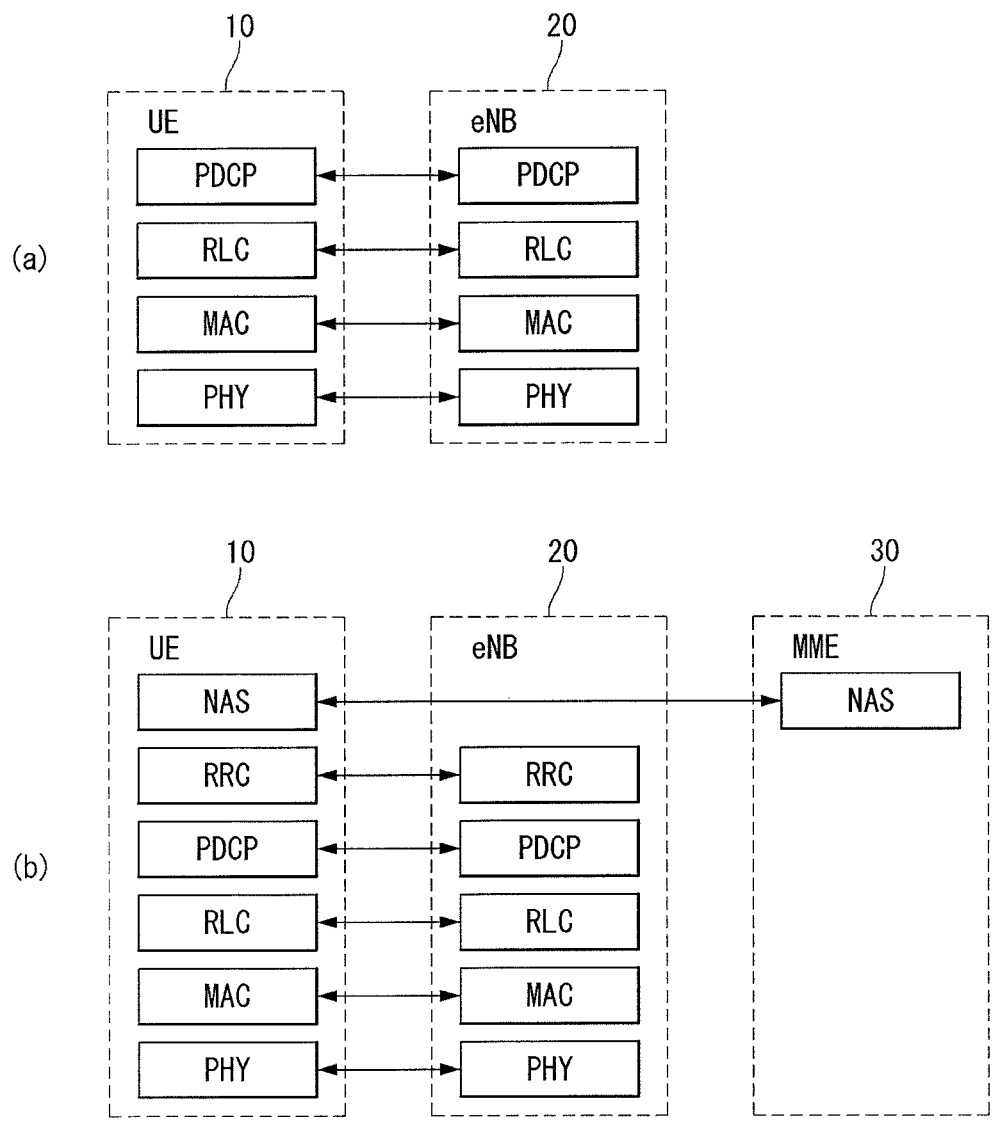

[Figure 5]
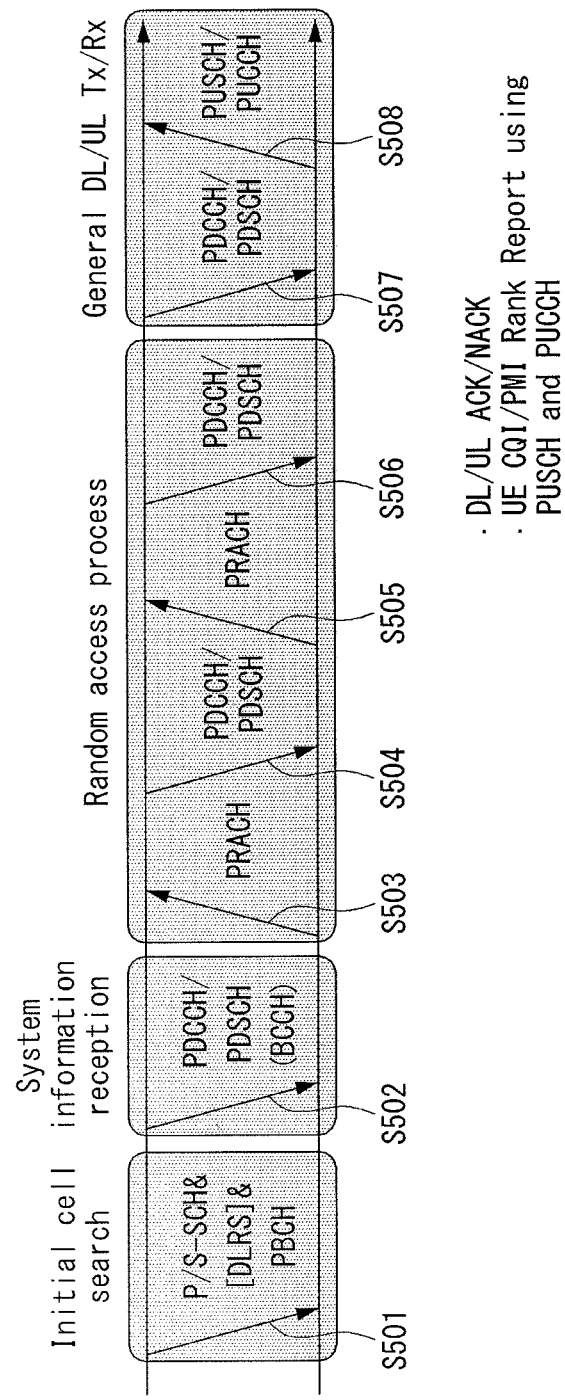

【Figure 6】
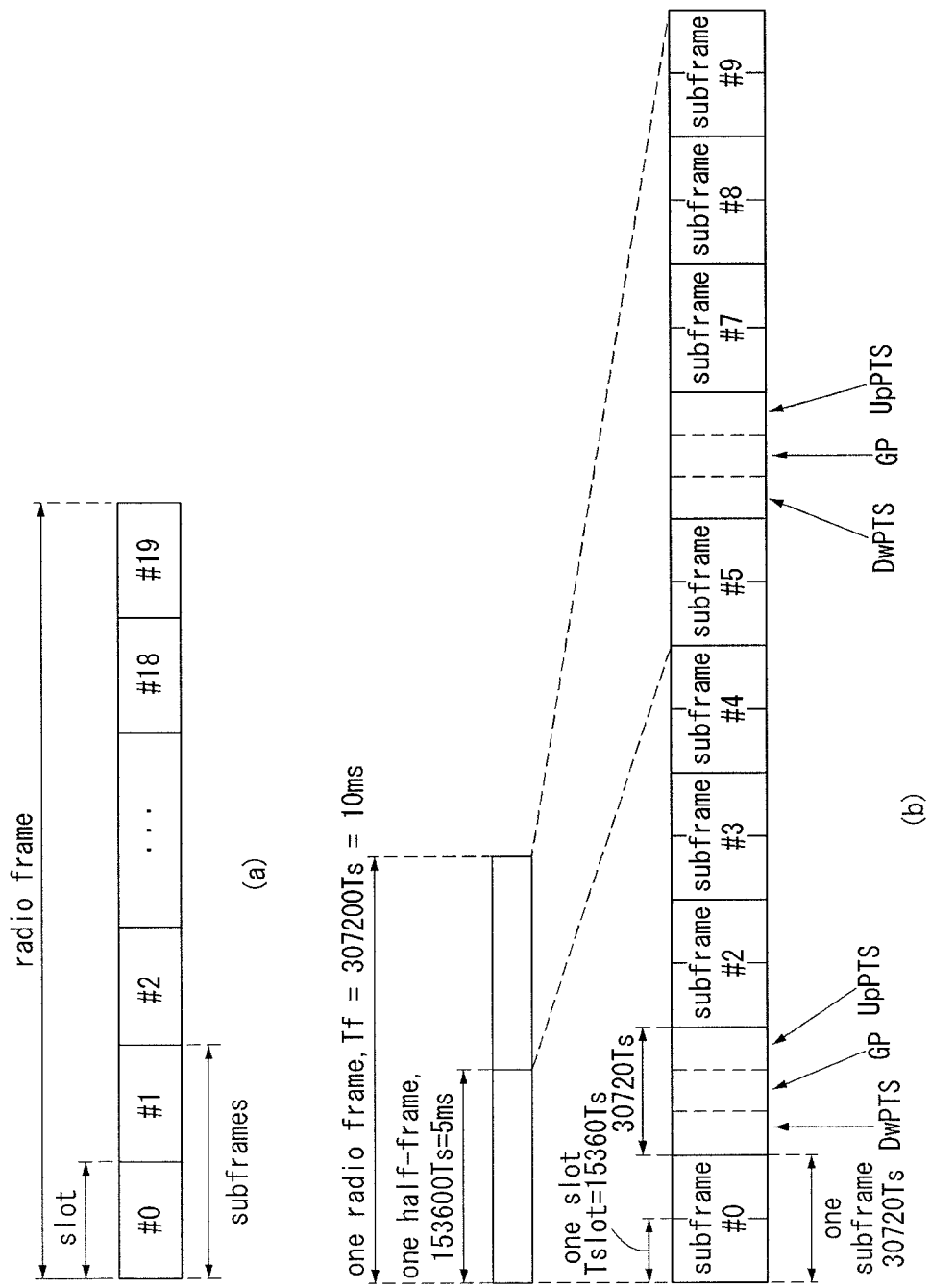

【Figure 7】
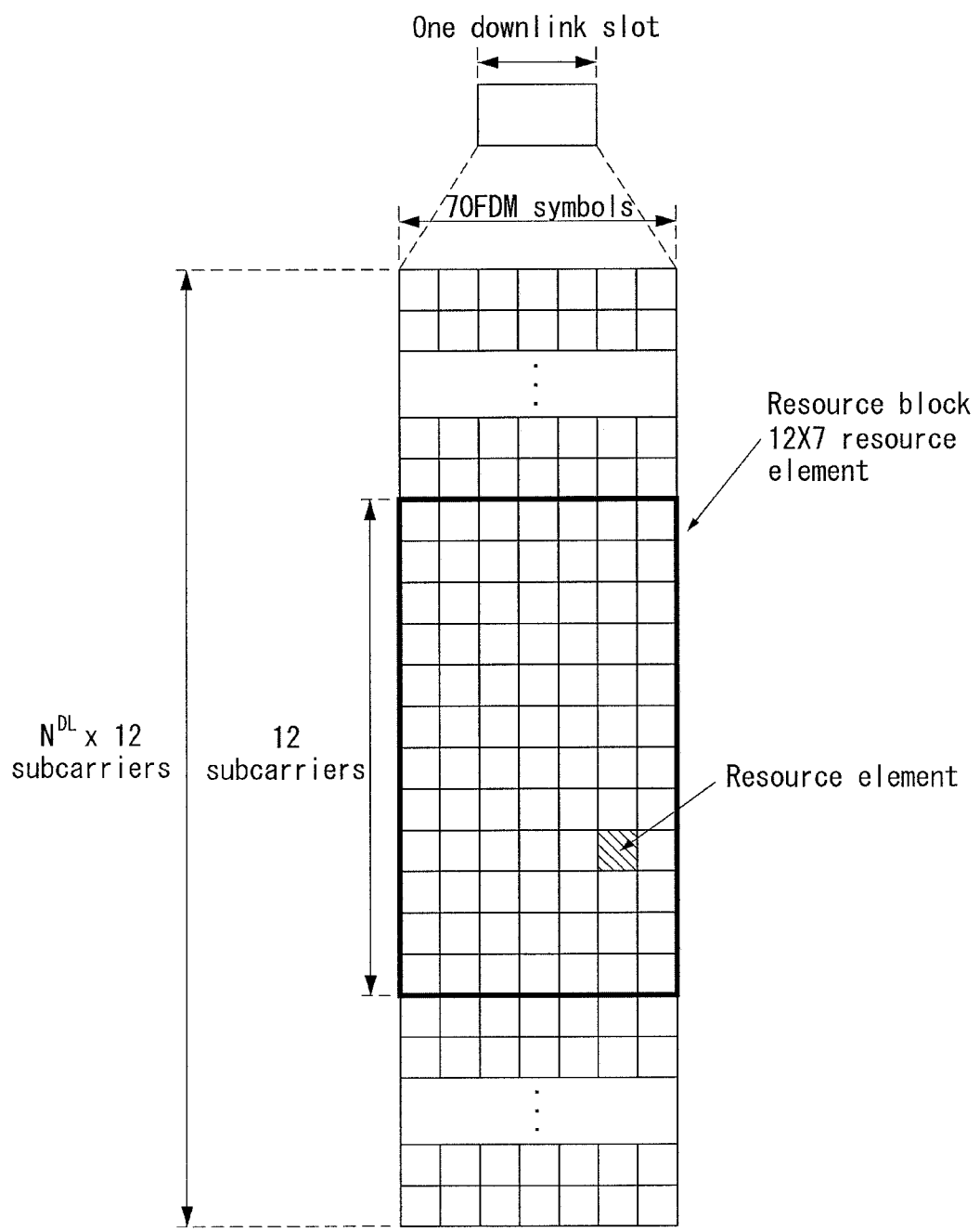

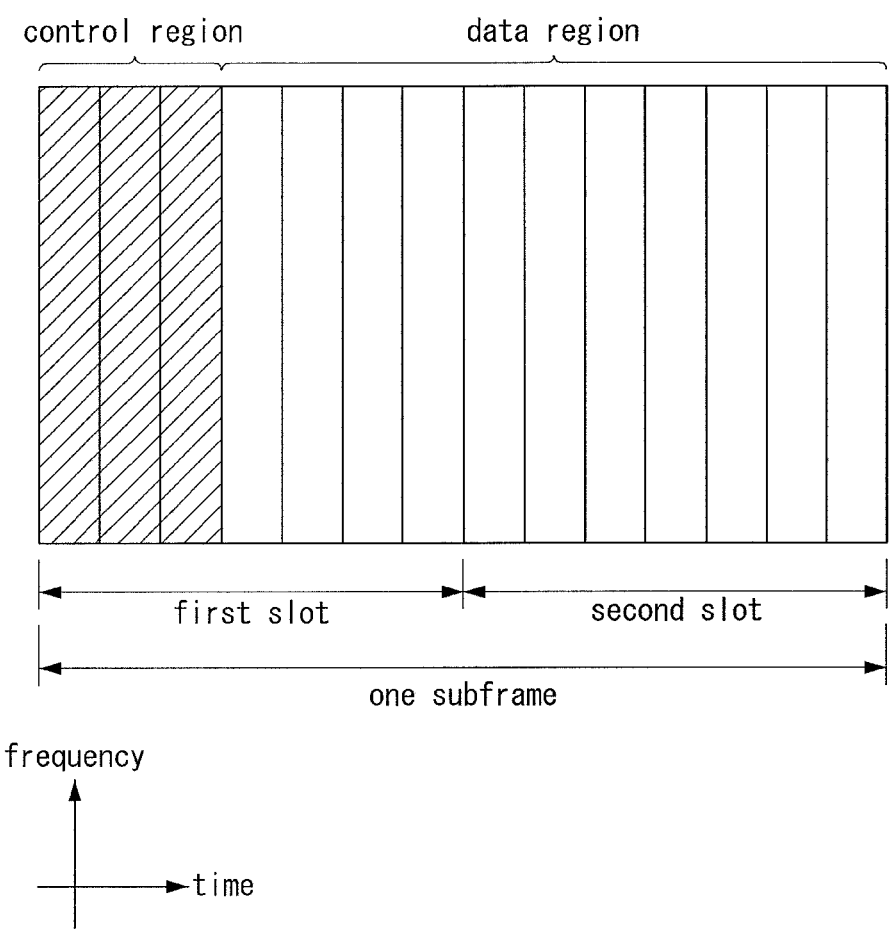

【Figure 9】
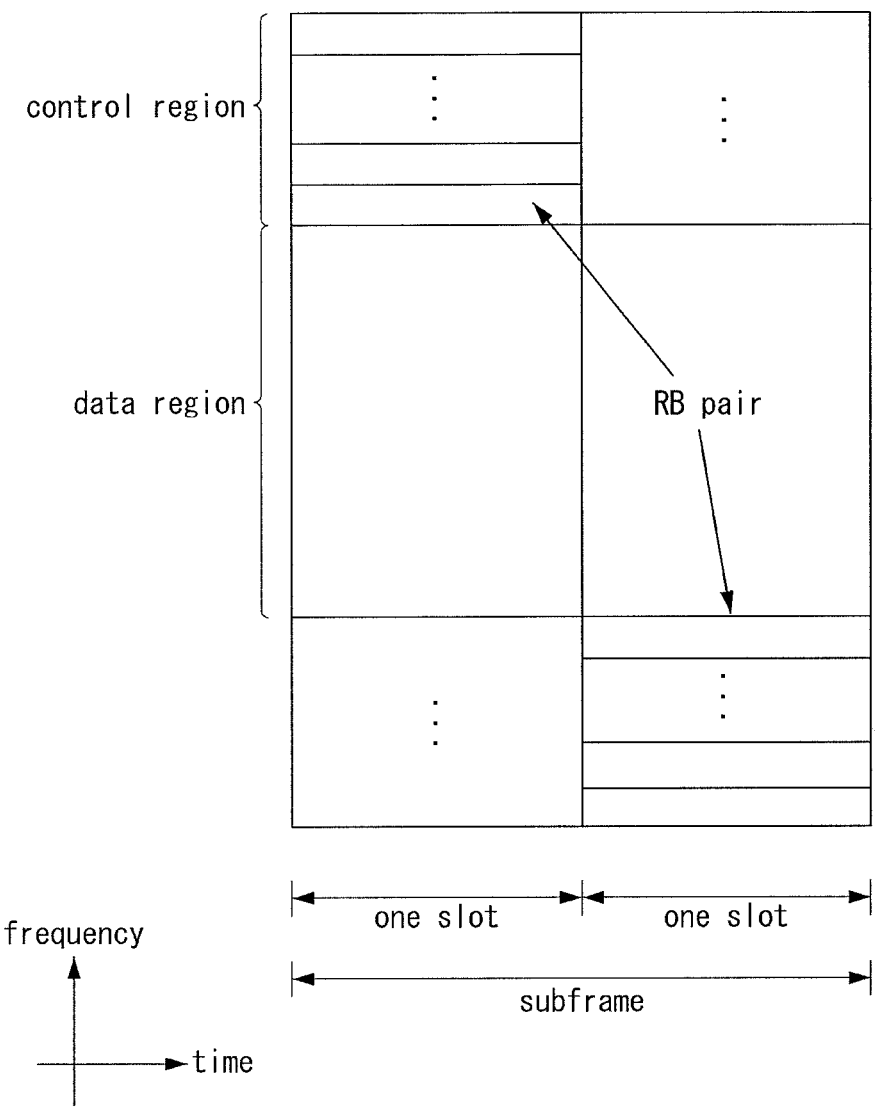

[Figure 10]
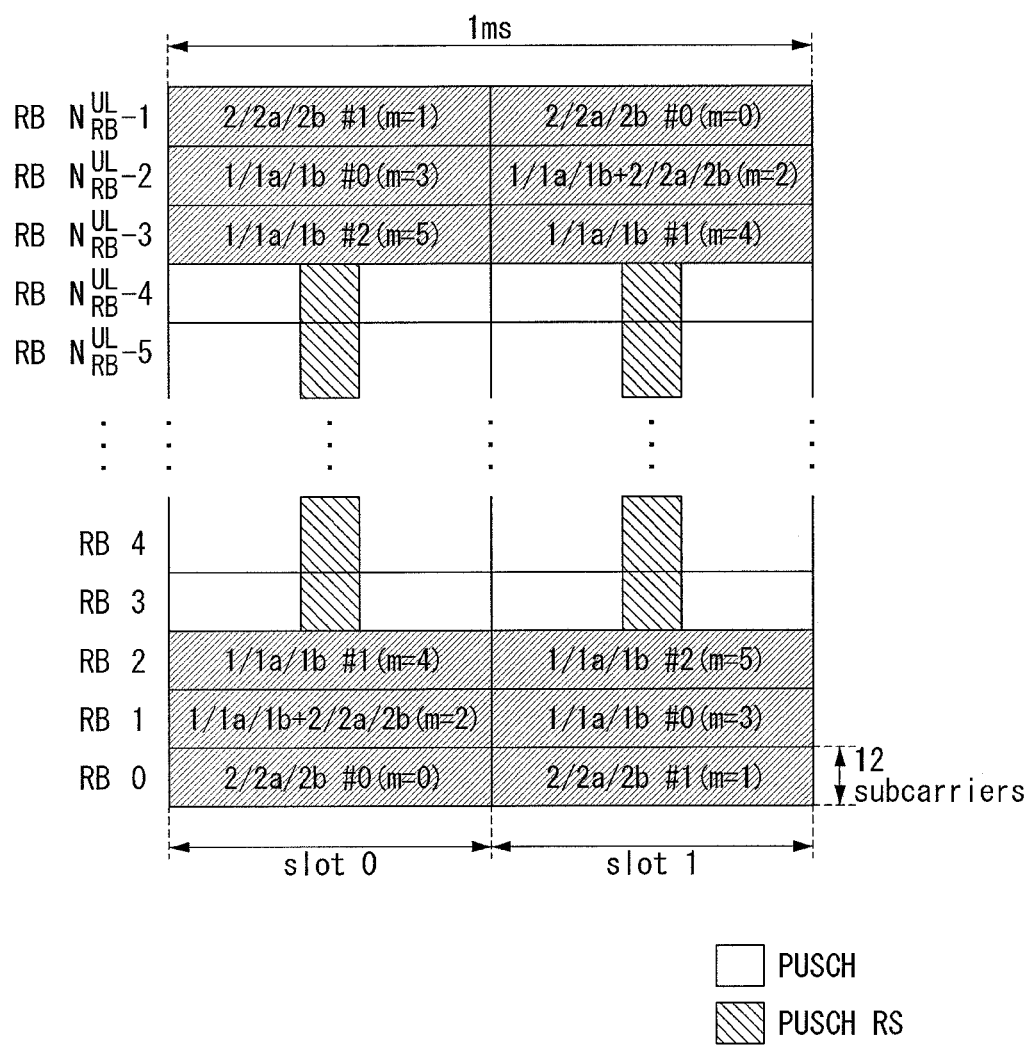

[Figure 11]
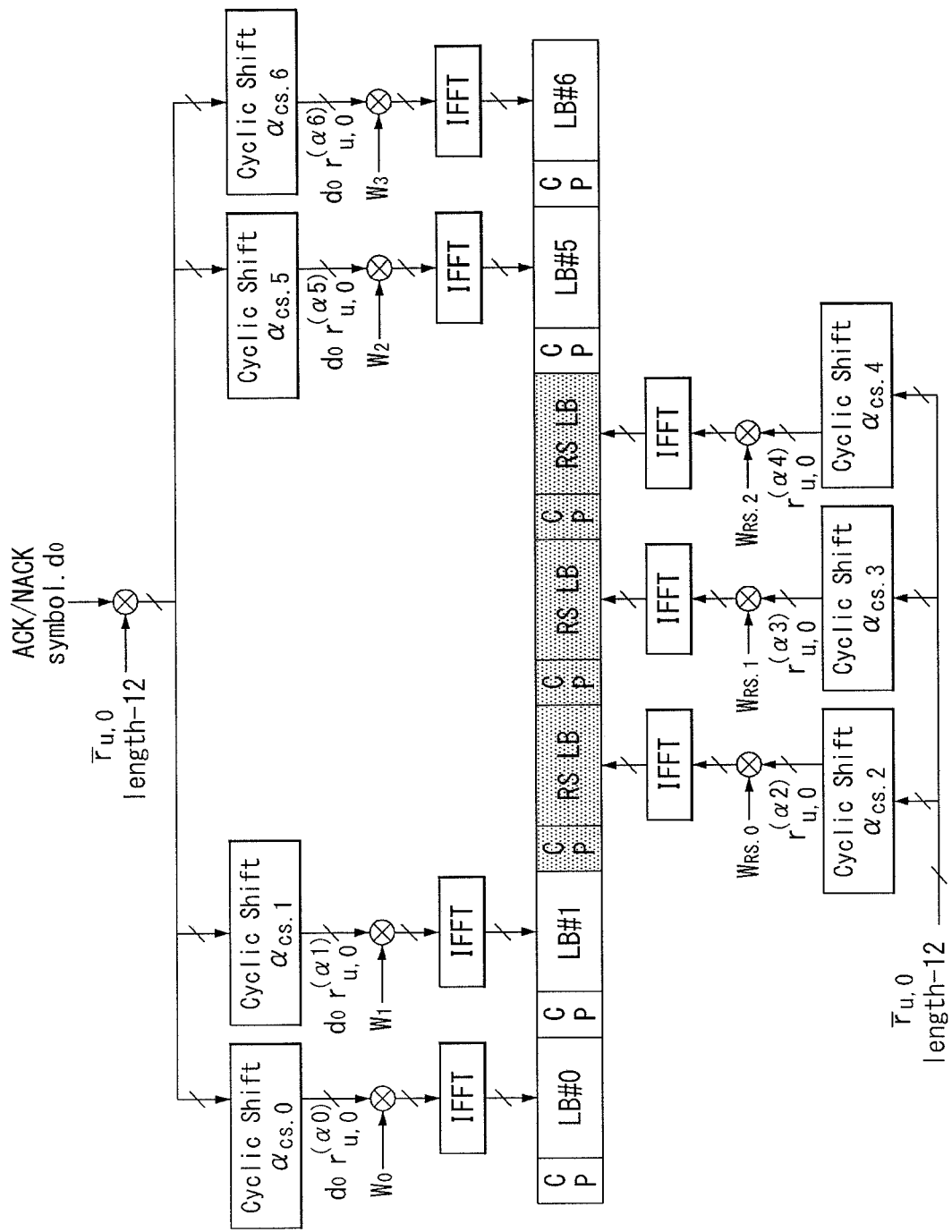

【Figure 12】
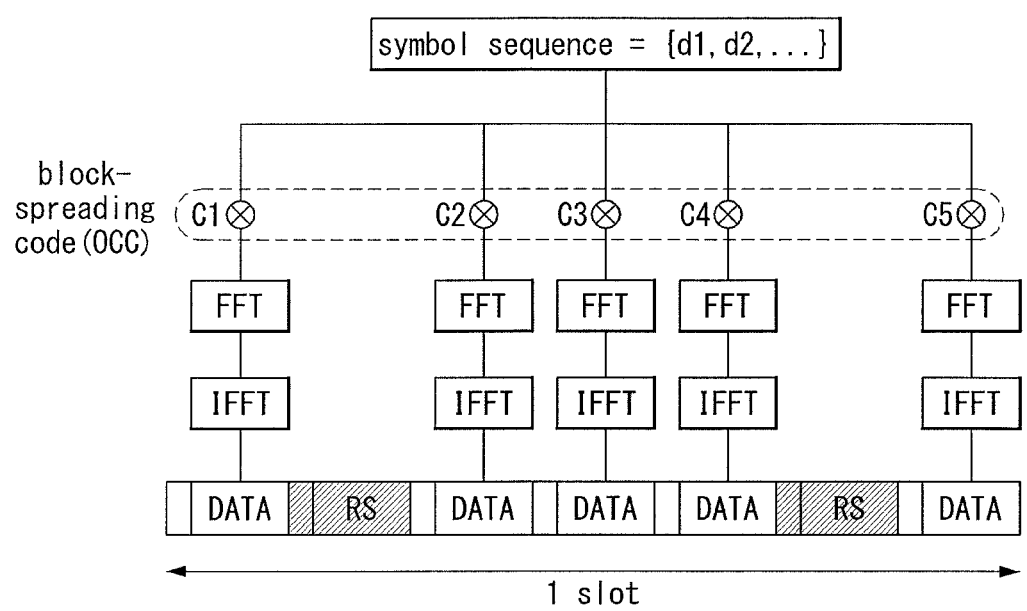

[Figure 13]
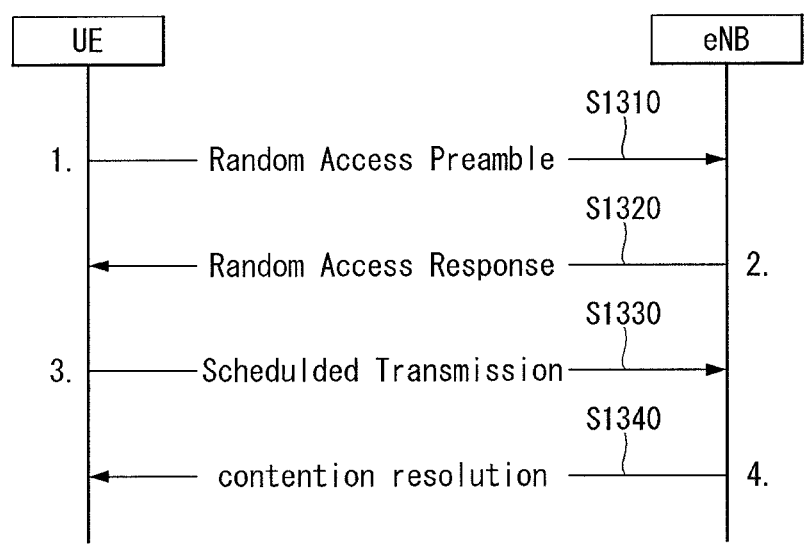

【Figure 14】
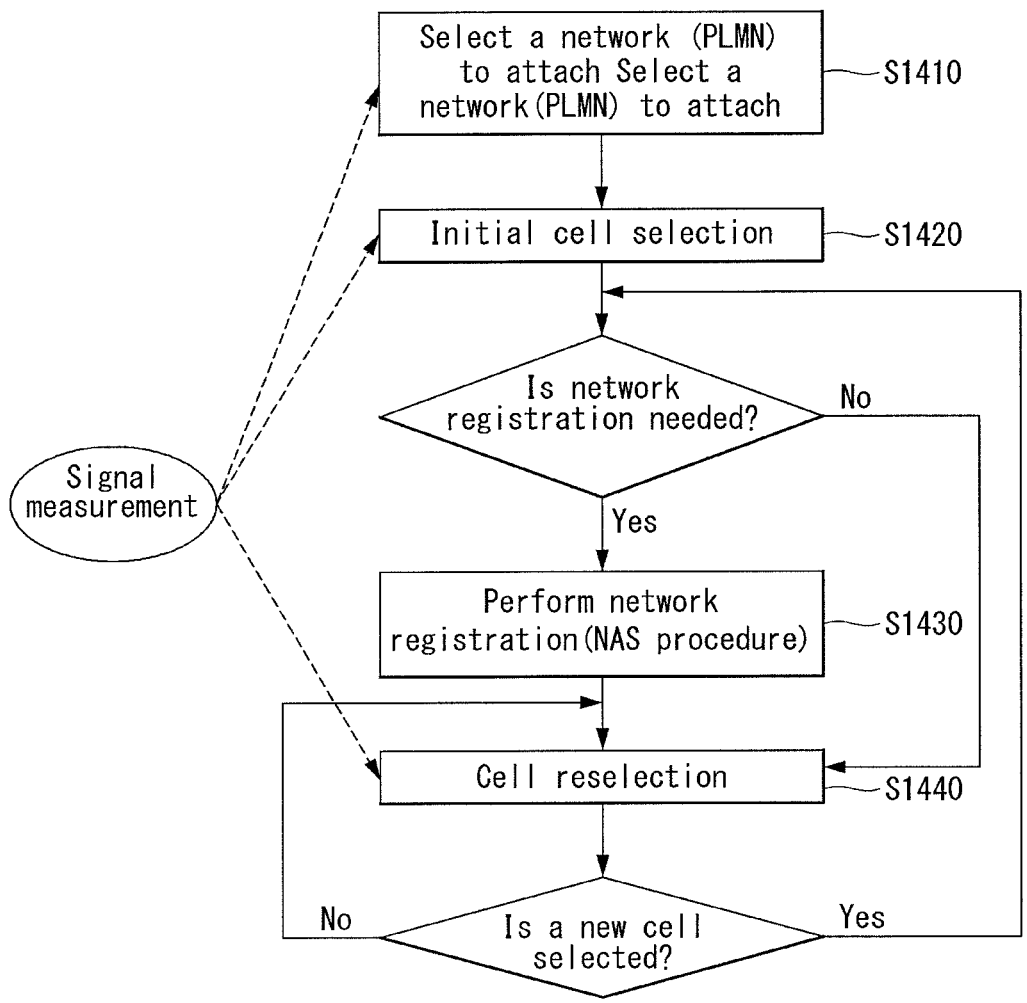

【Figure 15】
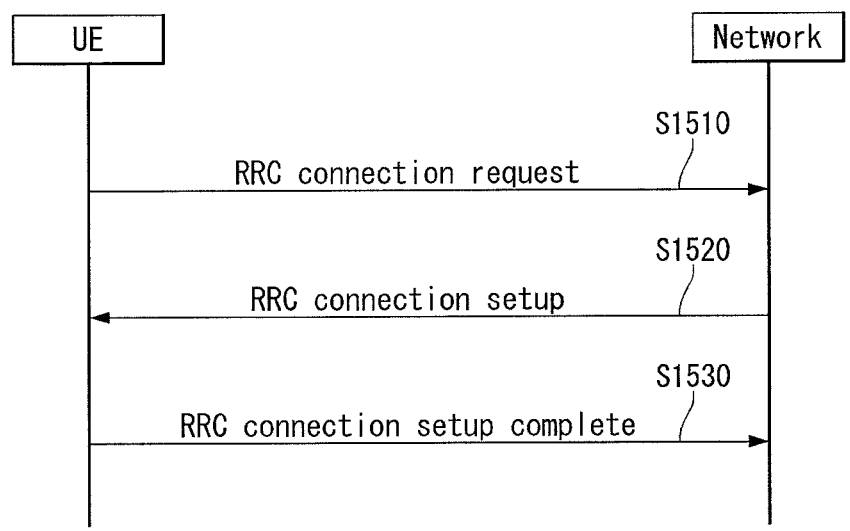

[Figure 16]
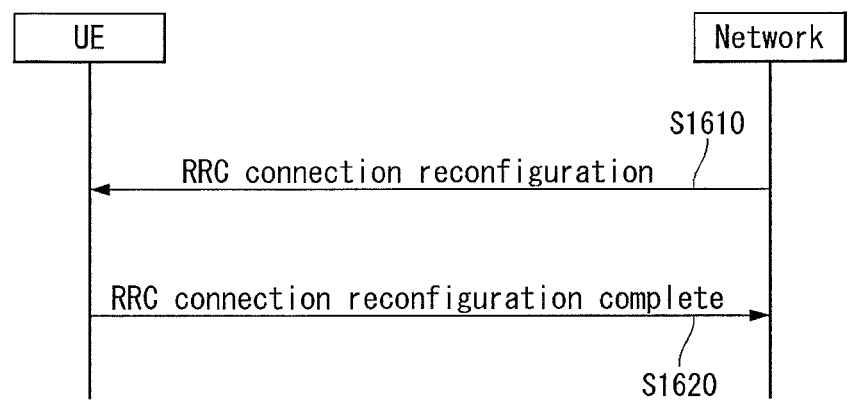

[Figure 17]
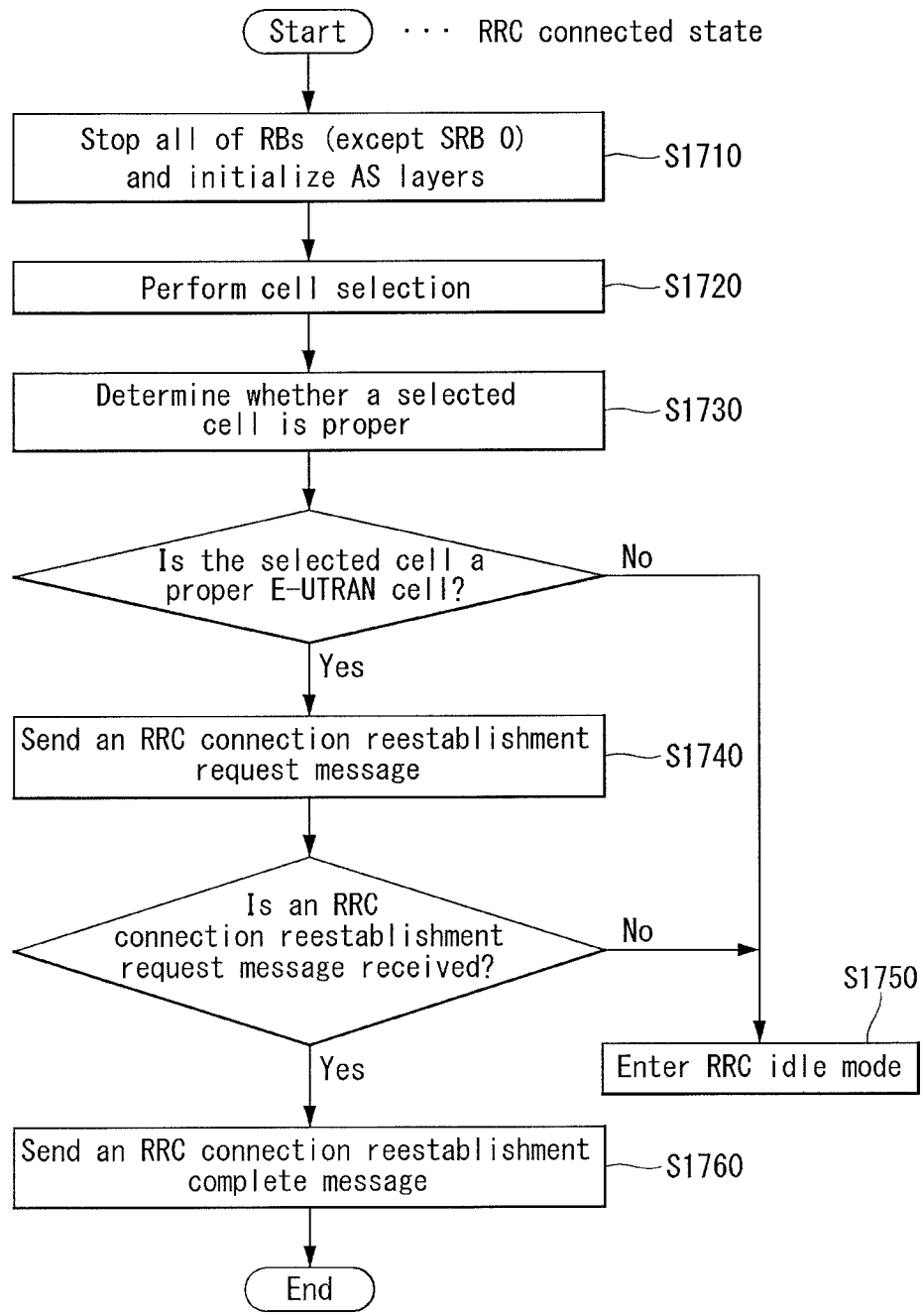

【Figure 18】
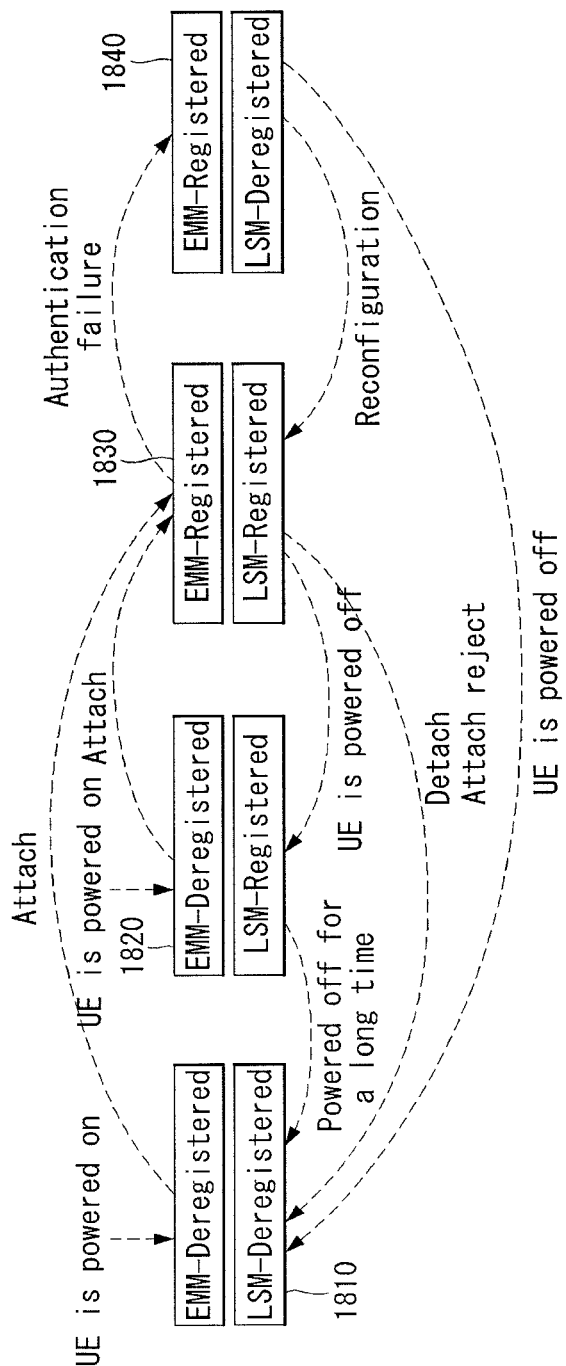

[Figure 19a]
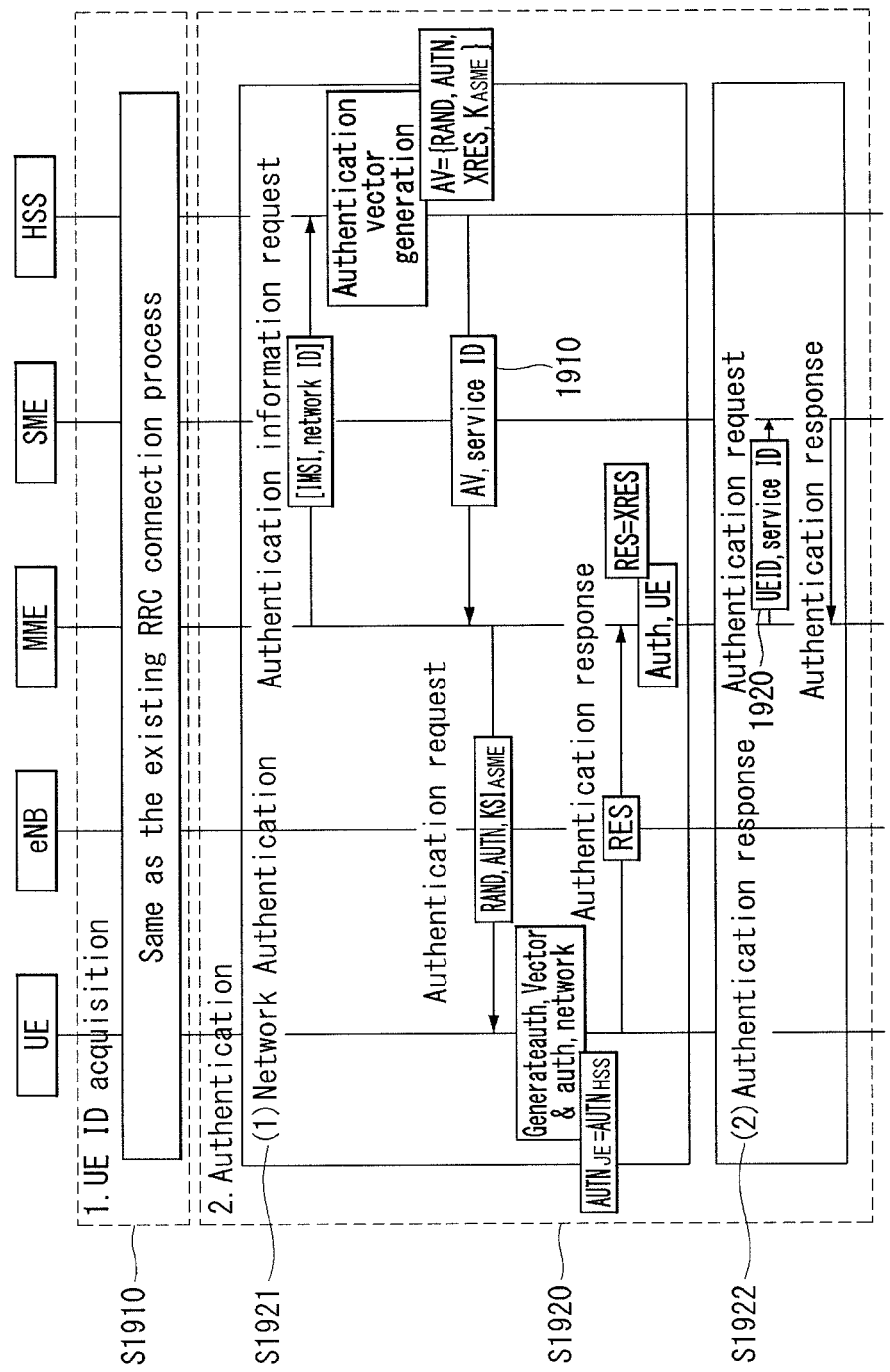

[Figure 19b]
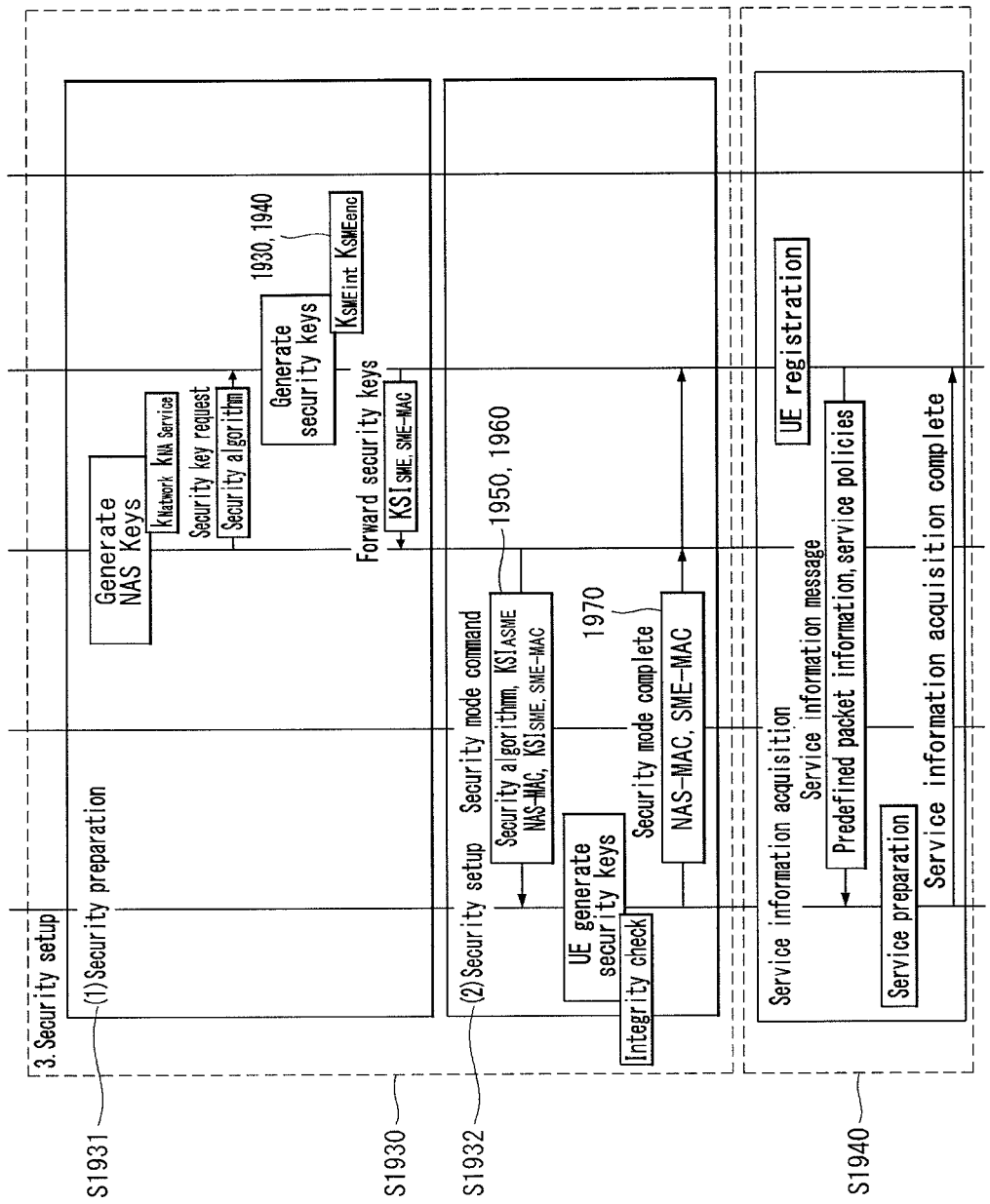

[Figure 20]
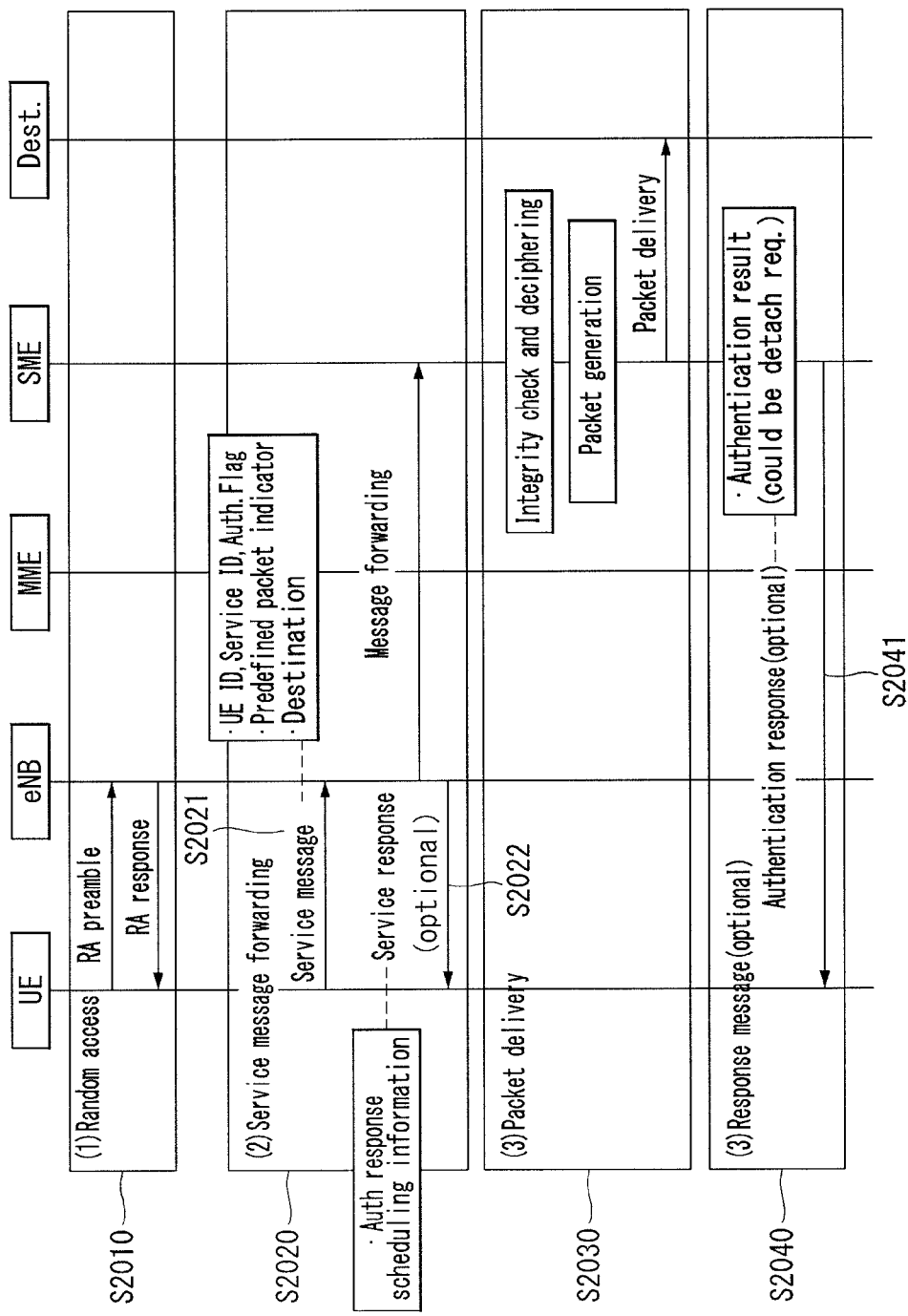

[Figure 21]
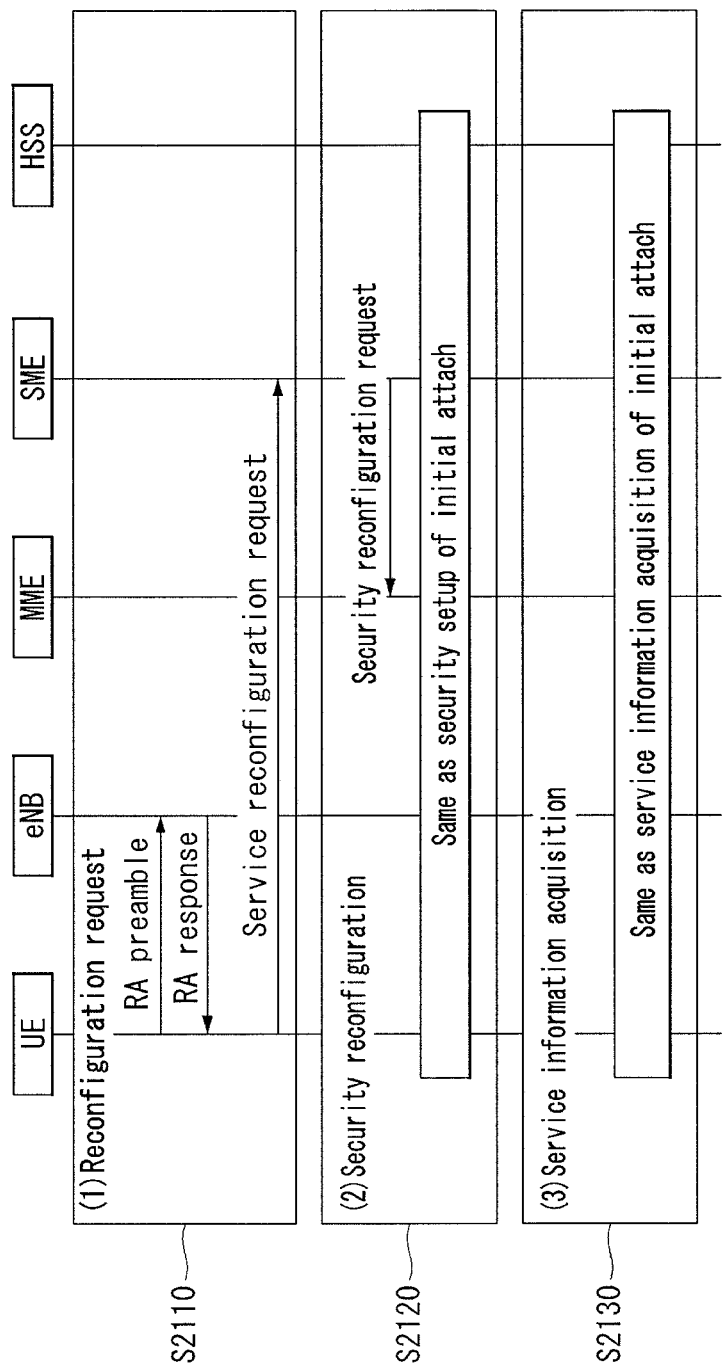

[Figure 22]
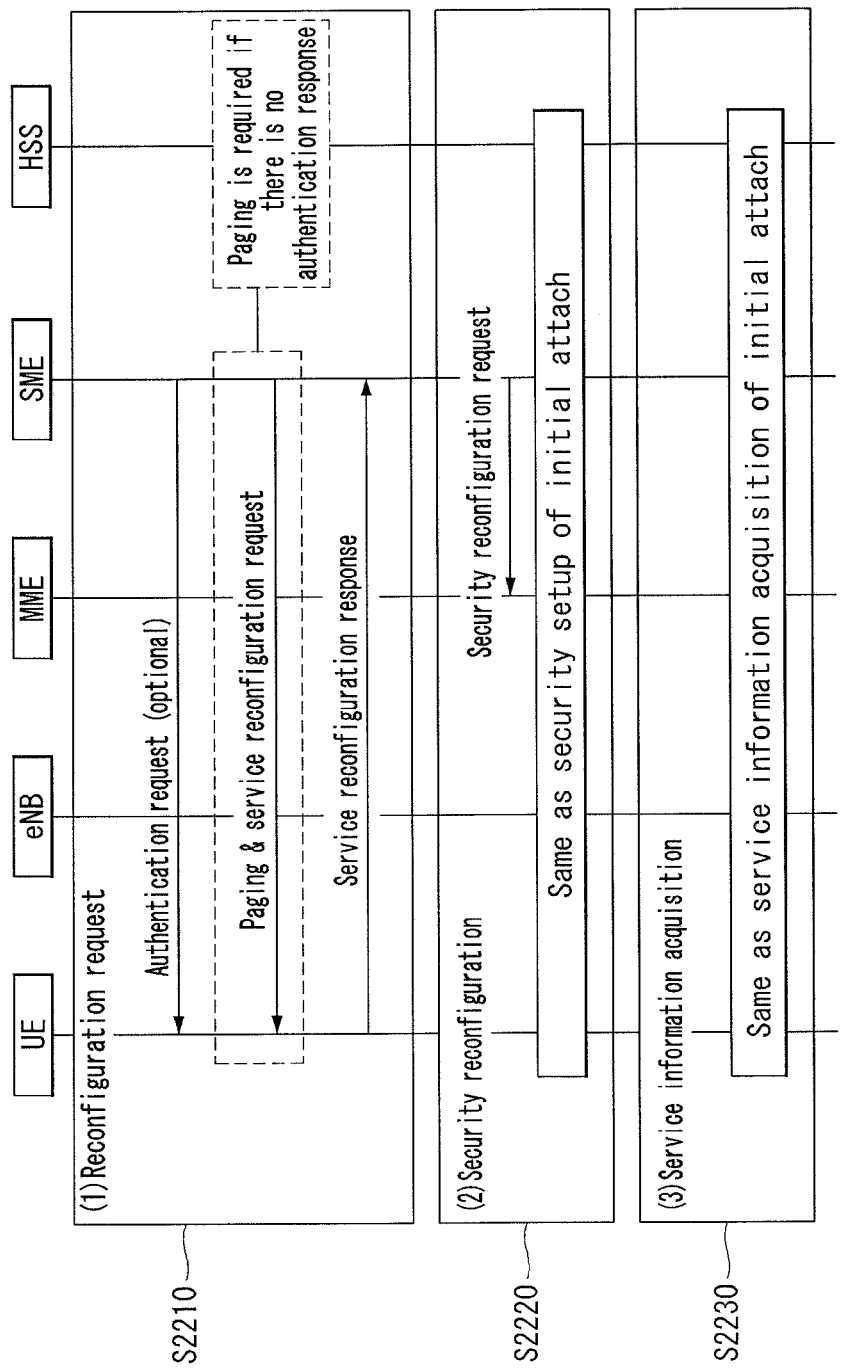

[Figure 23]
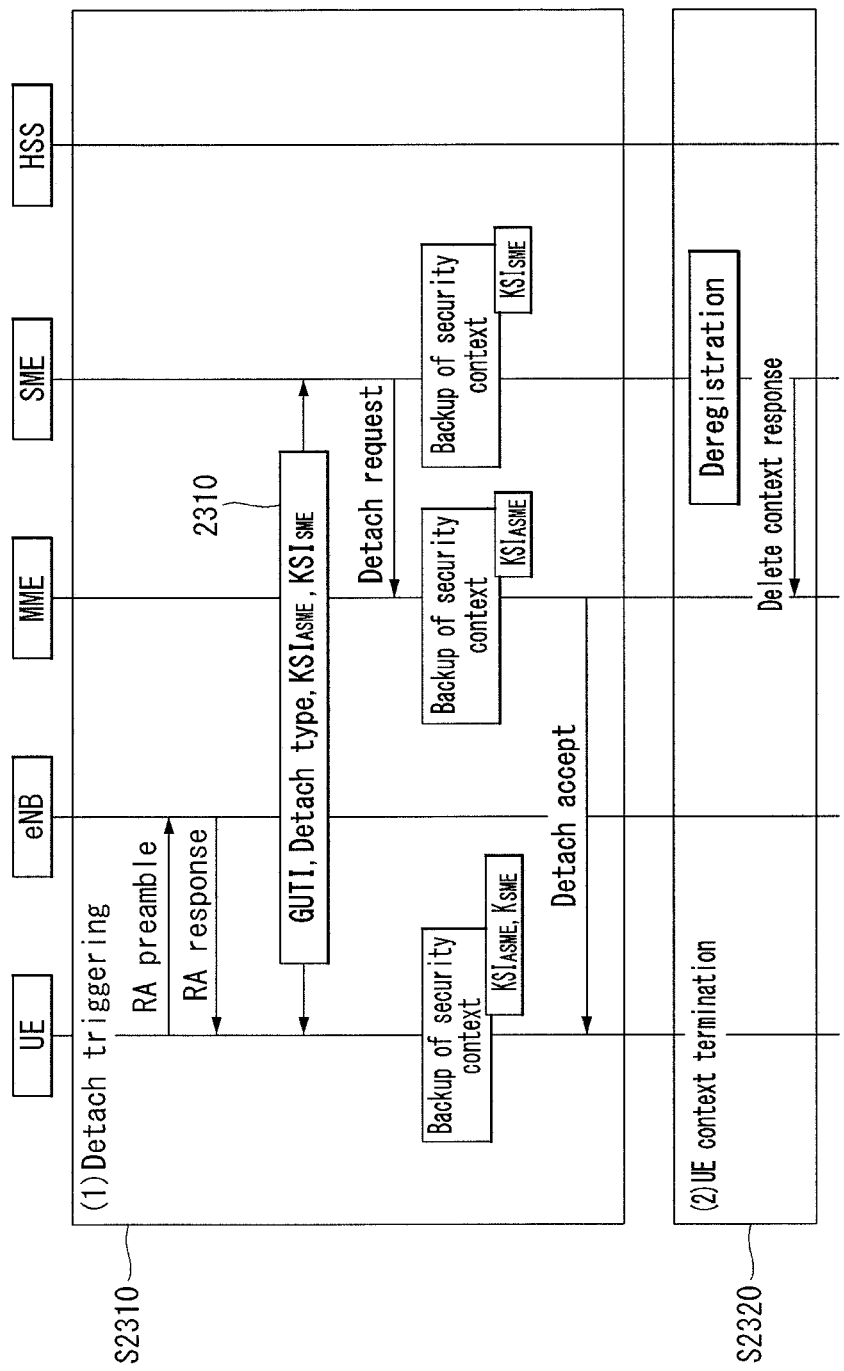

[Figure 24]
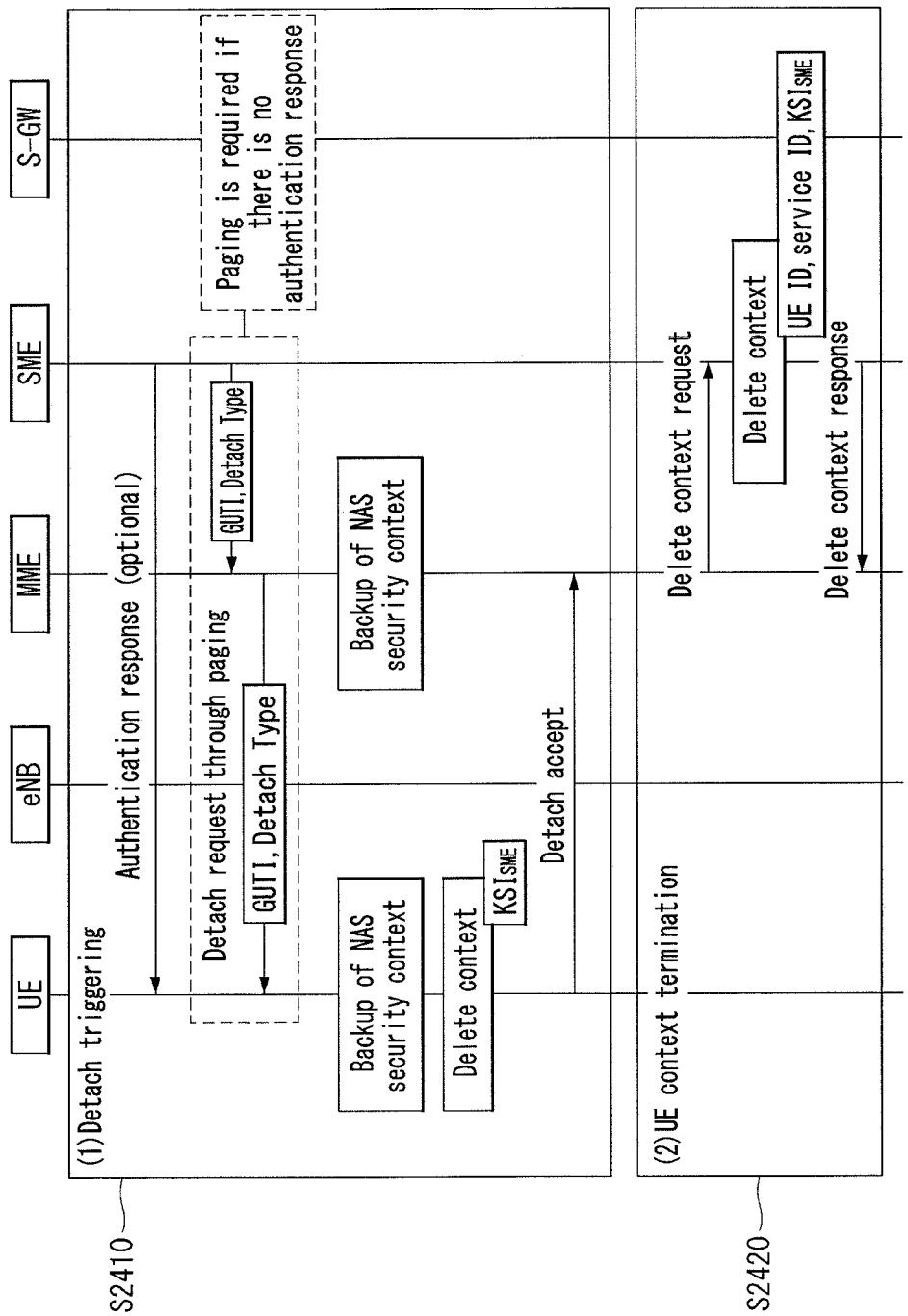

[Figure 25]
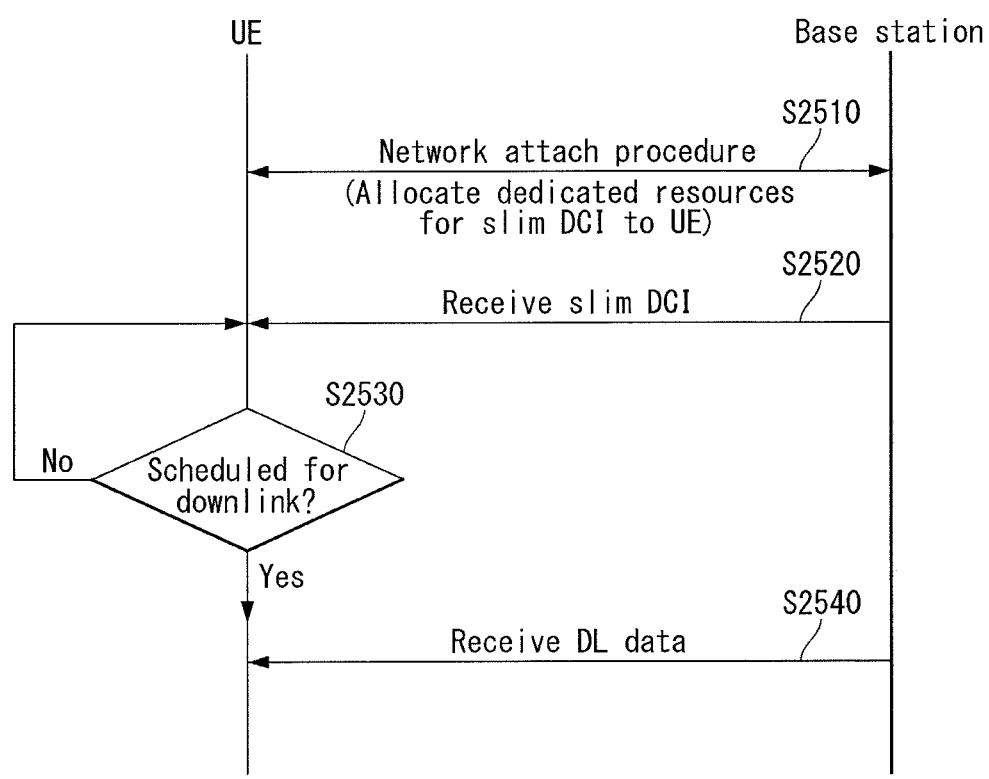

[Figure 26]
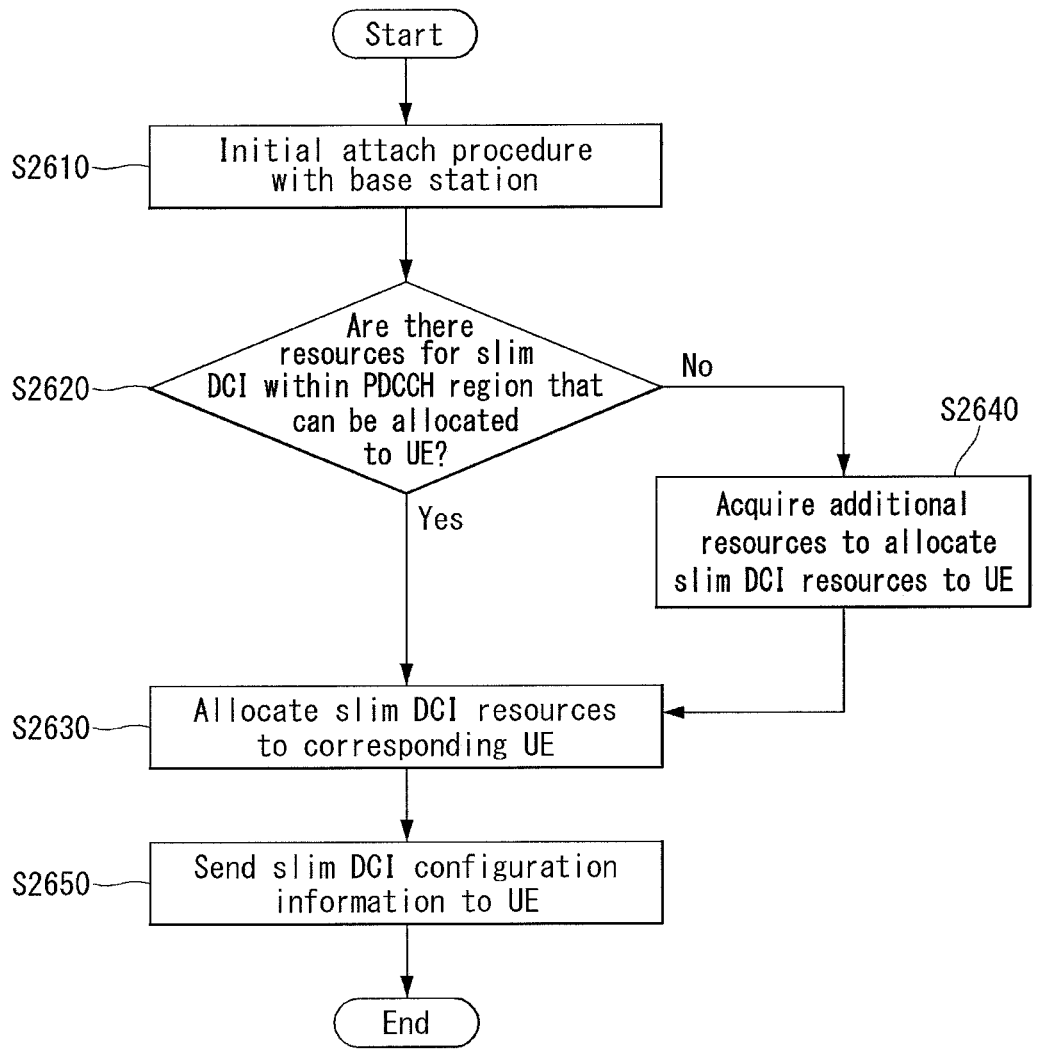

[Figure 27]
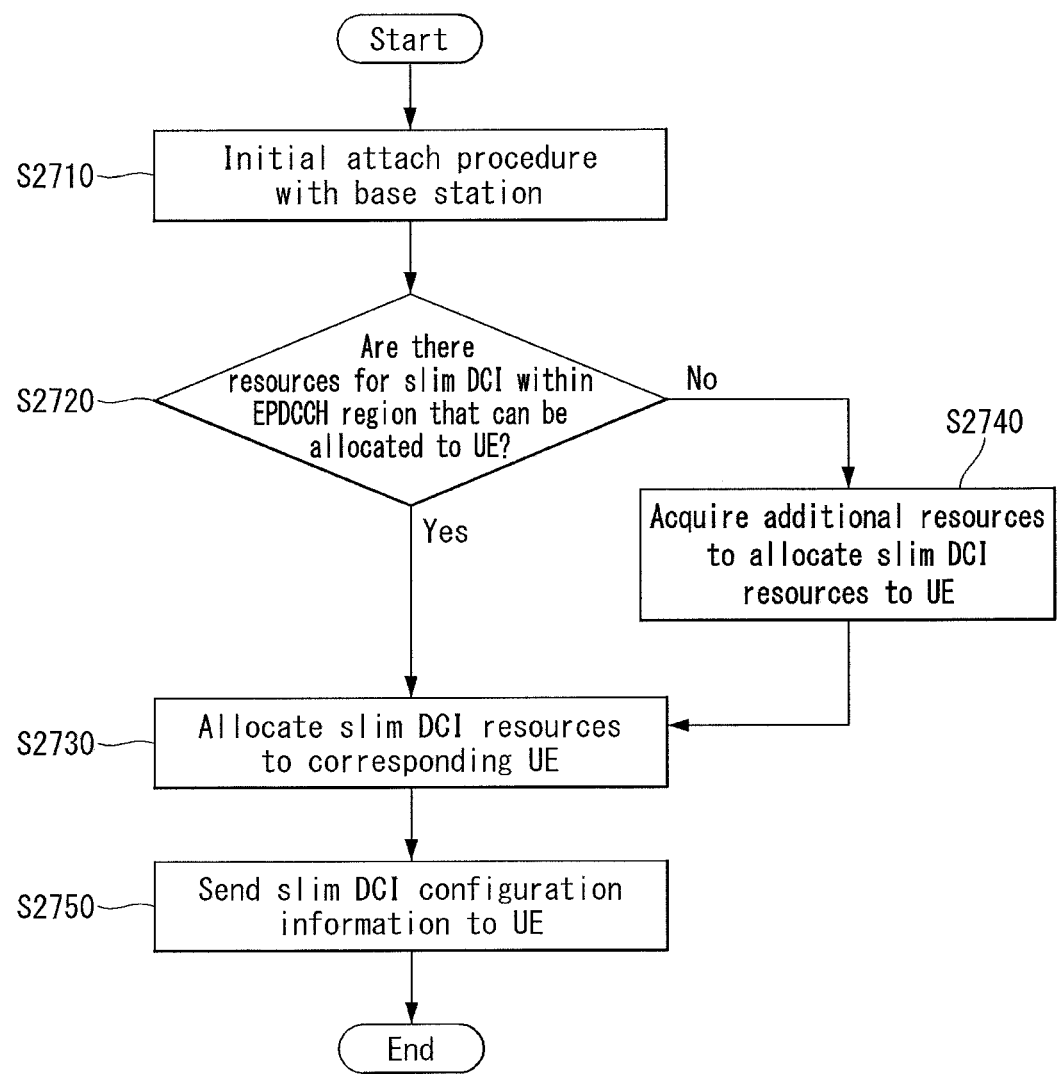

[Figure 28]
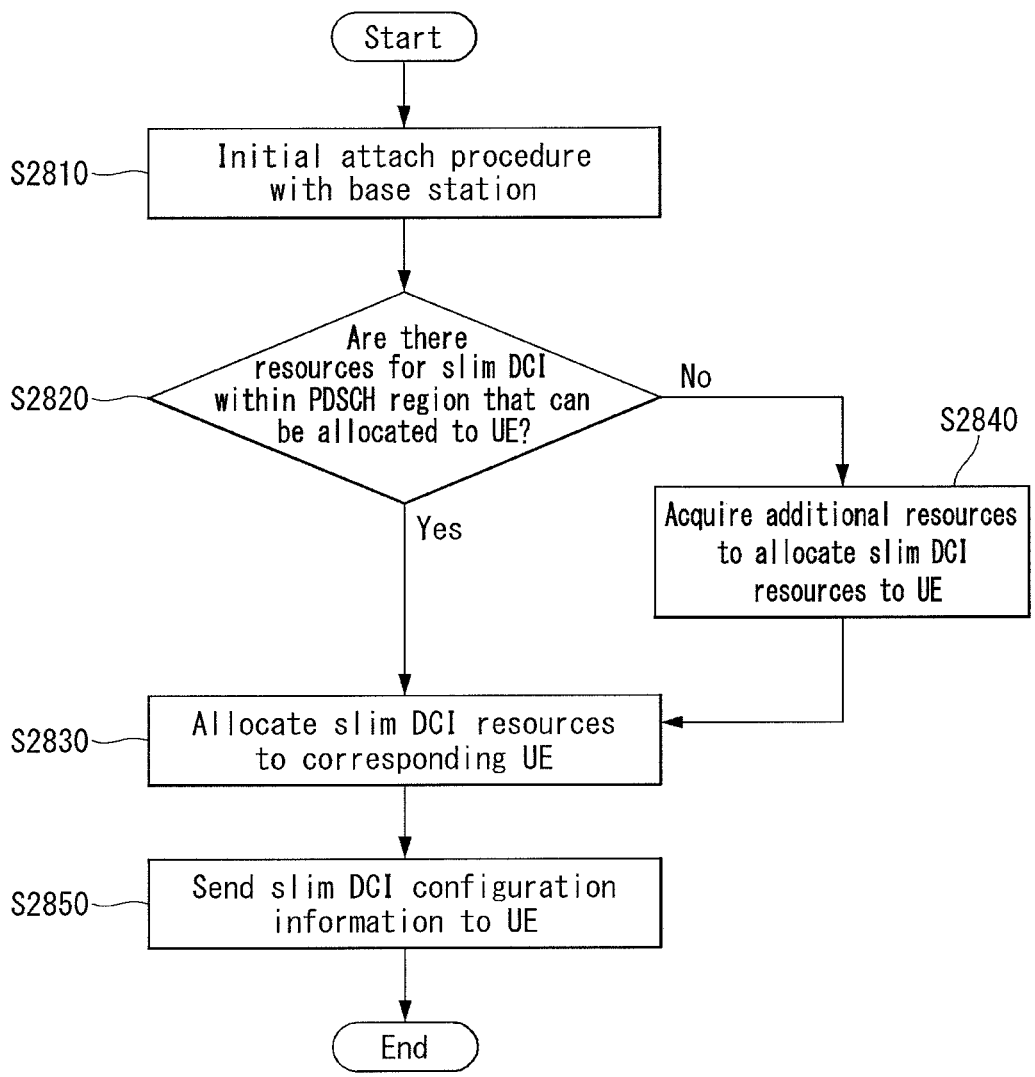

【Figure 29】
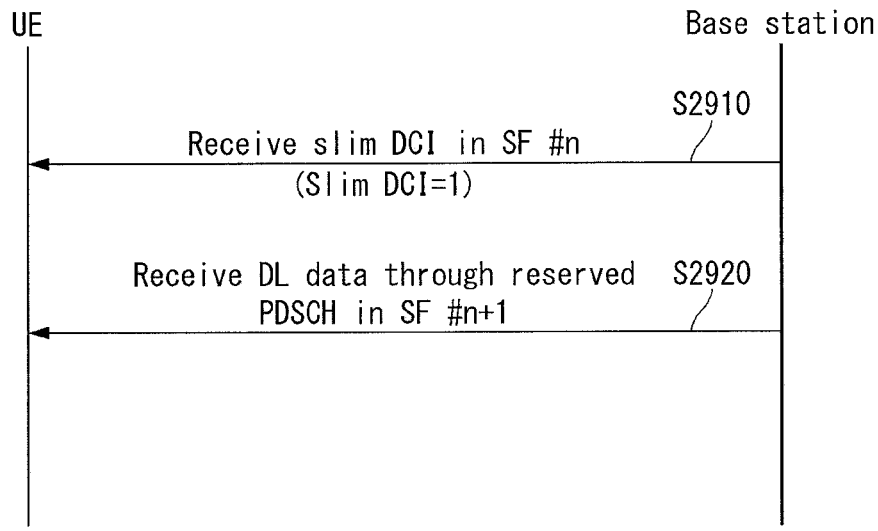
【Figure 30】
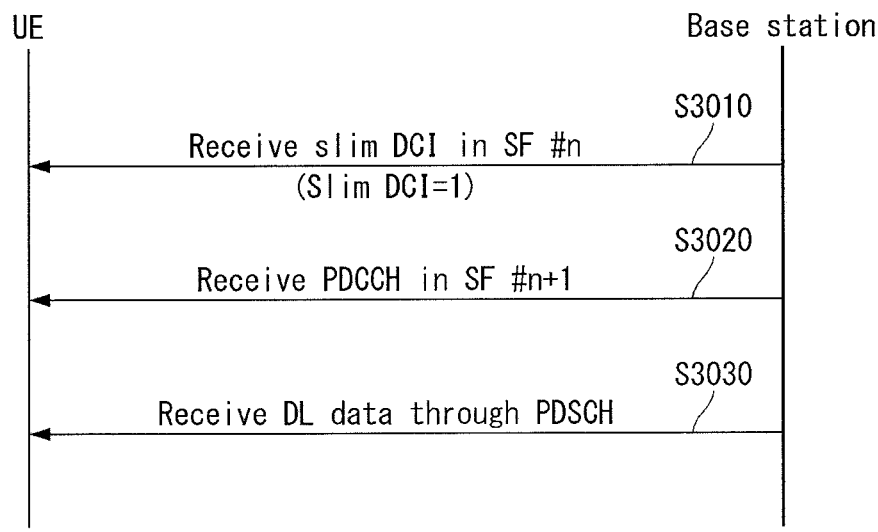

[Figure 31]
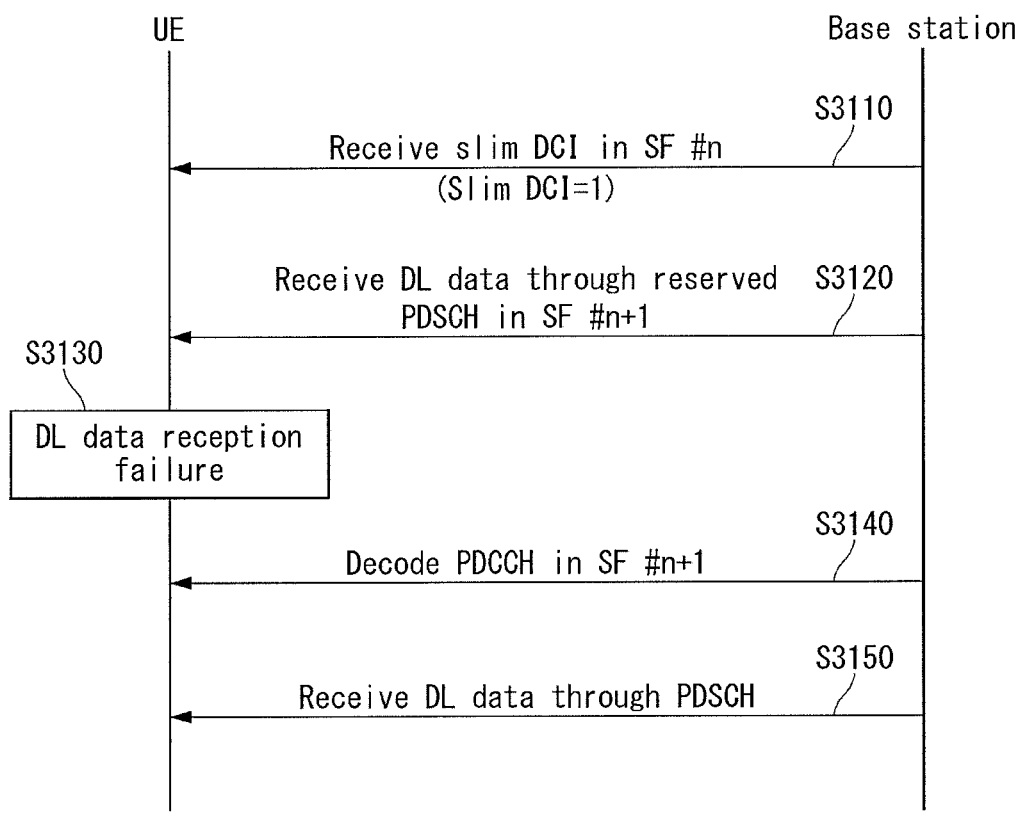

[Figure 32]
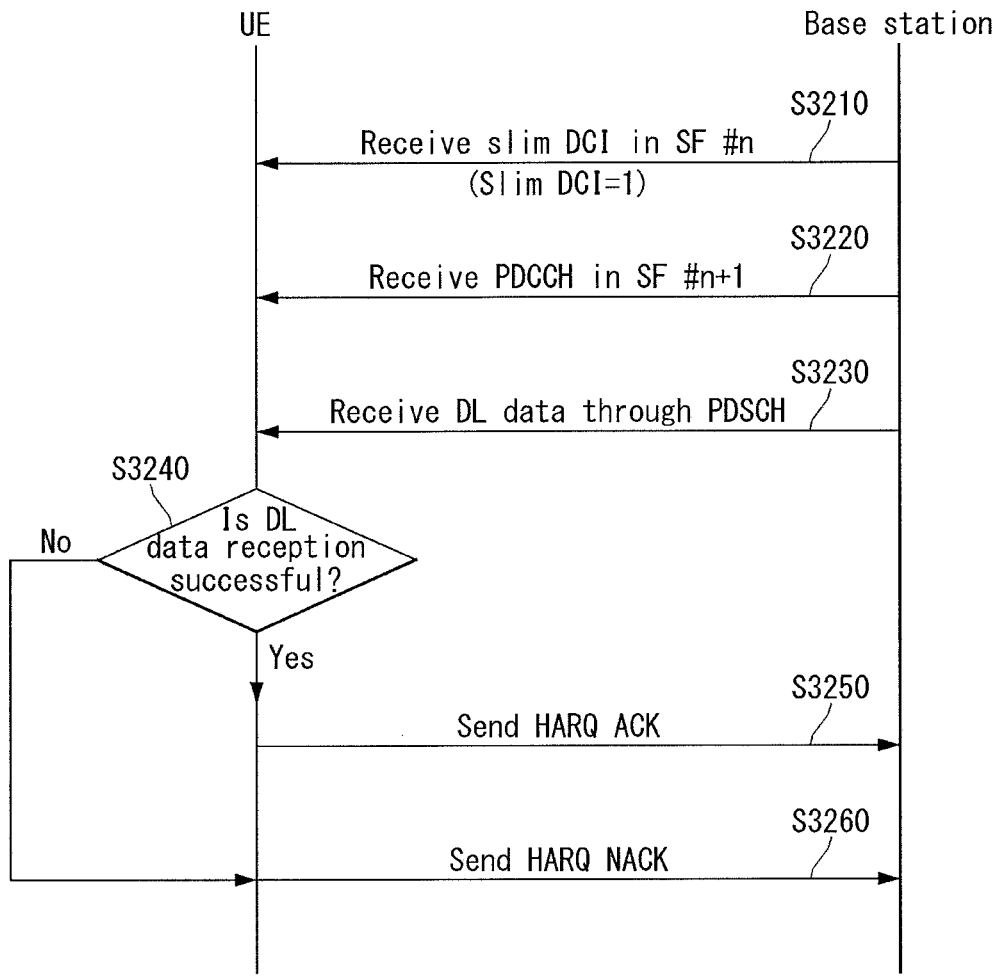
[Figure 33]
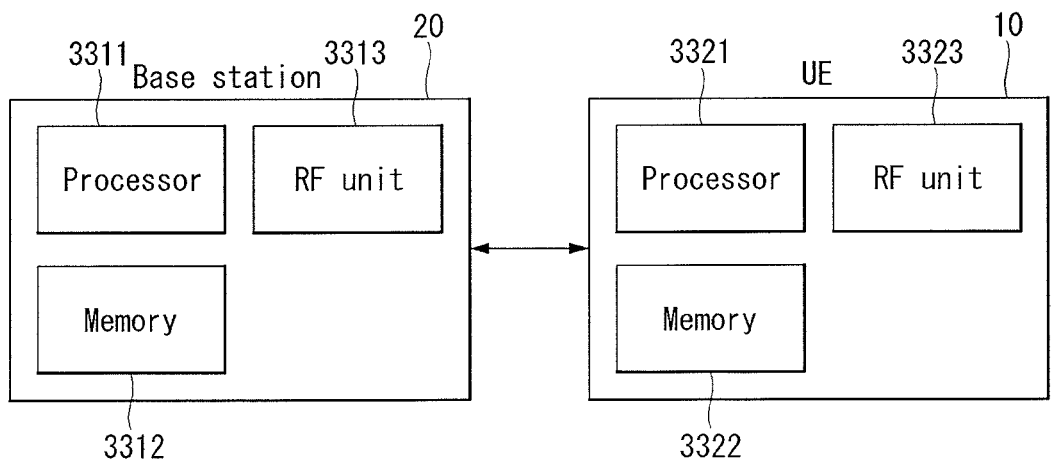

METHOD FOR TRANSMITTING AND RECEIVING DATA IN WIRELESS COMMUNICATION SYSTEM, AND DEVICE THEREFOR

CROSS REFERENCE TO RELATED APPLICATIONS

This application is the National Phase of PCT/KR2015/010461 filed on Oct. 2, 2015, which claims priority under 35 U.S.C. § 119(a) to Patent Application Nos. 10-2015-0076669 filed in the Republic of Korea on May 29, 2015 and 10-2015-0076660 filed in the Republic of Korea on May 29, 2015, all of which are hereby expressly incorporated by reference into the present application.

TECHNICAL FIELD

The present invention relates to a wireless communication system, more particularly, to a method for transmitting and receiving data in a wireless communication system supporting low latency communication (or ultra-low latency communication), and a device supporting the same.

BACKGROUND ART

Mobile communication systems were developed to ensure user activity and provide voice service. However, mobile communication systems have extended their range to data service as well as voice, and currently the explosive increase in traffic is causing a lack of resources and there is a users' demand for faster services, which is creating a need for advanced mobile communication systems.

The requirements for next-generation mobile communication systems largely include coping with explosive data traffic, very high data rates per user, coping with a surprisingly large number of connected devices, very low end-to-end latency, and support for high energy efficiency. To this end, research is ongoing on a variety of technologies such as dual connectivity, massive MIMO (massive multiple input multiple output), in-band full duplex, NOMA (non-orthogonal multiple access), support for super wideband, and device networking.

In particular, the key measures of performance for 5G mobile communication are perceived data rates, peak data rates, peak transfer rates, transmission latency, device density, energy efficiency, frequency efficiency, system capacity per unit area, and so on.

Among them, one of the most prominent features of 5G mobile communication systems that distinguish them from the existing 4G mobile communication systems is the low latency requirement.

This requirement is for supporting various services like smart grid, vehicle-to-vehicle communication, and virtual reality, which are considered for use in 5G mobile communication systems, and these services generally require very low latency.

For this reason, it is difficult to support these services with the transmission latency for the existing mobile communication systems.

While most of the research conducted on the existing 4G mobile communication systems has focused on improving peak data rates on UE, much of the recent research on 5G mobile communication systems focuses on meeting the low transmission latency requirement.

In the existing LTE/LTE-A communication technology, when a UE in the RRC-Idle state performs an uplink transmission, it is necessary to perform an RRC connection procedure to transition to the RRC_connected state.

However, the RRC connection procedure requires ten or more exchanges of control messages between a UE and a base station, which results in a minimum latency of 50 ms or so.

Thus, the RRC connection procedure is a major bottleneck in meeting the low latency requirement for the 5G mobile communication technology.

In particular, it is expected that, while services like smart grid and vehicle-to-vehicle communication, which can benefit from low latency services provided by the 5G mobile communication technology, require low transmission latency, the UE is highly likely to be in the RRC_Idle state in uplink transmissions. Therefore, the RRC connection procedure is a major problem in achieving the low latency requirement for these services.

The RRC protocol is a protocol used in LTE/LTE-A mobile communication technology that exists between the UE and the base station in order to exchange basic control information needed for the UE to access a mobile communication system.

The UE exchanges necessary information with the base station to perform communication and establishes an RRC connection, in which case the UE is defined as being in the RRC_Connected state.

However, if there is no communication between the UE and the base station for a certain period of time for management of the UE's power use, the connection is released and the UE is transitioned to the RRC_idle state and maintains the RRC_Idle state until an uplink or downlink transmission occurs on the UE.

In the existing LTE/LTE-A communication technology, it is necessary for the UE in the RRC_idle state to re-establish an RRC connection in order to send data, and it takes about 50 ms to establish an RRC connection and send data.

In services like vehicle-to-vehicle communication, smart grid communication, and IoT devices' interrupt messages, it's not possible to predict when packets will be generated, and low latency is required, which makes it difficult to adopt the existing communication technology.

Moreover, the RRC connection procedure requires at least 9 RRC message exchanges between the UE and the base station. Thus, performing the RRC connection procedure each time when sending small data like sensor information leads to inefficient use of resources in terms of signaling overhead.

Therefore, in order to meet the aforementioned service requirements and make efficient use of resources, the overhead and latency needed for transmission should be reduced by simplifying the RRC connection procedure for uplink transmission.

Additionally, in the existing LTE/LTE-A communication technology, it is necessary for the UE to receive downlink control information (DCI) the base station sends for downlink transmission.

The DCI is sent from the base station only when the UE is scheduled for downlink, and the downlink control information contains the positions of resources in a corresponding subframe the UE has to receive.

Thus, latency can be minimized if the UE is able to continuously receive downlink control information in every subframe.

However, the UE's continuous reception of control information in every subframe leads to the problem of very high power consumption.

Accordingly, the existing LTE/LTE-A communication technology employs discontinuous reception (DRX) technology which can save reception power for the UE to receive downlink control information by receiving downlink control information at regular intervals, rather than continuously receiving it.

However, the drawback of the DRX technology is that, if the UE receives a downlink packet, the base station has to perform scheduling according to the next downlink reception cycle of the corresponding UE, which increases latency.

Therefore, in order to meet the low latency requirement for the 5G mobile communication technology, a technology is required to realize continuous reception of downlink control information, as well as reducing the power consumed when the UE receives downlink control information.

In the existing LTE/LTE-A communication technology, each UE performs blind-decoding to check for the presence or absence of downlink control information in a downlink control channel, in order to determine whether it is scheduled for downlink.

If there is no information that is successfully decoded, the UE determines that it is not scheduled for the corresponding subframe. If there is information that is successfully decoded, the UE receives downlink data from the base station by using the successfully decoded information.

Downlink control information contains the positions of resources for downlink data the UE has to receive in a subframe in which the corresponding control information has been transmitted and the method of transmission. Thus, upon receiving downlink control information from the base station, the UE always needs to receive the entire corresponding subframe and store it in a buffer for downlink data reception.

This leads to high power consumption for the UE to receive the downlink control information, resulting in a failure to continuously receive the downlink control information.

Furthermore, it is expected that the size of data sent in a low latency service is generally small, so the signaling overhead will be too heavy due to the size of DCI in the existing communication technology compared to the size of data that is actually sent.

DISCLOSURE

Technical Problem

The present specification is directed to providing a method of achieving low latency and less signaling overhead by allowing UE to send an uplink packet via radio resources obtained through one random access procedure, without an RRC connection.

Another aspect of the present specification is directed to providing a method that, when an uplink packet is generated while a UE is in the RRC_Idle state, allows for uplink transmission without an RRC connection, maintains security, and enables low latency and low transmission overhead.

To this end, the present specification is directed to identifying the destination of data to be sent according to the service a UE uses and newly defining an entity for managing this within an EPC.

Another aspect of the present specification is directed to providing a method of delivering data in a predefined format to a destination by sending simplified data and one control message containing the identity of UE to a corresponding entity by using resources the UE in the RRC_Idle state has acquired through random access.

Another aspect of the present specification is directed to providing a method of reducing the overhead and latency needed for transmission compared to the existing technology, since UE performs an uplink transmission without establishing an RRC connection by using the above method.

To solve the aforementioned problems, the present specification is directed to providing a method that allocates dedicated resources to each UE and informs the corresponding UE whether it is scheduled for downlink in each subframe.

Another aspect of the present specification is directed to providing a method that, if a UE is scheduled, sends downlink data to the corresponding UE by using predesignated MCS (modulation channel coding) through physical downlink shared channel (PDSCH) resources in predesignated positions in the next subframe.

Another aspect of the present specification is directed to providing a method that allows a UE to continuously receive downlink control information from a base station and reduces signaling overhead for downlink data transmission.

Technical problems to be solved by the present invention are not limited to the above-mentioned technical problems, and other technical problems not mentioned herein may be clearly understood by those skilled in the art from the following description.

Technical Solution

Firstly, the present specification provides a method for transmitting and receiving downlink data (DL data) in a wireless communication system supporting a low latency service.

Specifically, the method for transmitting and receiving downlink data (DL data) in a wireless communication system supporting a low latency service, which is performed by a UE, includes: getting slim downlink control information (slim DCI) resources allocated from a base station, the slim downlink control information indicating whether the UE is scheduled for downlink; receiving slim downlink control information from the base station through the allocated resources; and receiving downlink data through a PDSCH (physical downlink shared channel) from the base station based on the received slim downlink control information.

Furthermore, in the present specification, the slim downlink control information resources are dedicated resources allocated for each UE.

Furthermore, in the present specification, the downlink data is received in the subframe after the one in which the slim downlink control information is received.

Furthermore, in the present specification, the slim downlink control information is received in each subframe, and the slim downlink control information is received through a part of the subframe.

Furthermore, in the present specification, the PDSCH is reserved resources for downlink data reception.

Furthermore, in the present specification, the slim downlink control information resources are allocated through an initial access procedure to the base station.

Furthermore, in the present specification, the slim downlink control information is received through a physical channel, and the physical channel is a PDCCH (physical downlink control channel), EPDCCH (enhanced PDCCH), or PDSCH (physical downlink shared channel).

Furthermore, in the present specification, the slim downlink control information received through the physical channel is generated by multiplying a sequence of a specific length by an orthogonal code with a specific spreading factor, and the sequence of a specific length is generated by repeating bits of the slim downlink control information a specific number of times.

Furthermore, in the present specification, the method further includes receiving slim DCI configuration information indicating the configuration of the slim DCI from the base station.

Furthermore, in the present specification, the slim DCI configuration information includes at least one among the index of the smallest unit of resource allocation in a first region in which the slim DCI is allocated, the index of the smallest unit of resource allocation in a second region in which the slim DCI is allocated, and orthogonal code information used to decode the slim DCI in the smallest unit of resource allocation in the second region.

Furthermore, in the present specification, the first region consists of a plurality of second regions.

Furthermore, in the present specification, the first region is a CCE (control channel element), an ECCE (enhanced control channel element), an RB (resource block), or an RBP (resource block pair), and the second region is an SCCE (slim control channel element).

Furthermore, in the present specification, the receiving of downlink data further includes: checking through the received slim DCI whether the UE is scheduled for downlink; and if the check result shows that the UE is scheduled for downlink, receiving PDCCH in the subframe after the one in which the slim DCI is received, wherein the PDCCH comprises information related to the UE's downlink data reception.

Furthermore, in the present specification, the receiving of PDCCH is performed if downlink data reception from the base station through the PDSCH fails.

Furthermore, in the present specification, the method further includes receiving PDCCH containing control information related to HARQ (hybrid automatic repeat request) ACK/NACK transmission.

Furthermore, in the present specification, the control information related to HARQ ACK/NACK transmission includes PUCCH resource position information for HARQ ACK/NACK transmission, NDI (new data indicator) information indicating whether the downlink data is new data or not, an HARQ process number related to an HARQ process, and redundancy version information indicating a redundancy version of received downlink data.

Furthermore, in the present specification, the receiving of downlink data through the PDSCH includes: checking whether the downlink data reception is successful; and transmitting HARQ ACK or HARQ NACK to the base station through PUCCH according to the check result.

Furthermore, in the present specification, a method for transmitting and receiving downlink data (DL data) in a wireless communication system supporting a low latency service, which is performed by a base station, includes: allocating slim downlink control information (slim DCI) resources to a UE, the slim downlink control information indicating whether the UE is scheduled for downlink; transmitting slim downlink control information to the UE through the allocated resources; and transmitting downlink data through a PDSCH (physical downlink shared channel) to the UE.

Furthermore, in the present specification, the allocating of slim downlink control information resources includes: checking whether there exist slim DCI resources that can be allocated to the UE; if the check result shows that there exist no slim DCI resources that can be allocated to the UE, acquiring additional resources to allocate slim downlink control information resources to the UE; and allocating the acquired additional resources as slim downlink control information resources for the UE.

Furthermore, in the present specification, a UE for transmitting and receiving downlink data (DL data) in a wireless communication system supporting a low latency service includes: an RF (radio frequency) unit for transmitting and receiving radio signals; and a processor functionally connected to the RF unit, the processor being controlled to get slim downlink control information (slim DCI) resources allocated from a base station; to receive slim downlink control information from the base station through the allocated resources; and to receive downlink data through a PDSCH (physical downlink shared channel) from the base station based on the received slim downlink control information, wherein the slim downlink control information is information indicating whether the UE is scheduled for downlink.

Secondly, the present specification provides a method for transmitting uplink data (UL data) in a wireless communication system supporting a low latency service.

Specifically, the method for transmitting uplink data (UL data) in a wireless communication system supporting a low latency service includes: performing an initial attach procedure between a UE and a network; and performing a service request procedure for performing uplink transmission of a low latency service between the UE and the network, wherein the performing of a service request procedure comprises transmitting, by the UE to a base station, control information used for an SME (service management entity) to generate uplink data of the low latency service, and wherein the control information comprises at least one among UE identification information indicating the identity of the UE, a service ID (identifier) indicating the type of low latency service, response reception information indicating whether a response to an uplink transmission is received, a packet indicator indicating a data packet the UE wants to send, and destination information indicating the destination of the data packet.

Furthermore, in the present specification, the method further includes performing, by the UE, a reconfiguration procedure with the network in order to reconfigure or update security information and/or service information related to uplink transmission of the low latency service.

Furthermore, in the present specification, the method further includes performing a detach procedure for releasing a connection between the UE and the network.

Furthermore, in the present specification, the performing of the initial attach procedure includes: performing an RRC connection establishment procedure between the UE and the network; performing an authentication procedure for authenticating the UE and the service; performing a security setup procedure for acquiring security and integrity related to uplink transmission of the low latency service; and performing, by the UE, a service information acquisition procedure for acquiring information on the low latency service.

Furthermore, in the present specification, the performing of an authentication procedure includes: acquiring, by an MME (mobility management entity), the service ID of the low latency service the UE will use from an HSS (home subscriber server); and transmitting, by the MME, a service authentication request message to request the SME for service authentication, wherein the service authentication request message includes the UE's IMSI (international mobile subscriber identity) and the service ID of the low latency service the UE will use.

Furthermore, in the present specification, the performing of a security setup procedure includes: transmitting, by the MME to the SME, a security key request message containing algorithm information to be used in generating security keys; generating a second security key by using a first security key the SME shares in advance with the UE and the algorithm information contained in the security key request message; transmitting, by the SME to the MME, the identifiers of the generated second security key and first security key; transmitting, by the MME to the UE, a security mode command message containing the identifiers of the second security key and first security key received from the SME; performing, by the UE, an integrity check based on the received security mode command message; and if the integrity check is successful, transmitting, by the UE to the SME, a security mode complete message containing the second security key.

Furthermore, in the present specification, the first security key is $K_{SME}$, and the second security key is SME-MAC.

Furthermore, in the present specification, the performing of a service request procedure includes: performing a random access procedure between the UE and the base station in order to get uplink resources allocated to send the control information; and generating, by the SME, uplink data of the low latency service based on the control information and transmitting the generated uplink data of the low latency service to the destination.

Furthermore, in the present specification, the method further includes transmitting, by the SME to the UE, a response indicating whether the uplink data transmission of the low latency service is successful.

Furthermore, in the present specification, the data packet indicator and the destination information are encoded through security keys acquired in the initial attach procedure.

Furthermore, in the present specification, the reconfiguration procedure includes: transmitting, by the UE, a service reconfiguration request message to the SME; transmitting, by the SME, a security reconfiguration request message requesting the MME to perform a security setup again; and performing, by the UE, a service information acquisition procedure with the network in order to acquire low latency service-related information again and update the same.

Furthermore, in the present specification, the reconfiguration procedure includes: receiving, by the UE from the SME, a service reconfiguration request message indicating that reconfiguration is needed; and transmitting, by the UE, a service reconfiguration response message to the SME in response to the service reconfiguration request message.

Furthermore, in the present specification, the performing of a detach procedure includes: transmitting, by the UE to the SME, a detach request message containing UE identification information, a first security key, and the identifier of the first security key; backing up, by the SME, security context based on the received detach request message; receiving, by the UE from the MME, a detach accept message indicating detach acceptance; deleting, by the SME, the UE's service registration context; and transmitting, by the SME to the MME, a delete context response indicating that the UE's service registration context is successfully deleted.

Furthermore, in the present specification, the performing of a detach procedure includes: transmitting, by the SME, a detach request message to the MME; receiving, by the UE, the detach request message from the MME; deleting, by the UE, context associated with the security of uplink transmission of the low latency service; transmitting, by the UE to the MME, a detach accept message indicating detach acceptance; transmitting, by the MME, a delete context request message requesting the SME to delete the UE context associated with the low latency service; and transmitting, by the SME to the MME, a delete context response message indicating that the UE context associated with the low latency service; and transmitting, by the SME to the MME, a delete context response message indicating that the UE context associated with the low latency service is successfully deleted.

Furthermore, in the present specification, the UE and the SME are in LSM (low latency service management)-Registered state and LSM-Deregistered state.

Advantageous Effects

The present specification offers the advantage of achieving low latency and less signaling overhead by allowing UE to send an uplink packet via radio resources obtained through one random access procedure, without an RRC connection.

Furthermore, the present specification offers the advantage of, when an uplink packet is generated while a UE is in the RRC_Idle state, allowing for uplink transmission without an RRC connection when an uplink packet is generated, maintains security, and enables low latency and low transmission overhead.

Furthermore, the present specification offers the advantage of delivering simplified data and one control message containing the identity of UE to a corresponding entity by using resources the UE in the RRC_Idle state has acquired through random access.

Furthermore, the present specification offers the advantage of greatly reducing the UE's power consumed due to blind decoding of RF and control information upon receiving downlink control information, since the UE is able to check whether it is scheduled for downlink by defining new slim DCI and receiving only a part of a subframe (containing resources indicating whether the UE is scheduled for downlink), rather than receiving the entire subframe and storing it in a buffer.

Furthermore, the present specification offers the advantage of reducing latency in downlink data transmission and reception by enabling the UE to continuously receive control information using slim DCI.

Furthermore, the present specification offers the advantage of reducing signaling overhead for the UE's downlink data reception because resources and MCS information in reserved (or pre-defined) positions are used when the UE receives downlink data.

Advantages which may be obtained in this specification are not limited to the aforementioned advantages, and various other advantages may be evidently understood by those skilled in the art to which the present invention pertains from the following description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 is a view illustrating an Evolved Packet System which is associated with the Long Term Evolution (LTE) system to which the present invention can be applied;

FIG. 2 illustrates a wireless communication system to which the present invention is applied;

FIG. 3 illustrates a functional split of an E-UTRAN and an EPC to which the present invention can be applied;

FIG. 4a is a diagram illustrating a radio protocol architecture for a user plane to which a technical feature of the present invention can be applied;

FIG. 4b is a diagram illustrating a radio protocol architecture for a control plane to which a technical feature of the present invention can be applied;

FIG. 5 illustrates physical channels and a view showing physical channels used in the 3GPP LTE/LTE-A system to which the present invention can be applied;

FIG. 6 is a diagram showing the structure of a radio frame used in a 3GPP LTE system to which the present invention can be applied;

FIG. 7 shows an example of a resource grid for one downlink slot in the wireless communication system to which the present invention can be applied;

FIG. 8 shows a structure of a downlink subframe in the wireless communication system to which the present invention can be applied;

FIG. 9 shows a structure of an uplink subframe in the wireless communication system to which the present invention can be applied;

FIG. 10 shows an example of a form in which the PUCCH formats are mapped to PUCCH regions in a wireless communication system to which the present invention may be applied;

FIG. 11 shows the structure of an ACK/NACK channel in the case of a common CP in a wireless communication system to which the present invention may be applied.

FIG. 12 shows an example in which five SC-FDMA symbols are generated and transmitted for one slot in a wireless communication system to which an embodiment of the present invention may be applied.

FIG. 13 is a diagram for an operation process between a terminal and a base station in a contention based random access procedure;

FIG. 14 is a flowchart showing an operation of a UE in RRC_Idle state to which the present invention can be applied;

FIG. 15 is a flowchart showing an RRC connection establishment procedure to which the present invention can be applied;

FIG. 16 is a flowchart showing an RRC connection reconfiguration procedure to which the present invention can be applied;

FIG. 17 is a view illustrating an example RRC connection reestablishment procedure to which the present invention can be applied;

FIG. 18 is a view illustrating an example transition process between LSM-state and EMM-state proposed in the present specification;

FIG. 19 is a flowchart showing an example initial attach procedure of a communication method for low latency uplink transmission proposed in the present specification;

FIG. 20 is a flowchart showing an example service request procedure of a communication method for low latency uplink transmission proposed in the present specification;

FIGS. 21 and 22 are flowcharts showing an example service reconfiguration procedure of a communication method for low latency uplink transmission proposed in the present specification;

FIGS. 23 and 24 are flowcharts showing an example detach procedure of a communication method for low latency uplink transmission proposed in the present specification;

FIG. 25 is a flowchart showing an example method for transmitting and receiving downlink data using slim DCI proposed in the present specification;

FIG. 26 is a flowchart showing an example method for transmitting and receiving slim DCI through a PDCCH region proposed in the present specification;

FIG. 27 is a flowchart showing an example method for transmitting and receiving slim DCI through an EPDCCH region proposed in the present specification;

FIG. 28 is a flowchart showing an example method for transmitting and receiving slim DCI through a PDSCH region proposed in the present specification;

FIG. 29 is a flowchart showing an example method for transmitting and receiving downlink data through reserved PDSCH proposed in the present specification;

FIG. 30 is a flowchart showing an example method for transmitting and receiving downlink data through PDCCH and PDSCH proposed in the present specification;

FIG. 31 is a flowchart showing an example method for transmitting and receiving downlink data by using slim DCI proposed in the present specification;

FIG. 32 is a flowchart showing an example method for dealing with slim DCI reception errors proposed in the present specification; and FIG. 33 illustrates a block diagram of a wireless communication device to which the methods proposed in the present specification can be applied.

MODE FOR CARRYING OUT THE INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', 'MeNB (Macro eNB or Master eNB)', 'SeNB (Secondary eNB)' etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

FIG. 1 is a view illustrating an Evolved Packet System which is associated with the Long Term Evolution (LTE) system to which the present invention can be applied.

The LTE system aims to provide seamless Internet Protocol (IP) connectivity between a user equipment (UE, 10) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station (20), it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 40, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE.

When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA).

Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the reestablishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 illustrates a wireless communication system to which the present invention is applied.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 3 illustrates a functional split of an E-UTRAN and an EPC to which the present invention can be applied.

Referring to the FIG. 3, the shaded blocks represents radio protocol layers, and the empty blocks represent functional entities of the control plane.

The BS performs the following functions: (1) radio resource management (RRM) function such as radio bearer (RB) control, radio admission control, connection mobility control, dynamic resource allocation to the UE; (2) IP (Internet Protocol) header compression and decryption of user data stream; (3) routing of user plane data to a serving gateway (S-GW); (4) scheduling and transmission of a paging message; (5) scheduling and transmission of broadcast information; and (6) measurement for mobility and scheduling and establishing a measurement report.

An MME performs the following functions: (1) distribution of paging messages to BSs; (2) security control; (3) idle state mobility control; (4) S bearer control; (5) ciphering and integrity protection of NAS (Non-Access Stratum) signaling.

The S-GW performs the following functions: (1) termination of a user plane packet with respect to paging; and (2) user plane switching to support UE mobility.

FIG. 4a is a diagram illustrating a radio protocol architecture for a user plane. FIG. 4b is a diagram illustrating a radio protocol architecture for a control plane.

The user plane is a protocol stack for user data transmission. The control plane is a protocol stack for control signal transmission.

Referring to FIGS. 4a and 4b, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

FIG. 5 illustrates physical channels and a view showing physical channels used in the 3GPP LTE/LTE-A system to which the present invention can be applied.

When a UE is powered on or when the UE newly enters a cell, the UE performs an initial cell search operation such as synchronization with a BS in step S501. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S502.

Thereafter, the UE may perform a random access procedure in steps S503 to S506, in order to complete the access to the BS. For the random access procedure, the UE may transmit a preamble via a Physical Random Access Channel (PRACH) (S503), and may receive a message in response to the preamble via the PDCCH and the PDSCH corresponding thereto (S504). In contention-based random access, a contention resolution procedure including the transmission of an additional PRACH (S505) and the reception of the PDCCH and the PDSCH corresponding thereto (S506) may be performed.

The UE which performs the above-described procedure may then receive the PDCCH/PDSCH (S507) and transmit a Physical Uplink Shared Channel (PUSCH)/Physical Uplink Control Channel (PUCCH) (S508), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), precoding matrix indicator (PMI), rank indication (RI), etc.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

FIG. 6 is a diagram showing the structure of a radio frame used in a 3GPP LTE system to which the present invention can be applied.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD). According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 6(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 6(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path latency of a downlink signal between the uplink and the downlink.

The structure of the radio frame is only exemplary and the number of subframes included in the radio frame, the number of slots included in the subframe, or the number of symbols included in the slot may be variously changed.

FIG. 7 shows an example of a resource grid for one downlink slot in the wireless communication system to which the present invention can be applied.

Referring to the FIG. 7, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12×7 resource elements. The resource element on the resource grid may be identified by an index pair (k, l) in the slot. Here, k (k=0, NRB×12−1) denotes an index of subcarrier in the frequency domain, and l (l=0, . . . , 6) denotes an index of symbol in the time domain. The number NDL of resource blocks included in the downlink slot depends on a downlink transmission bandwidth determined in a cell.

FIG. 8 shows a structure of a downlink subframe in the wireless communication system to which the present invention can be applied.

Referring to the FIG. 8, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARQ). That is, the ACK/NACK signal for uplink data transmitted by a UE is transmitted over the PHICH.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

FIG. 9 shows a structure of an uplink subframe in the wireless communication system to which the present invention can be applied.

Referring to the FIG. 9, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Physical Downlink Control Channel (PDCCH)

The control information transmitted through the PDCCH is referred to as a downlink control indicator (DCI). In the PDCCH, a size and use of the control information are different according to a DCI format. In addition, a size of the control information may be changed according to a coding rate.

Table 1 represents the DCI according to the DCI format.

TABLE 1

| DCI format | Objectives |
|---|---|
| 0 | Scheduling of PUSCH |
| 1 | Scheduling of one PDSCH codeword |
| 1A | Compact scheduling of one PDSCH codeword |
| 1B | Closed-loop single-rank transmission |

TABLE 1-continued

| DCI format | Objectives |
|---|---|
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |
| 4 | the scheduling of PUSCH in one UL cell with multi-antenna port transmission mode |

Referring to Table 1, the DCI format includes format 0 for the PUSCH scheduling, format 1 for scheduling of one PDSCH codeword, format 1A for compact scheduling of one PDSCH codeword, format 10 for very compact scheduling of the DL-SCH, format 2 for PDSCH scheduling in a closed-loop spatial multiplexing mode, format 2A for PDSCH scheduling in an open-loop spatial multiplexing mode, formats 3 and 3A for transmitting a transmission power control (TPC) command for a UL channel, and format 4 for PUSCH scheduling within one UL cell in a multiple antenna port transmission mode.

The DCI format 1A may be used for PDSCH scheduling whichever transmission mode is configured to a UE.

Such DCI formats may be independently applied to each UE, and the PDCCHs of several UEs may be simultaneously multiplexed in one subframe. The PDCCH is comprised of an aggregation of one or a few continuous control channel elements (CCEs). The CCE is a logical allocation unit used for providing a coding rate according to a state of radio channel to the PDCCH. The CCE is referred to as a unit that corresponds to nine sets of resource element group (REG) which is comprised of four resource elements. An eNB may use {1, 2, 4, 8} CCEs for constructing one PDCCH signal, and this {1, 2, 4, 8} is called a CCE aggregation level. The number of CCE used for transmitting a specific PDCCH is determined by the eNB according to the channel state. The PDCCH configured according to each UE is mapped with being interleaved to a control channel region of each subframe by a CCE-to-RE mapping rule. A location of the PDCCH may be changed according to the number of OFDM symbols for the control channel, the number of PHICH group, a transmission antenna, a frequency shift, etc.

As described above, a channel coding is independently performed for the PDCCH of each multiplexed UE, and the cyclic redundancy check (CRC) is applied. By masking each UE ID to CRC, the UE may receive its PDCCH. However, in the control region allocated in a subframe, the eNB does not provide information on where the PDCCH that corresponds to the UE is. Since the UE is unable to know on which position its PDCCH is transmitted with which CCE aggregation level and DCI format in order to receive the control channel transmitted from the eNB, the UE finds its own PDCCH by monitoring a set of PDCCH candidates in a subframe. This is called a blind decoding (BD). The blind decoding may also be called a blind detection or a blind search. The blind decoding signifies a method of verifying whether the corresponding PDCCH is its control channel by checking CRC errors, after the UE de-masks its UE ID in CRC part.

Physical Uplink Control Channel (PUCCH)

Uplink control information (UCI) transmitted through a PUCCH may include a scheduling request (SR), HARQ ACK/NACK information and downlink channel measurement information.

The HARQ ACK/NACK information may be generated depending on whether a downlink data packet on a PDSCH has been successfully decoded or not. In an existing wireless communication system, 1 bit is transmitted as ACK/NACK information with respect to the transmission of downlink single codeword, and 2 bits are transmitted as ACK/NACK information with respect to the transmission of downlink 2 codewords.

The channel measurement information refers to feedback information related to a multiple input multiple output (MIMO) scheme, and may include a channel quality indicator (CQI), a precoding matrix index (PMI) and a rank indicator (RI). Pieces of these channel measurement information may be collectively expressed as a CQI.

For the transmission of a CQI, 20 bits may be used per subframe.

A PUCCH may be modulated using binary phase shift keying (BPSK) scheme and a quadrature phase shift keying (QPSK) scheme. Control information of a plurality of UEs may be transmitted through a PUCCH. If code division multiplexing (CDM) is performed to distinguish the signals of UEs, a constant amplitude zero autocorrelation (CAZAC) sequence of a length 12 is chiefly used. The CAZAC sequence has a characteristic in that it maintains constant amplitude in a time domain and a frequency domain, and thus has a property suitable for increasing coverage by lowering the peak-to-average power ratio (PAPR) or cubic metric (CM) of a UE. Furthermore, ACK/NACK information for downlink data transmission transmitted through a PUCCH is covered using orthogonal sequence or orthogonal cover (OC).

Furthermore, control information transmitted on a PUCCH may be distinguished using a cyclically shifted sequence having a different cyclic shift (CS) value. The cyclically shifted sequence may be generated by cyclically shifting a base sequence by a specific CS amount. The specific CS amount is indicated by a CS index. The number of available cyclic shifts may be different depending on the latency spread of a channel. A variety of types of sequences may be used as the base sequence, and the aforementioned CAZAC sequence is an example thereof.

Furthermore, the amount of control information which may be transmitted by a UE in one subframe may be determined depending on the number of SC-FDMA symbols which may be used to send control information (i.e., SC-FDMA symbols other than an SC-FDMA symbol used in the transmission of a reference signal (RS) for the coherent detection of a PUCCH.

In the 3GPP LTE system, a PUCCH is defined as a total of different formats depending on transmitted control information, a modulation scheme and the amount of control information. The attributes of uplink control information (UCI) transmitted may be summarized as in Table 2 below depending on each PUCCH format.

TABLE 2

| PUCCH Format | Uplink Control Information(UCI) |
|---|---|
| Format 1 | Scheduling Request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |

TABLE 2-continued

| PUCCH Format | Uplink Control Information(UCI) |
|---|---|
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

The PUCCH format 1 is used for the sole transmission of an SR. In the case of the SR sole transmission, a non-modulated waveform is applied, which is described in detail later.

The PUCCH format 1a or 1b is used for the transmission of HARQ ACK/NACK. If HARQ ACK/NACK is solely transmitted in a specific subframe, the PUCCH format 1a or 1b may be used. Alternatively, HARQ ACK/NACK and an SR may be transmitted in the same subframe using the PUCCH format 1a or 1b.

The PUCCH format 2 is used for the transmission of a CQI, and the PUCCH format 2a or 2b is used for the transmission of a CQI and HARQ ACK/NACK.

In the case of an extended CP, the PUCCH format 2 may be used for the transmission of a CQI and HARQ ACK/NACK.

FIG. 10 shows an example of a form in which the PUCCH formats are mapped to PUCCH regions of an uplink physical resource block in a wireless communication system to which an embodiment of the present invention may be applied.

In FIG. 10, $N_{RB}^{UL}$ indicates the number of resource blocks in uplink, and $0, 1, N_{RB}^{UL}-1$ mean the numbers of physical resource blocks. Basically, a PUCCH is mapped to the edges of an uplink frequency block on both sides thereof. As shown in FIG. 10, the PUCCH formats 2/2a/2b are mapped to a PUCCH region indicated by m=0, 1. It may be represented that the PUCCH formats 2/2a/2b are mapped to resource blocks located at a band edge. Furthermore, both the PUCCH formats 2/2a/2b and the PUCCH formats 1/1a/1b may be mixed and mapped to a PUCCH region indicated by m=2. The PUCCH formats 1/1a/1b may be mapped to PUCCH regions indicated by m=3, 4, 5. The number of PUCCH RBs $N_{RB}^{(2)}$ available for the PUCCH formats 2/2a/2b may be indicated for UEs within a cell through broadcasting signaling.

The PUCCH formats 2/2a/2b are described. The PUCCH formats 2/2a/2b are control channels for transmitting channel measurement feedback (i.e., a CQI, a PMI and an RI).

The report cycle of channel measurement feedback (hereinafter collectively referred to as "CQI information") and a frequency unit (or frequency resolution), that is, the subject of measurement, may be controlled by an eNB. In the time domain, a periodic CQI report and an aperiodic CQI report may be supported. The PUCCH format 2 may be used for only a periodic report, and a PUSCH may be used for an aperiodic report. In the case of the aperiodic report, an eNB may instruct a UE to carry an individual CQI report on resources scheduled for the transmission of UL data and to send the CQI.

PUCCH Channel Structure

The PUCCH formats 1a and 1b are described.

In the PUCCH formats 1a/1b, a symbol modulated using the BPSK or QPSK modulation scheme is multiplied by a CAZAC sequence of a length 12. For example, the results of the multiplication of a modulation symbol d(0) by a CAZAC sequence r(n) (n=0, 1, 2, . . . , N−1) of a length N are y(0), y(1), y(2), y(N−1). y(0), . . . , y(N−1) symbols may be called a block of symbols. After a modulation symbol is multiplied by a CAZAC sequence, block-wise spreading using an orthogonal sequence is applied.

A Hadamard sequence of a length 4 is used for common ACK/NACK information, and a discrete Fourier transform (DFT) sequence of a length 3 is used for shortened ACK/NACK information and a reference signal.

A Hadamard sequence of a length 2 is used for a reference signal in the case of an extended CP.

FIG. 11 shows the structure of an ACK/NACK channel in the case of a common CP in a wireless communication system to which an embodiment of the present invention may be applied.

FIG. 11 illustrates the structure of a PUCCH channel for the transmission of HARQ ACK/NACK without a CQI.

A reference signal (RS) is carried on three contiguous SC-FDMA symbols that belong to seven SC-FDMA symbols included in one slot and that are located in the middle part, and an ACK/NACK signal is carried on the remaining four SC-FDMA symbols.

In the case of an extended CP, an RS may be carried on two contiguous symbols in the middle. The number and location of symbols used for an RS may be different depending on a control channel. The number and location of symbols used for an ACK/NACK signal associated with the RS may also be changed depending on the RS.

Pieces of acknowledgement information (an unscrambled state) of 1 bit and 2 bits may be expressed as one HARQ ACK/NACK modulation symbol using the BPSK and QPSK modulation schemes, respectively. Positive acknowledgement (ACK) may be encoded into "1", and negative acknowledgement (NACK) may be encoded into "0."

2-dimensional spreading is applied in order to improve a multiplexing capacity when a control signal is transmitted within an allocated band. That is, in order to increase the number of UEs or the number of control channels that may be multiplexed, frequency domain spreads and time domain spreads are applied at the same time.

In order to spread an ACK/NACK signal in the frequency domain, a frequency domain sequence is used as a base sequence. A Zadoff-Chu (ZC) sequence, that is, one of CAZAC sequences, may be used as a frequency domain sequence. For example, the multiplexing of different UEs or different control channels may be applied by applying a different cyclic shift (CS) to a ZC sequence, that is, a base sequence. The number of CS resources supported in an SC-FDMA symbol for PUCCH RBs for the transmission of HARQ ACK/NACK is set by cell-specific higher layer signaling parameter $\Delta_{shift}^{PUCCH}$.

An ACK/NACK signal on which frequency domain spreading has been performed is spread in the time domain using orthogonal spreading code. A Walsh-Hadamard sequence or DFT sequence may be used as the orthogonal spreading code. For example, an ACK/NACK signal may be spread using orthogonal sequences w0, w1, w2 and w3 of a length 4 with respect to four symbols. Furthermore, an RS is also spread through an orthogonal sequence of a length 3 or a length 2. This is called orthogonal covering (OC).

A plurality of UEs may be multiplexed according to a code division multiplexing (CDM) method using the aforementioned CS resources in the frequency domain and the aforementioned OC resources in the time domain. That is, the ACK/NACK information and RSs of a large number of UEs on the same PUCCH RB may be multiplexed.

With respect to such time domain spreading CDM, the number of spreading codes supported with respect to ACK/NACK information is limited by the number of RS symbols. That is, since the number of RS transmission SC-FDMA symbols is smaller than that of ACK/NACK information transmission SC-FDMA symbols, the multiplexing capacity of an RS is smaller than that of ACK/NACK information.

For example, in the case of a common CP, ACK/NACK information may be transmitted in four symbols. Three orthogonal spreading codes not four orthogonal spreading codes are used for ACK/NACK information. The reason for this is that since the number of RS transmission symbols is limited to three, only the three orthogonal spreading codes may be used for an RS.

In the case where three symbols are used to send an RS and four symbols are used to send ACK/NACK information in one slot of a subframe of a common CP, for example, if six CSs can be used in the frequency domain and three orthogonal cover (OC) resources can be used in the time domain, HARQ acknowledgement from a total of 18 different UEs may be multiplexed within one PUCCH RB. In the case where two symbols are used to send an RS and four symbols are used to send ACK/NACK information in one slot of a subframe of an extended CP, for example, if six CSs can be used in the frequency domain and two orthogonal cover (OC) resources can be used in the time domain, HARQ acknowledgement from a total of 12 different UEs may be multiplexed within one PUCCH RB.

The PUCCH format 1 is described below. A scheduling request (SR) is transmitted in such a manner that a UE requests scheduling or does not scheduling. An SR channel reuses the ACK/NACK channel structure in the PUCCH formats 1a/1b and is configured according to an on-off keying (OOK) method based on the ACK/NACK channel design. A reference signal is not transmitted in the SR channel. Accordingly, a sequence of a length 7 is used in the case of a common CP, and a sequence of a length 6 is used in the case of an extended CP. Different cyclic shifts or orthogonal covers may be allocated to an SR and ACK/NACK. That is, for positive SR transmission, a UE transmits HARQ ACK/NACK through resources allocated for the SR. For negative SR transmission, a UE transmits HARQ ACK/NACK through resources allocated for ACK/NACK.

An enhanced-PUCCH (e-PUCCH) format is described below. The e-PUCCH may correspond to the PUCCH format 3 of the LTE-A system. A block spreading scheme may be applied to ACK/NACK transmission using the PUCCH format 3.

The block spreading scheme is a method of modulating the transmission of a control signal using the SC-FDMA method unlike the existing PUCCH format 1 series or 2 series. As shown in FIG. 8, a symbol sequence may be spread on the time domain using orthogonal cover code (OCC) and transmitted. The control signals of a plurality of UEs may be multiplexed on the same RB using the OCC. In the case of the aforementioned PUCCH format 2, one symbol sequence is transmitted in the time domain and the control signals of a plurality of UEs are multiplexed using the cyclic shift (CS) of a CAZAC sequence. In contrast, in the case of a block spreading-based PUCCH format (e.g., the PUCCH format 3), one symbol sequence is transmitted in the frequency domain and the control signals of a plurality of UEs are multiplexed using time domain spreading using the OCC.

FIG. 12 shows an example in which five SC-FDMA symbols are generated and transmitted for one slot in a wireless communication system to which an embodiment of the present invention may be applied.

FIG. 12 shows an example in which five SC-FDMA symbols (i.e., a data part) are generated using the OCC of a length=5 (or SF=5) in one symbol sequence for one slot. In this case, two RS symbols may be used for one slot.

In the example of FIG. 12, an RS symbol may be generated from a CAZAC sequence to which a specific cyclic shift value has been applied, and may be transmitted over a plurality of RS symbols in such a manner that a specific OCC has been applied (or multiplied). Furthermore, in the example of FIG. 12, assuming that 12 modulation symbols are used for each OFDM symbol (or SC-FDMA symbol) and each modulation symbol is generated by QPSK, a maximum number of bits which may be transmitted in one slot is 12×2=24 bits. Accordingly, the number of bits which may be transmitted in two slots is a total of 48 bits. If the PUCCH channel structure of the block spreading method is used as described above, control information having an extended size can be transmitted compared to the existing PUCCH format 1 series and 2 series.

PHICH (Physical HARQ Indication Channel)

Hereinafter, PHICH will be described.

Since an LTE system does not support SU-MIMO in uplink, only 1-bit ACK/NACK for PUSCH, that is, a single data stream, of one UE is transmitted through a PHICH.

The 1-bit ACK/NACK is encoded into 3 bits using repetition coding with a code rate of ⅓. The coded ACK/NACK is modulated by Binary Phase Shift Keying (BPSK) to generate three modulation symbols. The modulation symbols are spread using a Spreading Factor (SF) of 4 in the case of normal CP and are spread using an SF of 2 in the case of extended CP.

Orthogonal sequences are used for spreading the modulation symbols, and the number of orthogonal sequences used for spreading becomes SF*2 in terms of I/Q multiplexing concept.

Accordingly, PHICHs spread using SF*2 orthogonal sequences are defined as one PHICH group. Layer mapping is performed on the spread symbols. The layer-mapped symbols are mapped to resources and transmitted.

PHICH carries HARQ ACK/NACK for PUSCH transmission. Multiple PHICHs mapped to the same set of resource elements constitute a PHICH group, and PHICHs within the same PHICH group are separated through different orthogonal sequences. In the FDD system, $n_{PHICH}^{group}$, i.e., the number of PHICH groups, is constant in all subframes.

A resource used in the PHICH can be determined based on a lowest physical resource block (PRB) index of resource allocation in the PUSCH and a cyclic shift value of a demodulation reference signal (DMRS) transmitted using a UL grant.

A resource to which the PHICH is mapped (hereinafter, a PHICH resource) can be expressed by an index pair ($n_{PHICH}^{group}$, $n_{PHICH}^{seq}$). Herein, $n_{PHICH}^{group}$ denotes a PHICH group index, and $n_{PHICH}^{seq}$ denotes an orthogonal sequence index in the PHICH group.

FIG. 13 is a diagram for an operation process between a terminal and a base station in a contention based random access procedure.

(1) First Message Transmission

First of all, a terminal randomly selects one random access preamble from a set of random access preambles indicated by system information or a handover command. The terminal selects a PRACH (physical RACH) resource capable of carrying the random access preamble and is then able to transmit the corresponding random access preamble [S1310].

(2) Second Message Reception

A method of receiving random access response is similar to the aforesaid non-contention based random access procedure. In particular, after the terminal has transmitted the random access preamble, as shown in the step S1310, the terminal attempts a reception of its random access response on PDCCH within a random access response receiving window instructed by the system information or the handover command of a base station. The terminal then receives PDSCH via corresponding RA-RNTI information [S1320]. Through the received PDSCH, the terminal is able to receive uplink grant (UL grant), temporary cell identifier (temporary C-RNTI), time synchronization correction value (timing advance command: TAC) and the like.

(3) Third Message Transmission

If the terminal receives a random access response valid to itself, the terminal processes informations contained in the random access response. In particular, the terminal applies the TAC and stores the temporary C-RNTI. The terminal also transmits data (i.e., a third message) to the base station using the UL grant [S1330]. In this case, it is preferable that the third message contains an identifier of the terminal since a base station is unable to determine which terminal performs the random access procedure in the contention based random access procedure when the third message does not contains the identifier of the terminal. Thus it is preferable to identify a terminals for a future contention resolution.

Two kinds of methods have been discussed as a method of having a terminal identifier included. In a first method, if a terminal has a valid cell identifier assigned in a corresponding cell prior to the random access procedure, the terminal transmits its cell identifier via an uplink transmission signal corresponding to the UL grant. If the valid cell identifier is not assigned prior to the random access procedure, the terminal transmits its unique identifier (e.g., S-TMSI, a random ID, etc.). The unique identifier is generally longer than the cell identifier. If the terminal transmits data corresponding to the UL grant, the terminal initiates a timer for collision solution (contention resolution timer).

(4) Fourth Message Reception

After the terminal has transmitted the data containing its identifier using the UL grant contained in the random access response, the terminal waits for an instruction of the base station for the contention resolution. In particular, the terminal attempts a reception of PDCCH to receive a specific message [S1340]. Two kinds of methods have been discussed as a method of receiving the PDCCH. As mentioned in the foregoing description, if the third message transmitted based on the UL grant is transmitted using it the cell identifier, the terminal attempts the reception of the PDCCH using its cell identifier. If the identifier is a unique identifier, the terminal is able to attempt the reception of the PDCCH using the temporary C-RNTI contained in the random access response. Thereafter, in the former case, if the terminal received the PDCCH through its cell identifier before the contention resolution timer expires, the terminal determines that the random access procedure is successfully performed. The terminal then ends the random access procedure. In the latter case, if the terminal received the PDCCH via the temporary C-RNTI before the contention resolution timer expires, the terminal checks the data carried on the PDSCH instructed by the PDCCH. If the unique identifier of the terminal is included in the content of the data, the terminal determines that the random access procedure is successfully performed. The terminal then ends the random access procedure.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled.

On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state.

When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) 'Radio Resource Control (RRC); Protocol specification (Release 8)', the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

FIG. 14 is a flowchart showing an operation of a UE in RRC_IDLE state to which the present invention can be applied.

It is illustrated in FIG. 14 that a procedure of registering a PLMN through a cell selection and performing a cell reselection if needed after the UE is initially turned on.

Referring the FIG. 14, the UE selects a RAT for communicating with a PLMN from which the UE intends to be served (step S1410). Information about the PLMN and the RAT may be selected by a user of the UE. The user may use the information stored in a Universal Subscriber Identity Module (USIM).

A UE selects a highest cell among a measured BS and cells having higher quality than a predetermined value (step S1420). This procedure is referred as an initial cell reselection, and performed by a UE turned on. The cell selection procedure will be described in the following. After the cell selection, the UE periodically receives system information from the BS. The predetermined value is a value defined in a communication system for ensuring a physical signal quality in data transmission/reception. Therefore, the predetermined value may vary with a RAT to which the each predetermined value is applied.

The UE performs a network registration if needed (step S1430). The UE registers self information (i.e. IMSI) for being served by the network (i.e. paging). The UE does not register whenever the UE selects a cell. When the UE's own information about the network is different from information about the network provided from the system information, the UE performs the network registration procedure.

The UE performs cell reselection based on a service environment or the UE's environment provided from the cell (S1440). The UE, when the strength or quality value of a signal, which has been measured from the base station from which the UE is serviced, is lower that a value measured from the base station of a neighbor cell, selects one of other cells providing a better signal characteristic than the base station to which the UE is linked. This process is referred to as cell reselection as distinguished from the initial cell selection of the No. 2 process. At this time, a temporal restricting condition is assigned to prevent cells from being frequently reselected as the signal characteristics vary. The cell reselection procedure is to be described below in detail.

FIG. 15 is a flowchart showing an RRC connection establishment procedure to which the present invention can be applied.

A UE sends to a network an RRC connection request message for requesting an RRC connection (step S1510). The network sends an RRC connection setup message in response to the RRC connection request (step S1520). After receiving the RRC connection setup message, the UE enters an RRC connection mode.

The UE sends to the network an RRC connection setup complete message used to confirm successful completion of the RRC connection establishment (step S1530).

FIG. 16 is a flowchart showing an RRC connection reconfiguration procedure to which the present invention can be applied.

An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S1610). In response to the RRC connection reconfiguration, the UE sends to the network an RRC connection reconfiguration complete message used to confirm successful completion of the RRC connection reconfiguration (step S1620).

FIG. 17 is a view illustrating an example RRC connection reestablishment procedure to which the present invention can be applied.

Referring to FIG. 17, the UE stops using all of the configured radio bearers except SRB 0 (Signaling Radio Bearer #0) and initializes various sub-layers of AS (Access Stratum) (S1710). Further, the UE sets up each sub-layer and physical layer as default configuration. During such procedure, the UE maintains the RRC connection state.

The UE performs a cell selection procedure for conducting an RRC connection reestablishment procedure (S1720). Although the UE maintains the RRC connection state during the RRC connection reestablishment procedure, the cell selection procedure may be performed like the cell selection procedure performed by the UE in the RRC idle mode.

After performing the cell selection procedure, the UE identifies the system information on a corresponding cell to determine whether the corresponding cell is a proper cell (S1730). In case the selected cell is determined to be a proper E-UTRAN cell, the UE sends an RRC connection reestablishment request message to the corresponding cell (S1740).

On the other hand, in case the cell selected through the cell selection procedure for performing the RRC connection reestablishment procedure is determined to be a cell using other RAT than the E-UTRAN, the UE stops the RRC connection reestablishment procedure and enters the RRC idle mode (S1750).

The UE may be implemented to finish identifying whether the cell is proper within a limited time through the cell selection procedure and reception of the system information on the selected cell. To that end, the UE may run a timer as the UE initiates the RRC connection reestablishment procedure. The timer, when the UE is determined to have selected a proper cell, may stop. In case the timer expires, the UE considers it as failure of the RRC connection reestablishment procedure and may enter the RRC idle mode. This timer is hereinafter referred to as a radio link failure timer. According to the LTE spec. TS 36.331, a timer denoted T311 may be utilized as the radio link failure timer. The UE may obtain configuration values of the timer from the system information of the serving cell.

When receiving the RRC connection reestablishment request message from the UE and accepting the request, the cell transmits an RRC connection reestablishment message to the UE.

When receiving the RRC connection reestablishment message from the cell, the UE reconfigures a PDCP sub-layer and an RLC sub-layer for SRB1. Further, the UE recalculates various key values relating to security configuration and reconfigures the PDCP sub-layer that is in charge of security with the newly calculated security key values.

By doing so, SRB 1 between the UE and the cell is opened, and RRC control messages may be communicated therebetween. The UE completes resuming SRB1 and sends to the cell an RRC connection reestablishment complete message indicating that the RRC connection reestablishment procedure has been complete (S1760).

On the contrary, unless the cell receives the RRC connection reestablishment request message from the UE and accepts the request, the cell transmits an RRC connection reestablishment reject message to the UE.

If the RRC connection reestablishment procedure is successfully done, the cell and the UE perform an RRC connection reestablishment procedure. By doing so, the UE recovers to the state before performing the RRC connection reestablishment procedure and maximally guarantees service continuity.

Uplink Transmission Method

Hereinafter, a method for a UE to perform uplink transmission without an RRC connection procedure proposed in the present specification will be described concretely.

In the following description, a UE is assumed to perform an uplink transmission with a base station.

A UE described in the present specification is in either the RRC_Idle state or the RRC_Connected state, in order to perform communication with the base station.

Hereinafter, for convenience of explanation, in the present specification, the RRC_Idle state will be expressed as idle state, and the RRC_Connected state will be expressed as RRC connection state.

The present specification provides a method in which, if a packet sent in a low latency service is predefined, a UE in idle state does not perform an RRC connection procedure with a base station, but performs an uplink transmission associated with the low latency service by sending to the base station its identity information, the indicator of the packet to be sent, and destination information of the corresponding packet by using radio resources obtained through a random access procedure, thereby reducing the overhead and latency for the UE's uplink transmission.

To this end, the present specification provides a method of defining an SME (service management entity), which is a new entity in an EPC (evolved packet core) and transmitting uplink data through one random access by using the SME, a method of defining an LSM (low latency service management) state to manage SME information, and a method of performing a signaling procedure to manage the LSM state.

All low latency services stated in the present specification are regarded as using a UE's uplink transmission method proposed in the present specification.

SME (Service Management Entity)

A UE's uplink transmission proposed in the present specification is performed by using a newly defined EPC entity called "SME (service management entity)".

The functions of the SME may be defined as follows:
Manage the format of a packet sent in a low latency service, the indicator of the packet, the destination of the packet, the user authentication key, the charging method, etc.
Perform user authentication based on the UE's uplink transmission information and acquires security for uplink.
Generate a data packet based on the UE's transmission information and deliver it to the destination requested by the UE.

First, the first function of the SME will be discussed.

Firstly, the SME manages the format of a packet sent in a low latency service, the indicator of the packet, the destination of the packet, the user authentication key, the charging method, etc. are required.

In order for the UE to perform an uplink transmission associated with a low latency service, information on the user authentication key, the packet format, etc.

Accordingly, the SME manages information on the user authentication key, the packet format, etc., checks for service information used by the UE through a control message received upon the UE's initial attachment, and sends information required for the UE's uplink transmission to the UE.

Here, there may exist multiple low latency services, so the SME has to manage information on the multiple low latency services.

Secondly, the SME performs the function of authenticating the UE and acquiring security for uplink transmission.

In the existing LTE/LTE-A communication technology, an AS (access stratum) security setup is performed through an RRC connection procedure, and security and data integrity between the base station and the UE are acquired through the AS security setup.

However, in the method proposed in the present specification, a UE in idle state does not perform an RRC connection procedure during an uplink transmission, and the existing method does not ensure the security and integrity of uplink data to be sent by the UE.

Accordingly, the present specification provides a method of acquiring security and data integrity in a UE's uplink transmission through an SME.

Thirdly, the SME performs the function of generating a packet corresponding to the packet's indicator and delivering the generated packet to the destination by receiving the indicator of the packet sent from the UE and the destination information of the packet.

As is described with respect to the first function of the SME, the SME may generate a packet (to be sent to the destination requested by the UE) by using the packet's information sent from the UE, since the SME manages the packet information of low latency services.

Moreover, in the present specification, an LSM (low latency service management) state is newly defined in order to manage information exchanges between the UE and the SME and the current state.

The newly defined LSM-state may be classified as two states: (1) LSM-Registered state; and (2) LSM_Deregistered state.

That is, a UE that uses or supports a low latency service may have the above-defined LSM-state.

Each LSM-state (LSM-Registered state and LSM_Deregistered state) represents a state of information exchange between the UE and the SME.

The LSM-Registered state is a state in which the UE's information and information for the security of uplink transmission are shared between the UE and the SME, in which case the UE's information is also shared between the SME and an MME.

Accordingly, if the UE is in the LSM-Registered state and at the same time in an EMM-Registered state, this may correspond to a state in which low latency uplink transmission proposed in the present specification is possible.

The EMM (EPS Mobility Management)-Registered state means a state in which the UE is attached to a network and has an IP address and an EPS bearer is set up.

The LSM-Deregistered state means a state in which the UE's information and information for the security of uplink transmission are not shared between the UE and the SME.

The UE may have one of the following four states according to the LSM-state and EMM-state:

(1) State 1 (1810): EMM-Deregistered and LSM-Deregistered (2) State 2 (1820): EMM-Deregistered and LSM-Registered (3) State 3 (1830): EMM-Registered and LSM-Registered (4) State 4 (1840): EMM-Registered and LSM-Deregistered FIG. 18 is a view illustrating an example transition process of LSM-state and EMM-state proposed in the present specification.

Referring to FIG. 18, the above four states will be described more concretely.

State 1 (EMM-Deregistered and LSM-Deregistered) represents a state in which the user has never powered on the UE after subscribing to a network or much time has passed since the user powered off the UE.

State 2 (EMM-Deregistered and LSM-Registered) represents a state in which the user has powered off the UE or in which an EMM connection with the network has been released for other reasons but the UE's information needed for low latency uplink transmission still remains in the network.

Here, if State 2 continues for a certain time or longer, the State 2 transitions to State 1.

State 3 (EMM-Registered and LSM-Registered) is a state in which information for low latency uplink transmission is all shared between the UE and the SME and the UE is attached to the network, in which case the UE is able to perform a low latency uplink transmission by using the SME.

State 4 (EMM-Registered and LSM-Deregistered) is a state in which a UE in the State 3 has failed in user authentication during a low latency uplink transmission process, or security information is not shared between the UE and the SME or has expired.

In order to transition from State 4 to State 3, the UE has to perform a (service) reconfiguration process.

Hereinafter, a communication method for low latency uplink transmission proposed in the present specification will be described.

The communication method for low latency uplink transmission proposed in the present specification may be largely divided into (1) initial attach procedure, (2) service request procedure, (3) reconfiguration procedure, and (4) detach procedure.

The (1) to (4) procedures are respectively performed when the UE initially attaches to a network, when an LSM state transition is needed, when a low latency uplink transmission is performed, or when security information between the UE and the SME needs updating.

Each of these procedures will be described more concretely with reference to FIGS. 19 to 24.

Initial Attach Procedure

FIG. 19 is a flowchart showing an example initial attach procedure of a communication method for low latency uplink transmission proposed in the present specification.

FIGS. 19*a* and 19*b* are given separately only for convenience of explanation and for convenience in drawing figures, and correspond to a series of processes for performing the initial attach procedure.

The initial attach procedure is a process in which a UE in EMM-Deregistered and LSM-Deregistered state initially attaches to a network and sends an attach request to the network, and performs an authentication and security-related procedure with the network.

As shown in FIG. 19, the initial attach procedure may be largely divided into four steps: (1) UE ID acquisition (S1910), (2) authentication (S1920), (3) security setup (S1930), and (4) service information acquisition (S1940).

First, the UE ID acquisition step, which is the first step of the initial attach procedure, will be described.

The UE ID acquisition step S1910 is a procedure in which IMSI (international mobile subscriber identity) is acquired through an attach request message, as in the case of an RRC connection procedure in the existing LTE/LTE-A communication technology.

Since the UE performs the same procedure as the existing RRC connection procedure in order to attach to a network, reference will be made to the above description for a detailed description of this procedure.

After the UE ID acquisition step, the UE transitions to EMM-Registered and LSM Deregistered state.

Next, the authentication step, which is the second step of the initial attach procedure, will be described (S1920).

The authentication step is a step in which an authentication vector is acquired through signaling between MME and HSS and subscriber authentication is performed, which may be divided into a network authentication procedure S1921 and a service authentication procedure S1922.

The network authentication procedure is a process that authenticates whether the UE is actually able to use the network or not.

In this case, although the network authentication procedure is the same as the network authentication procedure in the existing LTE/LTE-A communication technology, a UE using a low latency service additionally acquires the service ID (1910) of the low latency service the UE is using, in the process in which the MME acquires an authentication vector from the HSS for service authentication.

Once mutual authentication between the UE and the MME is completed, the MME performs the service authentication process by sending a service authentication request message to the SME.

The service authentication request message contains the IMSI of the UE and the service ID (1920) of the service the UE will use that has been acquired from the HSS.

The SME informs the MME through a service authentication response message whether the IMSI of the UE the MME has acquired from the UE is the same as the information registered in the SME.

Next, the security setup step (S1930), which is the third step of the initial attach procedure, will be described.

The security setup step refers to a step in which the UE exchanges information to acquire security and integrity during a low latency uplink transmission.

The security setup step is essentially similar to the NAS security setup process in the existing LTE/LTE-A communication technology, so the following description will be made focusing on the differences.

In this step, the UE and the SME require information to share in order to generate the same security key.

Accordingly, the present specification provides a method of assigning the same security key $K_{SME}$ to the USIM in the UE and the SME of the network in the process in which the UE registers a low latency service to generate the corresponding security key.

Here, the security setup step may be largely divided into a security preparation procedure S1931 and a security setup complete procedure S1932.

In the security preparation procedure, the MME sends to the SME a security key request message containing algorithm information to be used in generating security keys.

The algorithm used to generate security keys may be the same as the algorithm used for NAS security setup.

Upon receiving the security key request message, the SME generates a security key SME-MAC by the algorithm contained in the security key request message by using $K_{SME}$ 1930 the SME shares with the corresponding UE, and forwards it to the MME, along with $K_{SME}$ 1940, which is the identifier of $K_{SME}$.

In the security setup complete procedure, the MME delivers to the UE the SME-MAC 1950, $K_{SME}$ 1960, and information for NAS security setup received from the SME through a security mode command message.

Upon receiving the security mode command message, the UE generates XNAS-MAC and XSEM-MAC in the same manner as NAS-MAC and SME-MAC through the algorithm contained in the security mode command message.

Thereafter, the UE performs an integrity check by checking whether the generated XNAS-MAC and XSME-MAC have the same value as NAS-MAC and SME-MAC.

Thereafter, if the integrity check is successful, the UE informs the MME of the success of the integrity check by transmitting the NAS-MAC and SME-MAC 1970 through a security mode complete message.

Thereafter, the MME informs the SME of the success of the integrity check by delivering the received SME-MAC to the SME.

In the authentication step and security setup step, when user authentication information exists in the network, the UE transmits NAS-MAC and SME-MAC to the MME in the UE ID acquisition step. If the received NAS-MAC and SME-MAC are identical to the NAS-MAC and SME-MAC the MME and the SME respectively have (that is, the integrity check is successful), the corresponding procedures may be omitted.

Next, the service information acquisition step S1940, which is the fourth step of the initial attach procedure, will be described.

The service information acquisition procedure refers to a step in which the UE acquires information on the low latency service.

After the security setup with the UE is finished, the SME gets the UE registered with the service and sends a service information message to the UE.

The service information message may be sent to the UE from the SME if the UE has not received the information on the service or much time has passed since the acquisition of the information on the service.

Moreover, the service information message contains information required for uplink transmission in the low latency service used by the UE.

The required information contained in the service information message may include information required for transmission, such as a list of identifier of predefined data, service policies, the length of the timer for updating service information, and information randomly selected by the service provider.

After the above-described initial attach procedure, the UE is transitioned to EMM-Registered and LSM-Registered state and becomes able to perform low latency uplink transmission.

Service Request Procedure

FIG. 20 is a flowchart showing an example service request procedure of a communication method for low latency uplink transmission proposed in the present specification.

The service request procedure refers to a procedure in which a UE that has successfully performed the initial attach procedure performs a low latency uplink transmission.

Here, when the UE sends a service request message to a base station, the base station transmits the service request message to an SME so that the SME can actually forward data to a destination.

In this procedure, it is assumed that the UE is in LSM-Registered and EMM-Registered state and in idle state.

The service request procedure may be largely divided into four steps: (1) random access procedure S2010, (2) service message forwarding procedure S2020, (3) packet delivery procedure S2030, and (4) response message procedure (optional) S2040.

If the (4) response message procedure is omitted, the service request procedure may be largely divided into three steps.

First, the random access step S2010, which is the first step of the service request procedure, will be described.

The random access step refers to a process in which the UE performs random access to the base station for uplink transmission.

The UE waits for an RACH cycle and sends a random access preamble to the base station in the corresponding RACH, as in the case of the existing LTE/LTE-A communication technology, and the base station sends a random access response as a response to the RACH preamble.

The random access response contains information of uplink resources through which the UE is able to transmit the next control message to the base station.

Next, the service message forwarding step S2020, which is the second step of the service request procedure, will be described.

The service message forwarding step is a process in which the UE sends a service message to the base station through uplink resources obtained through random access, and the base station forwards the service message to the SME.

Here, the UE sends to the base station at least one among its identity, the service ID, information on whether it has received a response about uplink transmission, the indicator of a packet it wants to send, or the destination's information by using the uplink resources obtained through random access (S2021).

Here, the indicator of a packet the UE wants to send and the destination's information are encoded through the security keys acquired in the initial attach procedure and sent to the base station.

On the other hand, the UE's identity, the service ID, and the information on whether it has received a response about uplink transmission are sent without being encoded through the security keys acquired in the initial attach procedure. This is because the base station has to forward the service message to the SME by using the corresponding information (the UE's identity, the service ID, and the information on whether it has received a response about uplink transmission).

Afterwards, upon receiving the service message from the UE, the base station acknowledges the UE's identity, the service ID, and the information on whether it has received a response about uplink transmission, and forwards the service message to the SME of the corresponding service.

If the UE needs to receive a response about uplink transmission, the base station sends a service response to the service message to the UE to deliver information of resources through which the UE is able to receive a response about uplink transmission later (S2022).

Here, if the UE does not need to interact with the destination, like informing of an incident situation, after the message transmission, the UE is not required to receive a response about uplink transmission.

Next, the packet delivery step S2030, which is the third step of the service request procedure, will be described.

The packet delivery step refers to a process in which the SME generates an actual packet using the service message received from the base station and sends the generated packet to the destination.

The SME performs an integrity check and a deciphering process using the security key that corresponds to the UE ID in the received service message.

The security key corresponding to the UE ID means a security key the SME has acquired in the security setup step of the initial attach procedure.

Here, the success of the integrity check means that the UE that has sent the service message is an authenticated UE.

Thereafter, if the integrity check and the deciphering are successful, the SME generates a packet using the packet indicator and destination of the service message and then sends the generated packet to the destination.

Next, the response message step S2040, which is the fourth step of the service request procedure, will be described.

The response message step refers to a step in which the SME sends a response message about uplink transmission.

The SME generates a response message to send to the UE depending on whether the uplink transmission is successful or not (S2041).

The generated response message contains information on whether the uplink transmission is successful or not and information on the cause of failure in the case of uplink transmission failure.

The UE may re-generate a service message, perform a re-authentication procedure, or transition to LSM-Deregistered state depending on the cause of failure.

If the uplink transmission from the UE fails multiple times, the SME may send a detach request message.

But, the step of sending a detach request message may not be performed depending on the type of service the UE and the SME use.

Reconfiguration Procedure

FIGS. 21 and 22 are flowcharts showing an example service reconfiguration procedure of a communication method for low latency uplink transmission proposed in the present specification.

The reconfiguration procedure refers to a procedure that is used for reconfiguration associated with low latency service and low latency uplink transmission and for update of related information.

The reconfiguration procedure may be performed when the integrity check performed for the service message fails and the UE receives a response message containing a reconfiguration request, when the UE receives a reconfiguration request from the SME, and when the security information and service information of the UE and SME expire and need updating.

The reconfiguration procedure is a procedure in which the UE and the SME reconfigure the security information between the UE and the SME by performing the security setup step and service information acquisition step of the initial attach procedure again, and in which the UE acquires from the SME information needed to perform uplink transmission in a low latency service and updates it.

A UE performing a low latency uplink transmission is in idle state. Thus, in order to exchange information, two methods may be used—that is, the UE may issue a reconfiguration request to the base station through random access or the base station may issue a reconfiguration command through paging.

Accordingly, the reconfiguration procedure may be divided into (1) UE-initiated reconfiguration procedure and (2) SME-initiated reconfiguration procedure, depending on which of the two starts this procedure.

FIG. 21 is a flowchart showing an example UE-initiated reconfiguration procedure, and FIG. 22 is a flowchart showing an example SME-initiated reconfiguration procedure.

First, referring to FIG. 21, the UE-initiated reconfiguration procedure will be described.

The UE-initiated reconfiguration procedure may be performed when the UE wants to update the security information and service information it has.

The first step of the UE-initiated reconfiguration procedure is a reconfiguration request step S2110, in which the UE acquires uplink resources from the base station by performing random access to the base station and sends a service reconfiguration request to the SME using the acquired uplink resources.

The second step of the UE-initiated reconfiguration procedure is a security reconfiguration step S2120, in which the SME performs a security setup by sending a security reconfiguration request to the MME.

The security setup is the same as the security setup step in the initial attach procedure.

The third step of the UE-initiated reconfiguration procedure is a service information acquisition step S2130, in which the UE acquires service-related information again and updates it.

The service information acquisition step is the same as the service information acquisition step in the initial attach procedure.

Next, the SME-initiated reconfiguration procedure will be described with reference to FIG. 22.

The SME-initiated reconfiguration procedure may be performed when the service information is changed and needs updating or when the integrity check on the service message fails during the service request procedure.

In the SME-initiated reconfiguration procedure, the steps S2220 and S2230 are performed in the same way as the security reconfiguration step S2120 and service information acquisition step S2130 of the UE-initiated reconfiguration procedure shown in FIG. 21, excepting the reconfiguration request step, which is the first step S2210.

That is, in the reconfiguration request step S2210, which is the first step of the SME-initiated reconfiguration procedure, the SME sends a service reconfiguration request message to the UE to indicate that reconfiguration is required.

Here, if reconfiguration is required because of a failure of the UE's integrity check and the SME is able to send to the UE a response message about the integrity check, the SME may send a service reconfiguration request message to the UE through a response message about the integrity check.

If the SME is not able to send a response message about the integrity check or a reconfiguration procedure is required not because of a failure of the integrity check but because of a change in the service information, since the UE is in idle state, paging to the UE is required in order for the UE to receive the service reconfiguration request message from the SME.

Accordingly, in this case, the SME sends to the MME the service reconfiguration request message and the UE's information.

Thereafter, the MME sends paging to the UE to wake up the UE, and forwards the service reconfiguration request message to the UE.

The paging and service reconfiguration request message may be sent simultaneously to the UE.

The UE receives the service reconfiguration request message and sends a service reconfiguration response signal as a response.

Since the security reconfiguration step and the service information acquisition step are the same as the UE-initiated reconfiguration procedure, a detailed description thereof will be omitted.

Detach Procedure

FIGS. 23 and 24 are flowcharts showing an example detach procedure of a communication method for low latency uplink transmission proposed in the present specification.

FIG. 23 is a flowchart showing an example UE-initiated detach procedure, and FIG. 24 is a flowchart showing an example SME-initiated detach procedure.

The detach procedure is a procedure in which the UE detaches from the network, which may be performed when the UE is powered off, when the UE does not use a service that requires low latency uplink transmission any longer, and when the UE's use of the service in the network is stopped because of repeated failures of user authentication.

Through the detach procedure, the UE detaches from the service and the network and transitions to EMM-Deregistered and LSM-Deregistered state, and therefore is no longer able to perform low latency uplink transmission.

Since the detach procedure for detaching from the network may employ a procedure in the existing LTE/LTE-A communication technology, a procedure in which the UE detaches from the service will be described below.

The detach procedure may be divided into (1) UE-initiated detach procedure and (2) SME-initiated detach procedure, depending on which of the two starts this procedure.

First, the UE-initiated detach procedure will be described with reference to FIG. 16.

The UE-initiated detach procedure may be used when the UE is powered off or when it is determined that the UE itself will not use the service any longer.

The first step of the UE-initiated detach procedure is a detach triggering step S2310, in which the UE acquires uplink resources by performing random access and sends a detach request to the SME by using the acquired uplink resources.

The detach request contains the UE's identity information, Slaw, and $KSI_{SME}$ 2310.

The SME receives the detach request from the UE, and backs up security context based on the $KSI_{ASME}$ value 2310 contained in the received detach request.

Moreover, the SME may forward the detach request information excepting $KSI_{ASME}$ to the MME, and the MME receives the detach request and then backs up the security context based on the $KSI_{ASME}$ value.

The backed-up security information may be re-used when the UE attempts an initial attach.

Once the backup of the security information is complete, the MME transmits a detach accept message to the UE.

The detach accept message may not be transmitted depending on the reason for the detach.

In an example, if the UE is powered off, the detach accept message may not be sent.

The second step of the UE-initiated detach procedure is a UE context termination step S2320, in which the SME keeps the UE from using the corresponding low latency service any longer by deleting (or detach or deregister or terminate or cancel) the UE's service registration context from the low latency service the UE has been using.

After deleting the UE's service registration context, the SME sends to the MME a delete context response indicating that the UE's service registration context is successfully deleted.

Next, the SME-initiated detach procedure will be described with reference to FIG. 23.

The SME-initiated detach procedure refers to a process of detaching the corresponding UE from the network because of repeated failures of service authentication even through the UE has made a low latency uplink transmission attempt.

That is, the UE re-attempts an initial attach after the detach procedure.

The first step of the SME-initiated detach procedure is a detach triggering step S2410, in which a detach request is sent to the UE.

The SME, if configured to use an authentication response message in the service request procedure, sends a detach request to the UE through the authentication response message.

On the other hand, if the SME is configured not to send the authentication response, paging may be required to send a detach request message to the UE.

In this case, the SME sends a detach request to the MME, and the MME receives the detach request and sends the detach request to the UE through paging to the UE.

Upon receiving the detach request from the SME or the MME, the UE backs up context associated with NAS security.

Here, the MME also backs up context associated with NAS security.

The UE deletes context associated with the security of uplink transmission in the low latency service, and sends a detach accept message as a response to the detach request.

The second step of the SME-initiated detach procedure is a UE context termination step S2420, in which the SME deletes all the UE context.

Upon receiving the detach accept message from the UE, the MME sends to the SME a delete context message asking to delete all the UE context associated with the low latency service.

Upon receiving the delete context request message, the SME deletes all the UE context.

Since the UE is detached because of repeated failures of service authentication, the SME needs to delete all the context associated with the service for the corresponding UE, in order to attempt an initial attach in the initial state.

After deleting all the UE context, the SME sends to the MME a delete context response indicating that the UE context associated with the low latency service is successfully deleted.

Hereinafter, an uplink transmission method for low latency service proposed in the present specification will be summarized.

The present specification has offered methods for reducing latency and signaling overhead which may occur while a UE in RRC_Idle state (or idle state) using a low latency service performs an uplink transmission.

To this end, the present specification provides a method in which a new entity called "SME" within EPC is defined and the SME manages information for uplink transmission, such as the format, destination, etc. of a packet to be sent depending on the service used by the UE.

By using the SME, the UE may include information such as its identity and the indicator, destination, etc. of a packet it wants to send in a single message and send it through uplink resources obtained through random access, and therefore the UE may perform an uplink transmission with low latency and less overhead without an RRC connection structure.

To this end, the present specification provides an LSM-state for managing user information between SME and UE and a method for managing the same and a method for performing low latency uplink transmission using the SME's information, and a signaling procedure for the same.

Moreover, the present specification provides a method in which UE and SME authenticate each other when the UE attaches to a network to acquire data security and integrity during a low latency uplink transmission, and a method for ensuring security and integrity with security keys obtained through mutual authentication.

Downlink Transmission Method

Hereinafter, a method for transmitting and receiving downlink data using slim downlink control information (slim DCI) proposed in the present specification will be described concretely with reference to the related drawings.

A UE receives necessary downlink control information (hereinafter, "DCI") in order to receive downlink data (DL data) from a base station.

For convenience, the UE's operation of receiving downlink data from the base station may be expressed as downlink reception or PDSCH (physical downlink shared channel) reception.

The necessary DCI is control information required for the UE to acknowledge its control information, which may include the UE's identity information, resource position information of downlink data, MCS information required to decode downlink data resources, and so on.

Conventionally, the base station sends the corresponding DCI to the UE only when the UE is scheduled for downlink, in order to reduce the control overhead of the DCI, which occurs as all the information required for the UE to receive downlink data, as well as the necessary DCI, is included in the DCI and sent to the UE, and to make efficient use of resources.

This method causes additional power consumption due to the UE's downlink reception delay and blind-decoding.

Accordingly, the present specification provides a method that reduces the amount of control information sent to the UE, makes use of dedicated resources of each UE, and sends corresponding control information in each subframe.

The control information proposed in the present specification—which is a less amount than the conventional one—will be expressed as slim downlink control information (slim DCI) to distinguish it from the conventional control information.

Furthermore, the present specification provides a method in which UE receives downlink control information with less power by receiving only a part of a subframe containing control information, i.e., slim DCI, and storing it in a buffer, rather than receiving the entire subframe and storing it in a buffer.

The methods to be discussed hereinafter are essentially for UE that requires a low latency service, so the term "UE" may be construed to mean "low latency UE" that supports a low latency service unless otherwise specified.

The slim DCI is control information indicating whether the UE is scheduled for downlink, which may have a value of 1 bit.

Table 3 shows an example slim DCI format.

TABLE 3

| Field (1 bit) | Description |
| --- | --- |
| 0 | Not scheduled for downlink |
| 1 | Scheduled for downlink |

In Table 3, if the slim DCI value is set to '0', this may indicate that the UE is not scheduled for downlink, and if the slim DCI value is set to '1', this may indicate that the UE is scheduled for downlink.

FIG. 25 is a flowchart showing an example method for transmitting and receiving downlink data using slim DCI proposed in the present specification.

Referring to FIG. 25, a UE that requires a low latency service gets dedicated resources for slim DCI allocated from a base station through a network system attach process (or network attach process) (S2510).

Thereafter, the UE checks whether it is scheduled for downlink in each subframe by receiving a part of the subframe containing the corresponding dedicated resources (S2520 to S2530).

That is, the UE checks whether it is scheduled for downlink (S2530) by receiving slim DCI through dedicated resources allocated for each subframe (S2520).

Here, since the slim DCI is sent to the UE through dedicated resources, the UE receives only a part of the subframe and stores it in a buffer.

If the check result shows that the UE is not scheduled for downlink (e.g., slim DCI=0), the UE does not perform an additional operation but repeatedly performs a procedure of receiving slim DCI in the next subframe and checking whether it is scheduled for downlink.

If the check result shows that the UE is scheduled for downlink (e.g., slim DCI=1), the UE receives its downlink data from the base station in the subframe after the one in which the slim DCI is received (S2540).

Here, the process of attaching to the network system may be an RRC connection establishment procedure and an RRC connection reestablishment procedure.

Moreover, the UE may receive downlink data through a reserved resource region when receiving downlink data from the base station.

That is, the UE may receive downlink data through reserved PDSCH. This will be described in more detail below.

That is, the UE may get the positions of reserved resources of downlink data through the process of attaching to the network system, and if the UE is found to be scheduled for downlink through slim DCI, it may receive downlink data from the base station through the reserved resources by using predesignated MCS.

The resources of downlink data that are reserved for the UE in the process of attaching the network system will be expressed as "reserved PDSCH".

If the corresponding UE is scheduled for downlink, the reserved PDSCH of each UE is used for the UE that has reserved the corresponding resources, and if the corresponding UE is not scheduled for downlink, the reserved PDSCH of each UE may be used not for low latency UE but for downlink data transmission of general UE or other UE that has not reserved.

The reserved PDSCH of each UE may be semi-statically changed through signaling between the UE and the network (e.g., base station) depending on the UE's expected resource usage, frequency of use of resources, etc.

The above-described method for transmitting and receiving DL data using reserved PDSCH, if the UE acknowledges that it is scheduled for downlink by receiving slim DCI, the UE may receive downlink data using predetermined reserved PDSCH and MCS information.

Accordingly, the UE is able to receive downlink data only with information on scheduling obtained through slim DCI, without the need to additionally receive resource position information of DL data the UE has to receive and MCS information for decoding DL data resources.

Therefore, the method for transmitting and receiving DL data through reserved PDSCH offers a big advantage in terms of signaling overhead, because there is no need to send additional control information to the UE for uplink data transmission and reception.

Another advantage is that, if downlink data sent to the UE is a small amount of packets which is frequently sent, using the reserved PDSCH enables efficient use of resources.

Slim DCI Control Channel

Next, a slim DCI control channel proposed in the present specification will be described.

A control channel for transmitting and receiving slim DCI may be designed in various formats.

First, a slim DCI control channel-related coding scheme will be described

The slim DCI is control information that is sent to each UE using each UE's dedicated resources, and there is a need to reduce the error rate because it has a small amount of resources.

To this end, the present specification provides a method in which a PHICH (physical HARQ indicator channel) coding scheme used in the LTE/LTE-A technology is used as a slim DCI coding scheme.

Using the PHICH coding scheme, a sufficiently low error rate may be achieved for the slim DCI, and this offers the advantage of reducing variation in transmission power because a code multiplexing scheme may be additionally used.

For better comprehension, the PHICH coding scheme in the LEE/LTE-A technology will be described briefly, and a method of applying this to the slim DCI coding scheme will be described.

In the PHICH coding scheme, 1-bit ACK/NACK information is repeated three times to generate a 3-bit sequence, and then three symbols are generated through BPSK modulation.

Next, code multiplexing is performed by multiplying the corresponding symbols (three generated symbols) by an orthogonal code with a spreading factor "4".

Accordingly, using the PHICH coding scheme, 1-bit ACK/NACK information of a total of eight UEs may be sent using 12 symbols.

That is, likewise, in the slim DCI coding scheme proposed in the present specification, 1-bit slim DCI of eight UEs is repeated three times to generate a 3-bit sequence, and then the generated symbols are code-multiplexed using OO and sent to 12 symbols (or REs).

In the present specification, 12 REs (resource elements) through which slim DCI of eight UEs is transmitted will be defined as "slim control channel elements (SCCE)".

Next, a method for coding in a control channel for slim DCI and mapping coded symbols to actual physical resources will be described.

Resource regions that may be used as slim DCI control channels may be largely divided into three types: (1) PDCCH resource region, (2) EPDCCH resource region, and (3) PDSCH resource region.

Since the positions where slim DCI resources can be allocated and the smallest unit of resource allocation vary with the different regions (1) to (3), the amount of resources used and the results obtained by resource allocation may vary depending on which resource region is used to allocate slim DCI.

Here, physical resource allocation regions of the control channel for slim DCI may be set differently depending on the network status.

Hereinafter, a wireless system using a normal CP (cyclic prefix) structure will be described by way of an example. However, it is needless to say that the methods to be described below are not limited to the normal CP structure but are also applicable to an extended CP structure.

Slim DCI Transmission Through PDCCH Resource Region

First, a method for transmitting and receiving slim DCI using a PDCCH resource region will be described If physical resources of a control channel for slim DCI are allocated to the PDCCH resource region, the resources for slim DCI need to be allocated in CCEs (control channel elements)—the smallest units of resource allocation in the PDCCH region—in order to solve the problem of compatibility with existing UE.

If physical resources for slim DCI are not allocated in CCE units in the PDCCH region, the CCE index of PDCCH perceived by general UE and the CCE index of PDCCH perceived by the base station may be different, by which the general UE is not able to blind-decode PDCCH properly.

A CCE, which is the smallest unit of resource allocation of PDCCH, consists of a total of 36 REs (4RE*9REG), so three SCCE (a total of 24 UEs) may be sent using a single CCE.

Accordingly, if the physical resources of a control channel for slim DCI are allocated in the PDCCH region, the number of REs the base station uses to send slim DCI of N UEs may be calculated by the following Equation 1:

$$\left\lceil \frac{N}{24} \right\rceil \times 36 \qquad \text{[Equation 1]}$$

As stated, when slim DCI is sent through the PDCCH region, physical resources in the PDCCH region exist across the entire frequency domain, and therefore physical resources for slim DCI may be distributed and allocated across the entire frequency domain, thereby achieving frequency diversity.

Moreover, since the PDCCH region is positioned at the beginning of each subframe, if a UE receives slim DCI indicating that it is scheduled for downlink, this is advantageous in terms of time when implementing an operation of receiving downlink data in the subframe after the one in which the slim DCI is received.

Slim DCI Transmission Through EPDCCH Resource Region

Next, a method for transmitting and receiving slim DCI using an EPDCCH resource region will be described If physical resources of a control channel for slim DCI are allocated to the EPDCCH resource region, the resources for slim DCI need to be allocated in ECCEs (enhanced control channel elements)—the smallest units of resource allocation in the EPDCCH region—in order to solve the problem of compatibility with existing UE.

In EPDCCH, general UE (or existing UE) performs blind-decoding to receive downlink control information, as in the case of PDCCH. Thus, if resources for slim DCI are not allocated in ECCEs, there may be a problem with the existing UE's reception of control information.

An ECCE, which is the smallest unit of resource allocation of EPDCCH, consists of a total of 36 REs as in the case of CCE, so three SCCE (a total of 24 UEs) may be sent using a single ECCE.

Accordingly, if the physical resources of a control channel for slim DCI are allocated in the EPDCCH region, the number of REs the base station uses to send slim DCI of N UEs may be calculated by Equation 1 which is shown with respect to PDCCH.

Since the physical resources for the EPDCCH region exist in a narrow frequency domain and a wide time domain, the physical resources for slim DCI cannot be distributed and allocated across the entire frequency domain, thus making it difficult to achieve frequency diversity.

Moreover, if the physical resources for slim DCI in the EPDCCH region are widely distributed along the time axis of a subframe or allocated to the last portion of the subframe, it may be difficult for the UE to receive downlink data in the subframe after the one in which the slim DCI is received after receiving slim DCI indicating that it is scheduled for downlink, due to a processing delay, etc. which may occur when the UE receives slim DCI.

Accordingly, in this case, there is a need to implement a method in which downlink data has to be sent to the UE, not in the subframe after the one in which the UE receives the slim DCI, but in the subframe after the next one.

Slim DCI Transmission Through PDSCH Resource Region

Next, a method for transmitting and receiving slim DCI using an PDSCH resource region will be described If physical resources of a control channel for slim DCI are allocated to the PDSCH resource region, the resources for slim DCI need to be allocated in RB (resource blocks) or RBPs (resource block pairs)—the smallest units of resource allocation in the PDSCH region.

Whether the resources for slim DIC are allocated in RBs or RBPs may be determined according to frequency bandwidth.

Resource allocation for uplink data of the existing UE in the PDSCH region may be done in bitmap form.

Thus, when a specific region of PDSCH is used for slim DCI, RBs or RBPs including the region in which the slim DCI is used may not be allocated for downlink data transmission of other existing UEs.

Accordingly, the physical resources of the control channel for slim DCI in the PDSCH region are also allocated in RBs or RBPs.

An RB consists of a total of 84 REs, so a total of 8 SCCEs (a total of 56 UEs) may be sent using a single RB.

Accordingly, if RBs are the smallest units of resource allocation in the PDSCH region, the number of REs used to send slim DCI of N UEs through RBs in the PDSCH region may be calculated by the following Equation 2:

$$\left\lceil \frac{N}{56} \right\rceil \times 84 \qquad \text{[Equation 2]}$$

Also, if RBPs are the smallest units of resource allocation in the PDSCH region, the number of REs used to send slim DCI of N UEs through RBPs in the PDSCH region may be calculated by the following Equation 3 since an RBP consists of two RBs:

$$\left\lceil \frac{N}{112} \right\rceil \times 168 \qquad \text{[Equation 3]}$$

Since the RBs or RBPs for the PDSCH region exist in a narrow frequency domain, the physical resources for slim DCI cannot be distributed and allocated across the frequency domain, thus making it difficult to achieve frequency diversity in slim DCI transmission.

Moreover, if the physical resources for slim DCI in the PDSCH region are allocated to the last portion of a subframe, as in the case of EPDCCH, it may be difficult for the UE to receive downlink data in the next subframe after receiving slim DCI, due to a processing delay, etc.

Accordingly, as in the case of EPDCCH, there is a need to implement a method in which downlink data has to be sent to the UE, not in the subframe after the one in which the UE receives the slim DCI, but in the second frame after the one in which the slim DCI is received (that is, in the subframe after the next one).

Method for Allocating Slim DCI Resources

Next, a method for allocating slim DCI resources will be described concretely.

When a (low latency) UE performs an initial attach to the network, the base station allocates dedicated slim DCI resources to the UE and informs the UE of information related to the allocated resources so that the UE can properly receive its slim DCI.

Hereinafter, a method for allocating slim DCI resources to each low latency UE and a method for UE to receive slim DCI using the same which are proposed in the present specification will be described.

As stated previously, physical resource regions that may be used to transmit and receive slim DCI may be divided into three: (1) PDCCH region, (2) EPDCCH (Enhanced PDCCH) region, and (3) PDSCH region.

Accordingly, a method for allocating slim DCI resources dedicated for each of the regions, a method for transmitting information related to allocated slim DCI resources, and a method for UE to receive slim DCI using the same will be described.

FIG. 26 is a flowchart showing an example method for transmitting and receiving slim DCI through a PDCCH region proposed in the present specification.

As stated above, in the PDCCH region, three SCCEs may be allocated using a single CCE.

Thus, the base station divides a single CCE into three resource regions for the allocation of SCCEs.

Since the physical resources in the three divided regions are used for the allocation of SCCEs, the physical resources in the three regions may be indicated by SCCE indices that respectively have a value of SCCE index 0, SCCE index 1, and SCCE index 2.

Here, the rule for dividing a single CCE into three regions may be set variously depending on the network status.

In an example, the three regions may be distinguished in order of REGs (resource element groups) constituting each CCE, or the three regions may be distinguished by using a specific rule for frequency diversity.

However, this rule should be known to the UE in advance so that the UE can properly receive slim DCI regardless of the rule used to distinguish the three regions.

That is, using an SCCE index, the UE may find out the SCCE resource it has to receive from the CCE corresponding to the SCCE index.

Referring to FIG. 26, a method for a base station to allocate dedicated slim DI resources to a UE when the UE attempts an initial attach to a network will be described.

First, a UE performs an initial attach procedure with a base station to attach to a network (S2610).

Afterwards, the base station checks whether there currently exist slim DCI resources that can be allocated to the UE (S2620).

Here, the slim DCI is allocated to physical resources in a PDCCH region. Thus, the base station checks whether there are slim DCI resources that are not allocated to other UEs, within the CCE resource being used for slim DCI in the PDCCH region.

As described above, each of the slim DCI resources may consist of an SCCE index and an orthogonal code pair.

If the check result shows that there exist slim DCI resources that can be allocated to the UE, the base station allocates the slim DCI resources to the UE (S2630).

If the check result shows that there exist no slim DCI resources that can be allocated to the UE, the base station may perform a procedure for acquiring additional slim DCI resources to allocate slim DCI resources to the UE (S2640).

If the base station acquires additional slim DCI resources in the step S2640, the base station allocates the acquired slim DCI resources to the UE.

That is, the base station gets a new CCE allocated for use as slim DCI and then allocates slim DCI resources to the UE.

Afterwards, the base station sends to the UE slim DCI configuration information needed for the UE to receive its slim DCI (S2650).

The slim DCI configuration information may be sent through an RRC message.

For example, the base station may send the slim DCI configuration information by including it in an RRC connection setup message of an RRC connection establishment procedure, which is performed when the UE initially attaches to the network.

When allocating physical resources of a control channel for slim DCI in the PDCCH region, the slim DCI configuration information may include the following information:
  CCE index of slim DCI allocated to UE
  SCCE indices to which slim DCI is allocated within CCE resource allocated to UE
  Orthogonal code used to decode slim DCI in SCCE That is, the UE may specify the CCE resource containing its slim DCI resources through the CCE index, and specify the SCCE resources containing its slim DCI within the corresponding CCE resource through the SCCE indices.

Since slim DCI of eight UEs is code-multiplexed for each SCCE resource, the UE may receive its slim DCI by receiving the corresponding SCCE and decoding the corresponding signal using the allocated orthogonal code.

Next, a method for transmitting and receiving slim DCI through an EPDCCH resource region will be described FIG. 27 is a flowchart showing an example method for transmitting and receiving slim DCI through an EPDCCH region proposed in the present specification.

FIG. 27 is the same as the method for transmitting and receiving slim DCI through a PDCCH resource region described with respect to FIG. 26.

Since three SCCEs may be allocated in the EPDCCH region by using a single ECCE, a single ECCE may be divided into three resource regions for the allocation of each SCCE, as in the case of CCE.

Since the physical resources in the three divided regions are used for the allocation of SCCEs, they may be indicated by SCCE indices.

Here, the rule for dividing a single ECCE may be set variously depending on the network status.

However, the rule for dividing a single ECCE should be basically set in such a way that the SCCE resources are not widely distributed along the time axis.

This is because, if the SCCE resources are widely distributed along the time axis, the UE has to receive the entire subframe to receive slim DCI, in which case the UE can hardly have the advantage of power reduction when receiving slim DCI.

In a case where it is difficult to allocate SCCEs narrowly along the time axis only by using a given ECCE resource, this may be solved by using a plurality of ECCE resources.

Moreover, this rule should be known to the UE in advance so that the UE can properly receive slim DCI regardless of the rule used to distinguish the three regions.

That is, using an SCCE index, the UE may find out the SCCE resource it has to receive from the CCE corresponding to the SCCE index.

Referring to FIG. 27, a method for a base station to allocate dedicated slim DI resources to a UE when the UE attempts an initial attach to a network will be described.

As described above, the method for the base station to allocate slim DCI resources to the UE in the EPDCCH region is basically the same as in FIG. 26.

First, when a UE performs an initial attach procedure with a base station to attach to a network (S2710), the base station checks whether there currently exist slim DCI resources that can be allocated to the UE (S2720).

Here, the slim DCI is allocated to physical resources in the EPDCCH region. Thus, the base station checks whether there are slim DCI resources that are not allocated to other UEs, within the ECCE resource being used for slim DCI in the EPDCCH region.

As described above, each of the slim DCI resources may consist of an SCCE index and an orthogonal code pair.

If the check result shows that there exist slim DCI resources that can be allocated to the UE, the base station allocates the corresponding resources to the UE that has attempted to attach to the network (S2730).

If the check result shows that there exist no slim DCI resources that can be allocated to the UE, the base station gets a new ECCE allocated for use as slim DCI and then allocates the allocated slim DCI resources to the UE (S2740).

Afterwards, the base station sends to the UE slim DCI configuration information needed for the UE to receive its slim DCI through an RRC message, etc. (S2750).

The RRC message may be an RRC connection setup message of an RRC connection establishment procedure.

Each UE requires slim DCI configuration information in order to receive its slim DCI.

Accordingly, when allocating physical resources of a control channel for slim DCI in the EPDCCH region, the slim DCI configuration information may include the following information:

ECCE index of slim DCI allocated to UE

SCCE indices to which slim DCI is allocated within ECCE resource allocated to UE Orthogonal code used to decode slim DCI in SCCE The UE may specify the ECCE resource containing its slim DCI through the ECCE index, and specify the SCCE resources containing its slim DCI within the corresponding ECCE resource through the SCCE indices.

Since slim DCI of eight UEs is code-multiplexed for each SCCE resource, the UE may receive its slim DCI by receiving the corresponding SCCE and decoding the corresponding signal using the allocated orthogonal code.

Next, a method for transmitting and receiving slim DCI through a PDSCH resource region will be described FIG. 28 is a flowchart showing an example method for transmitting and receiving slim DCI through a PDSCH region proposed in the present specification.

In the PDSCH region, eight SCCEs may be allocated using a single RB (resource block). Thus, a single RB is divided into eight resource regions for the allocation of SCCEs.

Alternatively, in a case where the PDSCH resources allocated for slim DCI are in RBPs (resource block pairs), a single RBP is divided into 16 resource regions.

If an RBP resource contains a reference signal, slim DCI cannot be used for REs to which the reference signal is mapped. Thus, a single RB is divided into less than eight resource regions.

Since the eight or less divided regions are used for the allocation of SCCEs, they may be indicated by SCCE indices.

Here, the rule for dividing an RB or RBP may be set variously depending on the network status.

However, the rule for dividing an RB should be basically set in such a way that the SCCE resources are not widely distributed along the time axis because of the same reason as the rule for dividing an ECCE.

Moreover, this rule should be known to the UE in advance so that the UE can properly receive slim DCI regardless of the rule used.

Referring to FIG. 28, a method for a base station to allocate dedicated slim DI resources to a UE when the UE attempts an initial attach to a network will be described.

The procedure for the base station to allocate slim DCI to the UE in the PDSCH region is basically the same as in FIG. 26.

First, when a UE performs an initial attach procedure with a base station to attach to a network (S2810), the base station checks whether there currently exist slim DCI resources that can be allocated to the UE (S2820).

Here, the slim DCI is allocated to physical resources in the PDSCH region. Thus, the base station checks whether there are slim DCI resources that are not allocated to other UEs, within the RB or RBP resource being used for slim DCI in the PDSCH region.

As described above, each of the slim DCI resources may consist of an SCCE index and an orthogonal code pair.

If there exist slim DCI resources that can be allocated to the UE, the base station allocates the corresponding slim DCI resources to the UE (S2830).

If there exist no slim DCI resources that can be allocated to the UE, the base station gets a new RB or RBP allocated for use as slim DCI and then allocates the allocated slim DCI resources to the UE (S2840).

Afterwards, the base station sends to the UE slim DCI configuration information needed for the UE to receive its slim DCI (S2850).

The RRC message may be an RRC connection setup message of an RRC connection establishment procedure.

Each UE requires slim DCI configuration information in order to receive its slim DCI.

Accordingly, when allocating physical resources of a control channel for slim DCI in the PDSCH region, the slim DCI configuration information may include the following information:

Position of RB or RBP to which slim DCI allocated to UE is allocated

SCCE indices to which slim DCI is allocated within ECCE resource allocated to UE Orthogonal code used to decode slim DCI in SCCE The UE may specify the RB or RBP containing its slim DCI through the position information of the RB or RBP, and specify the SCCE resources containing its slim DCI within the corresponding RB or RBP through the SCCE indices.

Since slim DCI of eight UEs is code-multiplexed for an SCCE resource, the UE may receive its slim DCI by receiving the corresponding SCCE and decoding the corresponding signal using the allocated orthogonal code.

As described above, if the UE receives slim DCI through the PDCCH, EPDCCH, or PDSCH region, the UE receives downlink data from the base station in the subframe after the one in which the slim DCI is received.

In this case, the UE may receive downlink data from predefined positions by using the above-mentioned "reserved PDSCH", or may receive downlink data from the base station by detecting the resource positions and transmission method of PDSCH through PDCCH.

When the UE receives downlink data by using "Reserved PDSCH", the positions of resources through which downlink data is to be received, MCS information, etc. may be acquired in the process of attaching to the network system.

The process of attaching to the network system is an initial attach process, which may be an RRC connection establishment (reestablishment) procedure or the like.

In this case, the UE may ask the base station about the size of downlink data resources through the process of attaching to the network system.

Moreover, the UE may be informed of the positions of resources through which downlink data is received, in the bitmap format of Type 0 or Type 1 used for the existing LTE(-A) communication technology or in the Type 2 format.

Since the positions of resources through which downlink data is allocated are not scheduled in consideration of the channel status, the corresponding channel's status may not be good when the base station sends downlink data to the UE.

Accordingly, the MCS for resource transmission may use high coding rates and QPSK modulation to increase the reliability of downlink data transmission.

In downlink data transmission proposed in the present specification, the possibility that the UE may not be in a transmission mode using a scheme like multi-antenna or subcarrier coupling is taken into consideration. Thus, the UE is able to receive downlink data through reserved PDSCH only with the aforementioned information (without considering the channel status or the like).

However, downlink data transmission using various transmission modes may be performed through reserved PDSCH depending on the network status.

In this case, the UE may acquire additional information needed for downlink data reception in the process of attaching to the network system As mentioned above, the size and positions of resources used when performing downlink transmission through reserved PDSCH and the transmission mode may be semi-statically changed depending on the network status, and the network (e.g., base station) may send the changed information to the UE through RRC signaling or the like.

Next, a method for transmitting and receiving downlink data proposed in the present specification will be described in more detail with respect to (1) reserved PDSCH and (2) PDCCH.

FIG. 29 is a flowchart showing an example method for transmitting and receiving downlink data through reserved PDSCH proposed in the present specification.

First, a UE receives slim DCI through slim DCI resources allocated to it (S2910).

Through this, the UE may check whether it is scheduled for downlink.

If the check result shows that the UE is scheduled for downlink, the UE receives downlink data by receiving reserved PDSCH allocated (pre-allocated) to it in the next subframe by a given MCS (S2920).

Here, the expression "receiving PDSCH" may be interpreted in the same manner as receiving downlink data.

This is because downlink data is received by the UE through PDSCH.

FIG. 30 is a flowchart showing an example method for transmitting and receiving downlink data through PDCCH and PDSCH proposed in the present specification.

As in LTE/LTE-A systems, downlink data is received first by detecting downlink data-related information—that is, the position of PDSCH through which downlink data (DL data) is sent, the transmission method, etc.—through PDCCH. In this method, the UE acquires position information of resources through which downlink data is to be received, MCS (modulation and coding scheme) information, the transmission mode, etc. by decoding PDCCH.

Such a method for transmitting and receiving downlink data may be performed in cases where there are no reserved PDSCH resources that can be allocated to the UE when the UE attaches to the network system, or in order to send information for HARQ retransmission when performing HARQ retransmission.

That is, such a method for transmitting and receiving downlink data may be optionally used according to the needs of the network.

That is, a method for the UE to receive downlink data from the base station by receiving slim DCI and detecting the position of PDSCH and the transmission method through PDCCH will be described in more detail with reference to FIG. 16.

First, a UE receives slim DCI from a base station through slim DCI resources allocated to it by a network attach procedure, etc. (S3010).

Afterwards, the UE checks whether it is scheduled for downlink through the received slim DCI.

If the check result shows that the UE is scheduled for downlink (S3010), the UE receives the entire subframe after the one in which the slim DCI is received.

Thereafter, the UE acquires (downlink) control information related to downlink data by blind-decoding the PDCCH of the received subframe (S3020).

Thereafter, the UE receives downlink data through PDSCH from the base station by using the acquired (downlink) control information (S3030).

FIG. 31 is a flowchart showing an example method for transmitting and receiving downlink data by using slim DCI proposed in the present specification.

The method for receiving PDSCH by acquiring downlink control information related to downlink data through PDCCH may be used as an alternative when reserved PDSCH is not available for some reason.

Accordingly, the base station may send the corresponding UE's downlink control information by including it in PDCCH even if the UE is allocated reserved PDSCH, and may send downlink data in PDSCH according to the corresponding control information.

Thus, according to the network settings, if the UE acknowledges through slim DCI that it is scheduled for downlink, the UE may first attempt a downlink data reception through reserved PDSCH in order to receive downlink data, and, if the downlink data reception fails, the UE may then attempt to blinde-decode PDCCH to receive downlink data through PDSCH.

The UE's operation will be described in more detail with reference to FIG. 31.

First, a UE receives slim DCI through slim DCI resources allocated to it (S3110).

Afterwards, the UE checks whether it is scheduled for downlink, based on the received slim DCI.

If the check result shows that the UE is scheduled for downlink, the UE receives the entire subframe after the one in which the slim DCI is received.

If the UE is scheduled for downlink, the slim DCI may be set to "1".

Afterwards, the UE receives the reserved PDSCH allocated to it in the received subframe by a given MCS (S3120).

If the UE has not received downlink data through the reserved PDSCH (S3130), the UE acquires PDSCH-related downlink control information by blind-decoding the PDCCH of the subframe in which the reserved PDSCH is received (S3140).

Thereafter, the UE receives downlink data through PDSCH based on the acquired downlink control information (S3150).

Method for Dealing with Slim DCI Errors

Next, a method for solving slim DCI reception errors proposed in the present specification will be described with reference to FIG. 32.

FIG. 32 is a flowchart showing an example method for dealing with slim DCI reception errors proposed in the present specification.

That is, in a method for transmitting and receiving low latency downlink data proposed in the present specification, the following errors (1) and (2) may occur when a UE receives slim DCI from a base station.

(1) '1'-to-'0' error

: This error refers to a reception error that occurs when the UE does not know that it is scheduled for downlink even when the UE is really scheduled for downlink.

Here, the value of '1' or '0' indicates the bit-value of slim DCI.

1) '0'-to-'1' error

: This error refers to a reception error that occurs when the UE mistakes itself as being scheduled for downlink even when the UE is not really scheduled for downlink.

When the error of (1) occurs, the UE does not know that it is scheduled for downlink and therefore is not able to receive scheduled downlink data.

Moreover, since the UE does not know that it is scheduled for downlink, it is not able to know that an error has occurred in slim DCI reception.

When the error of (2) occurs, the UE mistakes itself as being scheduled for downlink even when the UE is not really scheduled for downlink, and therefore attempts to receive downlink data through the reserved PDSCH of the next subframe or by blind-decoding the PDCCH of the next subframe.

However, the UE ends up failing to receive downlink data since it is not really scheduled for downlink.

In this case, the UE is not able to know whether it has failed to receive downlink data when it is really scheduled for downlink or it has failed to receive downlink data due to a slim DCI reception error ('0'-to-'1' error).

Accordingly, a method for performing HARQ retransmission as a way to deal with the above errors will be described.

Preferably, slim DCI proposed in the present specification is basically designed to be sent with low error rates.

However, the present specification additionally provides a method for performing HARQ retransmission as a way to deal with slim DCI errors to allow for high reliability of downlink data transmission.

To this end, it is necessary for the UE to know PUCCH resource position information for HARQ/NACK transmission, an NDI (new data indicator) indicating whether currently received data is new data or not, an HARQ process number, and redundancy version information of received data.

The above information cannot be acquired using reserved PDSCH alone. Thus, when HARQ retransmission is considered as a method of processing a slim DCI reception error, the UE acquires additional information related to HARQ retransmission through the above-mentioned PDCCH and receives downlink data from the base station through the additional information.

Here, when the error of (1), i.e., the '1'-to'0' error, occurs, the UE does not know that it is scheduled for downlink, and therefore the UE is not able to send HARQ ACK/NACK for downlink data to the base station.

Accordingly, when an HARQ ACK/NACK time-out of the downlink data occurs, the base station re-transmits the downlink data to the UE.

When the error of (2), i.e., the '0'-to'1' error, occurs, the UE attempts to blind-decode PDCCH in the subframe after the one for slim DCI.

However, since the UE is not really scheduled for downlink, the PDCCH decoding fails and the acquisition of PUCCH resources for HARQ ACK/NACK transmission also fails.

That is, when the error of (2) occurs, the UE cannot transmit HARQ ACK/NACK for downlink data.

Referring to FIG. 32, if the UE is really scheduled for downlink, the base station sets slim DCI to a value of '1' and sends it to the UE (S3210).

Afterwards, the base station sends PDCCH containing control information related to downlink data reception to the UE in the subframe after the one for the slim DCI (S3220).

Thereafter, the base station sends downlink data to the UE through PDSCH (S3230).

Here, the UE may receive slim DCI with '1'-to-'1' without an error, but may fail to decode PDCCH in the next subframe.

If the UE fail to decode PDCCH, the UE cannot acquire PUCCH resource information for HARQ ACK/NACK transmission and therefore is not able to send HARQ ACK/NACK to the base station and receive downlink data from the base station.

Accordingly, in this case, if an HARQ ACK/NACK time-out of the downlink data occurs, the base station re-transmits the downlink data to the UE.

Also, if the UE receives slim DCI with '1'-to-'1' without an error and succeeds in decoding PDCCH but fails to receive downlink data, the UE is able to acquire PUCCH resource information for HARQ ACK/NACK transmission because the UE has properly decoded PDCcH.

Therefore, the UE can send HARQ NACK to the base station, and upon receiving NACK from the UE, the base station re-transmits downlink data to the UE (S3240 and S3260).

On the other hand, if the UE succeeds in receiving downlink data through PDSCH in the step S3240, the UE sends HARQ ACK to the base station (S3240 and S3250).

The methods proposed in the present specification will be summarized below.

The present specification provides a method for transmitting and receiving downlink data that allows a UE to continuously receive downlink control information through the base station, in order to reduce the power consumption of UE performing a low latency service.

That is, the base station allocates dedicated slim DCI resources to each UE, and sends new slim DCI to each UE to indicate whether it is scheduled for downlink.

Moreover, if the UE knows through slim DCI that it is scheduled, it receives downlink data from the base station in the subframe after the one for the received slim DCI, by using 'reserved PDSCH', i.e., PDSCH resources at predefined positions, and predefined MCS information.

In this case, the UE may receive only a part of a subframe containing its slim DCI and store it in a buffer, rather than receiving the entire subframe and storing it in a buffer, thereby greatly reducing power consumption compared to the conventional art.

Additionally, the present invention provides methods for performing HARQ retransmission as a way to deal with slim DCI errors in the operation of a UE that, if 'reserved PDSCH' is not available, receives PDSCH after acquiring additional information related to PDSCH through PDCCH.

Devices in General to which the Present Invention is Applicable

FIG. 33 illustrates a block diagram of a wireless communication device to which the methods proposed in the present specification can be applied.

Referring to FIG. 33, a wireless communication system includes a base station 3310 and a plurality of UEs 3320 placed in the region of the base station 3310.

The base station 3310 includes a processor 3311, memory 3312, and a Radio Frequency (RF) unit 3313. The processor 3311 implements the proposed functions, processes and/or methods proposed with reference to FIGS. 1 to 32. The layers of a radio interface protocol may be implemented by the processor 3311. The memory 3312 is connected to the processor 3311, and stores various information for driving the processor 3311. The RF unit 3313 is connected to the processor 3311, and transmits and/or receives radio signals.

The UE 3320 includes a processor 3321, memory 3322, and an RF unit 3323. The processor 3321 implements the proposed functions, processes and/or methods proposed with reference to FIGS. 1 to 32. The layers of a radio interface protocol may be implemented by the processor 3321. The memory 3322 is connected to the processor 3321, and stores various information for driving the processor 3321. The RF unit 3323 is connected to the processor 3321, and transmits and/or receives radio signals.

The memory 3312 and 3322 may be placed inside or outside the processor 3311 and 3321 and connected to the processor 3311 and 3321 by various well-known means.

In an example, a UE for transmitting and receiving downlink data (DL data) in a wireless communication system supporting a low latency service may include: an RF (radio frequency) unit for transmitting and receiving signals; and a processor functionally connected to the RF unit.

Here, the processor controls the RF unit such that it gets slim downlink control information (slim DCI) resources allocated from the base station, receives slim downlink control information from the base station through the allocated resources, and receives downlink data from the base station through PDSCH (physical downlink shared channel) based on the received slim downlink control information.

Here, the slim downlink control information represents information indicating whether the UE is scheduled for downlink.

Furthermore, the base station 3310 and/or the UE 3320 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in such a way as not to be combined with other elements or characteristics. Furthermore, some of the elements and/or the characteristics may be combined to form an embodiment of the present invention. Order of operations described in connection with the embodiments of the present invention may be changed. Some of the elements or characteristics of an embodiment may be included in another embodiment or may be replaced with corresponding elements or characteristics of another embodiment. It is evident that in the claims, one or more embodiments may be constructed by combining claims not having an explicit citation relation or may be included as one or more new claims by amendments after filing an application.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessor, etc.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

Examples in which a method for transmitting and receiving data in a wireless communication system according to an embodiment of the present invention has been applied to a 3GPP LTE/LTE-A system have been described, but the method may be applied to various wireless communication systems in addition to the 3GPP LTE/LTE-A system.

The invention claimed is:

1. A method for transmitting and receiving, by a user equipment (UE), downlink (DL) data in a wireless communication system, the method comprising:
   acquiring slim downlink control information (DCI) resources allocated from a base station,
   wherein slim DCI is for whether the UE is scheduled for DL;
   receiving the slim DCI from the base station through the allocated resources; and
   receiving the DL data through a physical downlink shared channel (PDSCH) from the base station based on the received slim DCI,
   wherein the slim DCI is received through a physical channel by code-multiplexing with at least one slim DCI for other UE, and
   wherein the slim DCI received through the physical channel is generated by multiplying a sequence of a specific length by an orthogonal code with a specific spreading factor, and the sequence of the specific length is generated by repeating bits of the slim DCI a specific number of times.

2. The method of claim 1, wherein the slim DCI resources are dedicated resources allocated for each UE.

3. The method of claim 1, wherein the DL data is received in a second subframe after a first subframe in which the slim DCI is received.

4. The method of claim 1, wherein the slim DCI is received in each subframe, and the slim DCI is received through a part of the subframe.

5. The method of claim 1, wherein the PDSCH is reserved resources for downlink data reception.

6. The method of claim 1, wherein the slim DCI resources are allocated through an initial access procedure to the base station.

7. The method of claim 1, wherein the physical channel is a physical downlink control channel (PDCCH), an enhanced PDCCH (EPDCCH) or a PDSCH.

8. The method of claim 1, further comprising receiving slim DCI configuration information indicating the configuration of the slim DCI from the base station.

9. The method of claim 8, wherein the slim DCI configuration information comprises at least one of an index of a smallest unit of resource allocation in a first region in which the slim DCI is allocated, an index of a smallest unit of resource allocation in a second region in which the slim DCI is allocated, and orthogonal code information used to decode the slim DCI in the smallest unit of resource allocation in the second region.

10. The method of claim 1, wherein the receiving of DL data further comprises:
    checking through the received slim DCI whether the UE is scheduled for DL; and
    if a result of the checking shows that the UE is scheduled for DL, receiving a physical downlink control channel (PDCCH) in a second subframe after a first subframe in which the slim DCI is received,
    wherein the PDCCH comprises information related to the UE's DL data reception.

11. The method of claim 10, wherein the receiving of PDCCH is performed if DL data reception from the base station through the PDCCH fails.

* * * * *